United States Patent
Tsuji et al.

(10) Patent No.: US 10,455,106 B2
(45) Date of Patent: Oct. 22, 2019

(54) IMAGE READING APPARATUS

(71) Applicant: SEIKO EPSON CORPORATION, Tokyo (JP)

(72) Inventors: Etsuo Tsuji, Matsumoto (JP); Soichiro Kii, Shiojiri (JP); Yutaro Kajitani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/918,921

(22) Filed: Mar. 12, 2018

(65) Prior Publication Data

US 2018/0278787 A1   Sep. 27, 2018

(30) Foreign Application Priority Data

Mar. 27, 2017  (JP) ................................. 2017-060608

(51) Int. Cl.
*H04N 1/00* (2006.01)
*H04N 1/10* (2006.01)

(52) U.S. Cl.
CPC ..... *H04N 1/00976* (2013.01); *H04N 1/00559* (2013.01); *H04N 1/103* (2013.01); *H04N 1/1065* (2013.01)

(58) Field of Classification Search
CPC ................................................ H04N 1/00976
USPC ....................................................... 358/1.15
See application file for complete search history.

(56) References Cited

U.S. PATENT DOCUMENTS

| 4,800,401 | A | * | 1/1989 | Sato | .......................... B41J 2/471 347/242 |
| 2006/0023053 | A1 | * | 2/2006 | Sasa | ..................... B41J 13/0027 347/104 |
| 2007/0146817 | A1 | | 6/2007 | Osakabe | |
| 2014/0111835 | A1 | * | 4/2014 | Ozawa | ................... H04N 1/028 358/475 |

FOREIGN PATENT DOCUMENTS

| JP | 2007-178506 A | 7/2007 |
| JP | 2014-017573 A | 1/2014 |

* cited by examiner

*Primary Examiner* — Jacky X Zheng
(74) *Attorney, Agent, or Firm* — Workman Nydegger

(57) ABSTRACT

There is provided an image reading apparatus including: a reading device; a carriage which the reading device is loaded; a support shaft which is formed of a conductive material, which is grounded to a ground potential, and which supports the carriage; and a conduction member which allows a conductive part of the carriage and the support shaft to be electrically conducted to each other, in which the carriage includes a bearing section which is formed of a material having electric insulation properties, in which the bearing section is supported by the support shaft in a state of abutting against the support shaft from one side of the support shaft in a direction intersecting with a shaft line of the support shaft, and in which the conduction member is fixed to the carriage, and abuts against the support shaft from a side opposite to the support shaft.

5 Claims, 41 Drawing Sheets

IMAGE READING APPARATUS

INCORPORATED BY REFERENCE

The entire disclosure of Japanese Patent Application No. 2017-060608, filed Mar. 27, 2017 is expressly incorporated by reference herein.

BACKGROUND

1. Technical Field

The present disclosure relates to an image reading apparatus and the like.

2. Related Art

From the related art, an image reading apparatus which is capable of reading an image written on a document with an image sensor is known. As an example of the image reading apparatus, there is an apparatus having a configuration in which an image sensor is loaded on a carriage that is slidably supported by a guide shaft (for example, refer to JP-A-2007-178506).

In the image reading apparatus described in JP-A-2007-178506, a carriage on which an image sensor is loaded is slidably supported by a guide shaft via a bush inserted into the guide shaft. In this configuration, for example, when a metal material is used for at least a part of the carriage, it is possible to easily increase the rigidity or accuracy of the carriage, and thus, it is possible to easily reduce the size of the carriage. Therefore, it is easy to reduce the size of the image reading apparatus. In addition, when the bush inserted into the guide shaft is molded with a synthetic resin, the costs can be easily reduced compared to the metal bush. By employing a metal material for at least a part of the carriage and employing a synthetic resin for the bush, it is possible to make it easy to reduce the size and costs of the image reading apparatus. However, in this configuration, the carriage is in a state of being electrically insulated (also expressed as an electrically floating state) in the image reading apparatus. Therefore, in this configuration, the carriage is easily charged. The static electricity charged in the carriage may be discharged due to various reasons. At this time, noise is easily generated in an output signal from the image sensor due to the discharge. As a result, the quality of the image read from the document is likely to deteriorate.

SUMMARY

An advantage of some aspects of the disclosure is to provide an image reading apparatus in which the quality of a read image is unlikely to deteriorate.

The disclosure can be realized in the following aspects or application examples.

Application Example 1

According to this application example, there is provided an image reading apparatus including: a reading device which reads an image; a carriage of which a part is configured of a conductive material, and on which the reading device is loaded; a support shaft which is formed of a conductive material, which is grounded to a ground potential, and which supports the carriage to be slidable; and a conduction member which allows a conductive part of the carriage and the support shaft to be electrically conducted to each other, in which the carriage includes a bearing section which is formed of a material having electric insulation properties, in which the bearing section is supported by the support shaft in a state of abutting against the support shaft from one side of the support shaft in a direction intersecting with a shaft line of the support shaft, and in which the conduction member is fixed to the carriage, and abuts against the support shaft from a side opposite to the one side of the support shaft.

In the image reading apparatus, the conductive part of the carriage and the support shaft are electrically conducted to each other by the conduction member. The support shaft has conductivity and is grounded to the ground potential. Therefore, the conductive part of the carriage is grounded to the ground potential via the conduction member and the support shaft. Accordingly, static electricity generated in the carriage can be eliminated. As a result, since it is possible to suppress the influence of static electricity on the reading device to be low, the quality of the read image is unlikely to deteriorate. In addition, in this image reading apparatus, in a direction intersecting with the shaft line of the support shaft, the bearing section abuts against the support shaft from one side of the support shaft, and the conduction member abuts against the support shaft from the side opposite to the one side of the support shaft. In other words, the bearing section and the conduction member abut against the support shaft in directions opposite to each other. Accordingly, it is easy to stably support the carriage by the support shaft.

Application Example 2

In the image reading apparatus according to the application example, the bearing section abuts against two locations at a circumference of the support shaft, and the conduction member abuts against one location at the circumference of the support shaft.

In the image reading apparatus, since the bearing section abuts against two locations at the circumference of the support shaft and the conduction member abuts against one location at the circumference of the support shaft, the support shaft can be supported at three locations by the bearing section and the conduction member. Accordingly, the support shaft can be stably supported.

Application Example 3

In the image reading apparatus according to the application example, positions at two locations at which the bearing section abuts against the circumference of the support shaft and a position at one location at which the conduction member abuts against the circumference of the support shaft, are positioned on opposite sides with the center of the support shaft interposed therebetween when viewed from an extending direction of the support shaft.

In the image reading apparatus, the bearing section and the conduction member abut against the support shaft in the directions opposite to each other. At this time, the bearing section abuts against two locations at the circumference of the support shaft, and the conduction member abuts against one location at the circumference of the support shaft. In this configuration, the support shaft can be stably sandwiched between the bearing section and the conduction member. Accordingly, the carriage is likely to be stably supported by the support shaft.

Application Example 4

In the image reading apparatus according to the application example, the carriage includes two bearing sections, the two bearing sections are arranged having a gap therebetween along the shaft line of the support shaft, and the conduction member is positioned between the two bearing sections.

In the image reading apparatus, since the conduction member is positioned between the two bearing sections aligned along the shaft line of the support shaft, the support shaft can be supported at three locations along the shaft line. Accordingly, the support shaft can be more stably supported.

Application Example 5

In the image reading apparatus according to the application example, document mounting glass which is provided on a side opposite to the carriage side of the reading device, and which is for mounting a document on which the image read by the reading device is described; and a pressing member which is disposed between the carriage and the reading device, and which presses the reading device toward the document mounting glass, are provided, the support shaft is disposed on a side opposite to the document mounting glass side of the carriage, and the conduction member presses the support shaft toward the carriage side from the side opposite to the carriage side.

In the image reading apparatus, since the pressing member presses the reading device toward the document mounting glass, the carriage receives a reaction force from the pressing member toward the support shaft. Therefore, the support shaft receives a pressing force from one side to the opposite side via the bearing section of the carriage. On the other hand, the conduction member presses the support shaft from the side opposite to the carriage side toward the carriage side. In other words, the pressing force received by the support shaft via the bearing section of the carriage and the pressing force received from the conduction member act in directions opposite to each other. Accordingly, since the support shaft can be sandwiched between the bearing section and the conduction member, the support shaft can be more stably supported.

Application Example 6

In the image reading apparatus according to the application example, the support shaft is grounded via a frame of the image reading apparatus.

In the image reading apparatus, the support shaft can be grounded via the frame.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Figure 1:
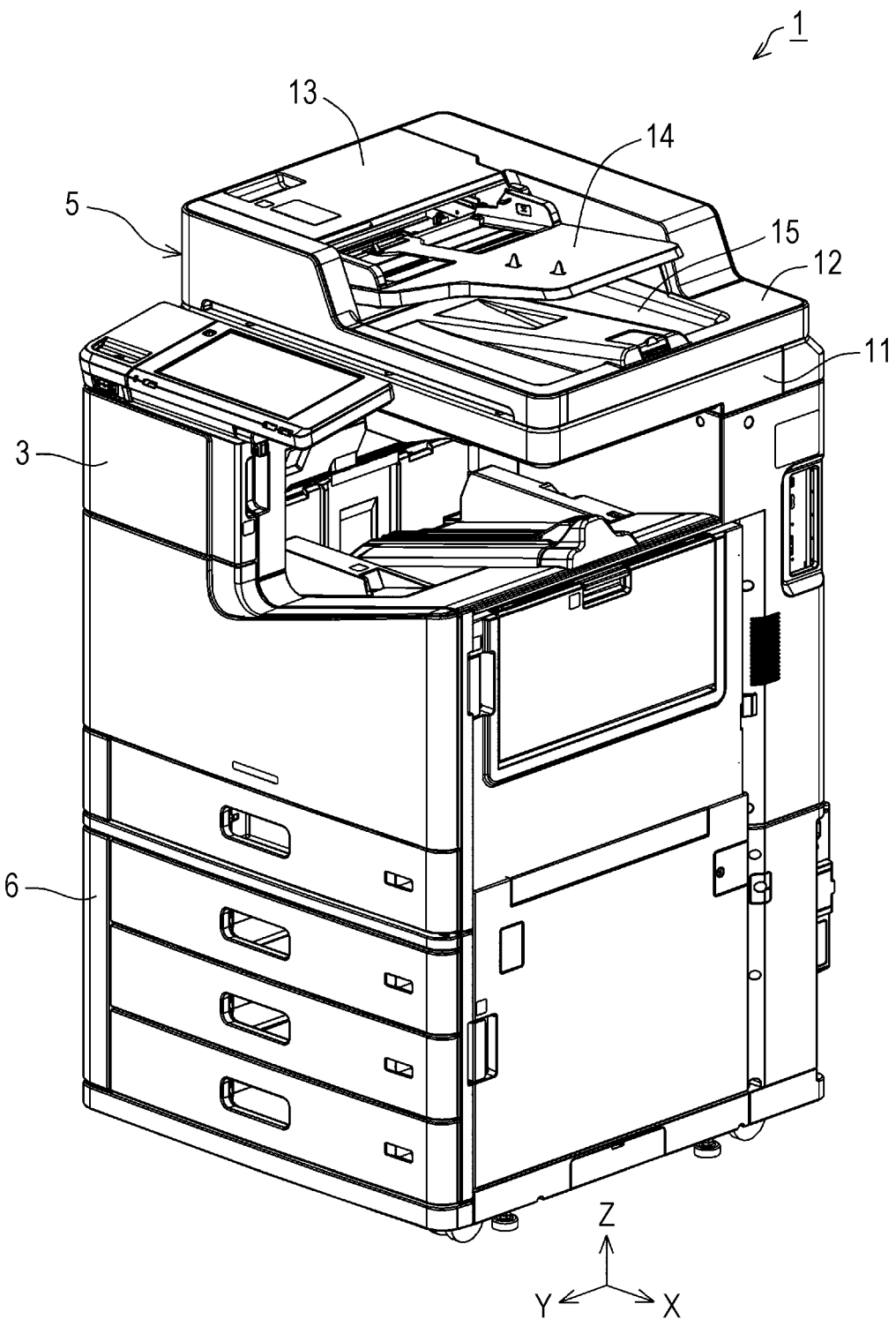
FIG. 1 is a perspective view illustrating a schematic configuration of a multifunction machine in the embodiment.

Embodiments will be described with reference to the drawings, taking a multifunction machine including a scanner unit which is an example of an image reading apparatus, as an example. In the drawings, in order to make each of the configurations to have a size to the recognizable extent, the scales of the configuration and members may vary.

In the embodiment, as illustrated in FIG. 1, a multifunction machine 1 includes a printing unit 3 which is an example of a liquid ejecting apparatus and a scanner unit 5 disposed above the printing unit 3. The printing unit 3 includes a print head which is not illustrated and a medium supply device 6. The print head is capable of ejecting ink which is an example of a liquid. The medium supply device 6 is disposed below the printing unit 3, and supplies a printing medium, such as printing paper, to the printing unit 3. The printing unit 3 can perform printing on the printing medium by ejecting the ink from the print head, toward the printing medium supplied from the medium supply device 6.

The multifunction machine 1 can be connected to a plurality of client devices, such as a Personal Computer (PC), via a network which is not illustrated. When receiving a print command from the client device, the multifunction machine 1 can perform printing on the print medium with the printing unit 3 based on the print data from the client device.

The scanner unit 5 can read characters, symbols, drawings and the like which are described on a document, as images. The scanner unit 5 can convert the read image as image data. The printing unit 3 can print an image on a printing medium based on the image data from the scanner unit 5. Accordingly, it is possible to utilize the multifunction machine 1 as a copying machine. In the embodiment, the scanner unit 5 can generate the image data as digital data. Then, the image data can be transmitted to the client device, the server or the like, via the above-described network.

Here, in FIG. 1, XYZ axes which are coordinate axes orthogonal to each other, are given. The XYZ axes are given to the drawings which will be illustrated thereafter as necessary. In this case, the XYZ axes in each of the drawings correspond to the XYZ axes in FIG. 1. In FIG. 1, a state where the multifunction machine 1 is disposed on an XY plane defined by the X axis and the Y axis, is illustrated. In the embodiment, a state when the multifunction machine 1 is disposed on the XY plane in a state where the XY plane is identical to a horizontal plane, is a use state of the multifunction machine 1. A posture of the multifunction machine 1 when the multifunction machine 1 is disposed on the XY plane identical to the horizontal plane is called a use posture of the multifunction machine 1.

Hereinafter, in a case where the X axis, the Y axis, and the Z axis are written in the drawings or in the description illustrating configuration components and units of the multifunction machine 1, the axes mean an X axis, a Y axis, and a Z axis which are in a state where the configuration components or the units thereof are incorporated (loaded) as the multifunction machine 1. In addition, the posture of each of the configuration components or the units in the use posture of the multifunction machine 1 is called the use posture of the configuration components or the units. In addition, hereinafter, in the following description of the multifunction machine 1, the configuration components, the units and the like, when there is no particular mention, explanation will be made in each of the use postures.

In addition, the horizontal plane may be a substantially horizontal plane. Substantially horizontally, for example, inclination is included within an allowable range of inclination for the surface to be mounted when the multifunction machine 1 is used. For this reason, the substantial horizontal plane is not limited to a surface, such as a surface plate formed with high accuracy. Substantially horizontally, for example, various surfaces, such as a desk, a table, a shelf, and a floor, which are mounted when multifunction machine 1 is used. In addition, a vertical direction is not strictly limited to a direction along a gravity direction, but also includes a direction perpendicular to the substantial horizontal plane. Therefore, when the substantial horizontal plane is a plane, such as a desk, a table, a shelf, and a floor, the vertical direction refers to a direction perpendicular to the planes.

The Z axis is an axis orthogonal to the XY plane. In the use state of the multifunction machine 1, the Z axis direction is a vertically upward direction. In addition, in the use state of the multifunction machine 1, in FIG. 1, a −Z axis direction is a vertically downward direction. In addition, in each of the X, Y, and Z axes, the direction of the arrow indicates a direction of + (positive), and the direction opposite to the direction of the arrow indicates the direction of − (negative). In addition, the vertically upward direction or a vertically upper part refers to an upward direction or an upper part along a vertical line. Similarly, the vertically downward direction or a vertically lower part refers to a downward direction or a lower part along a vertical line. The upward direction or the upper part which is not described as vertical is not limited to the upward direction or the upper part along the vertical line, and includes the upward direction or the upper part along the direction intersecting with the vertical line except for the horizontal direction. In addition, the downward direction or the lower part which is not described as vertical is not limited to the downward direction or the lower part along the vertical line, and includes the downward direction or the lower part along the direction intersecting with the vertical line except for the horizontal direction. In other words, the upward direction or the upper part is a direction including a component in a vertically upward direction in a direction intersecting with the vertical line. Similarly, the downward direction or the lower part is a direction including a component in a vertically downward direction in a direction intersecting with the vertical line.

As illustrated in FIG. 1, the scanner unit 5 includes a first reading device 11 and a second reading device 12. The first reading device 11 is positioned on the Z axis direction side of the printing unit 3. The second reading device 12 is positioned on the Z axis direction side of the first reading device 11. The second reading device 12 has a document supply unit 13. The document supply unit 13 supplies the document mounted on a document mounting tray 14 into the second reading device 12. The second reading device 12 incorporates an image sensor which is not illustrated therein. The second reading device 12 reads the document supplied by the document supply unit 13 as an image obtained by the image sensor. In addition, the second reading device 12 discharges the document from which the image has been read to a document discharge tray 15. In this manner, the second reading device 12 can automatically read the image from the document.

Figure 2:
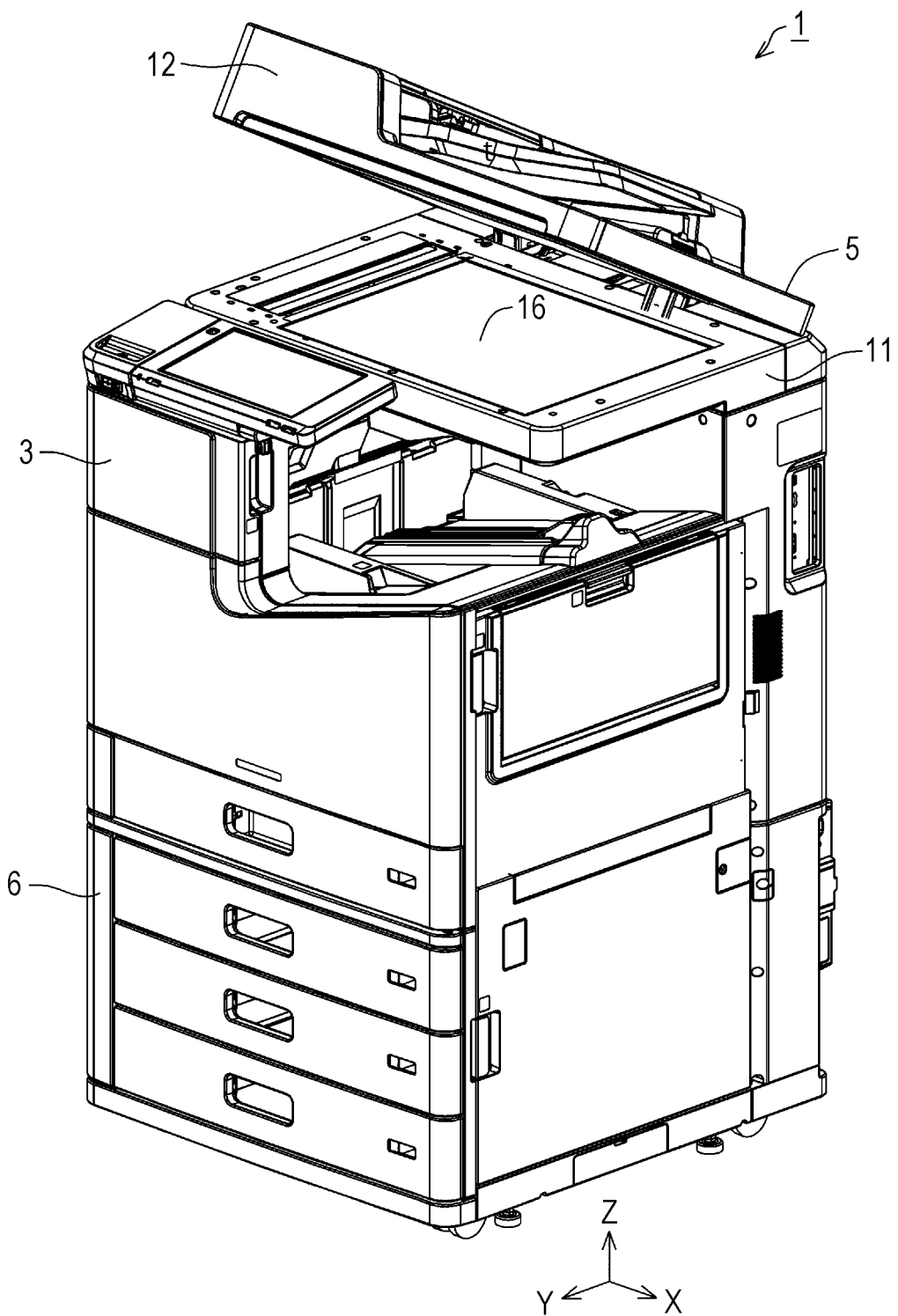
FIG. 2 is a perspective view illustrating a schematic configuration of the multifunction machine in the embodiment.

As illustrated in FIG. 2, the second reading device 12 is configured to be rotatable with respect to the first reading device 11. The second reading device 12 is configured to be rotatable around a rotation axis that extends along the X axis. An operator can rotate the second reading device 12 with respect to the first reading device 11 by lifting the second reading device 12 in the Z axis direction. Accordingly, the second reading device 12 can be opened with respect to the first reading device 11. When the second reading device 12 is opened with respect to the first reading device 11, a document mounting surface 16 is exposed. In FIG. 2, a state in which the second reading device 12 is opened with respect to the first reading device 11 is illustrated.

The first reading device 11 is a flat bed type scanner and includes a contact image sensor (to be described later). The first reading device 11 can read characters, symbols, drawings and the like which are described on the document mounted on the document mounting surface 16, as images. The first reading device 11 can convert the read image as image data. The operator can mount the document on the document mounting surface 16 in a state where the second reading device 12 is open with respect to the first reading device 11.

In addition, in a state where the second reading device 12 is closed with respect to the first reading device 11, that is, in a state where the document is nipped between the document mounting surface 16 and the second reading device 12, the operator can allow the first reading device 11 to be operated. Accordingly, the contact image sensor provided further on the −Z axis direction side than the document mounting surface 16 scans the document, and thereby, the image is read. As described above, the second reading device 12 also functions as a document cover which covers the document mounting surface 16.

Figure 3:
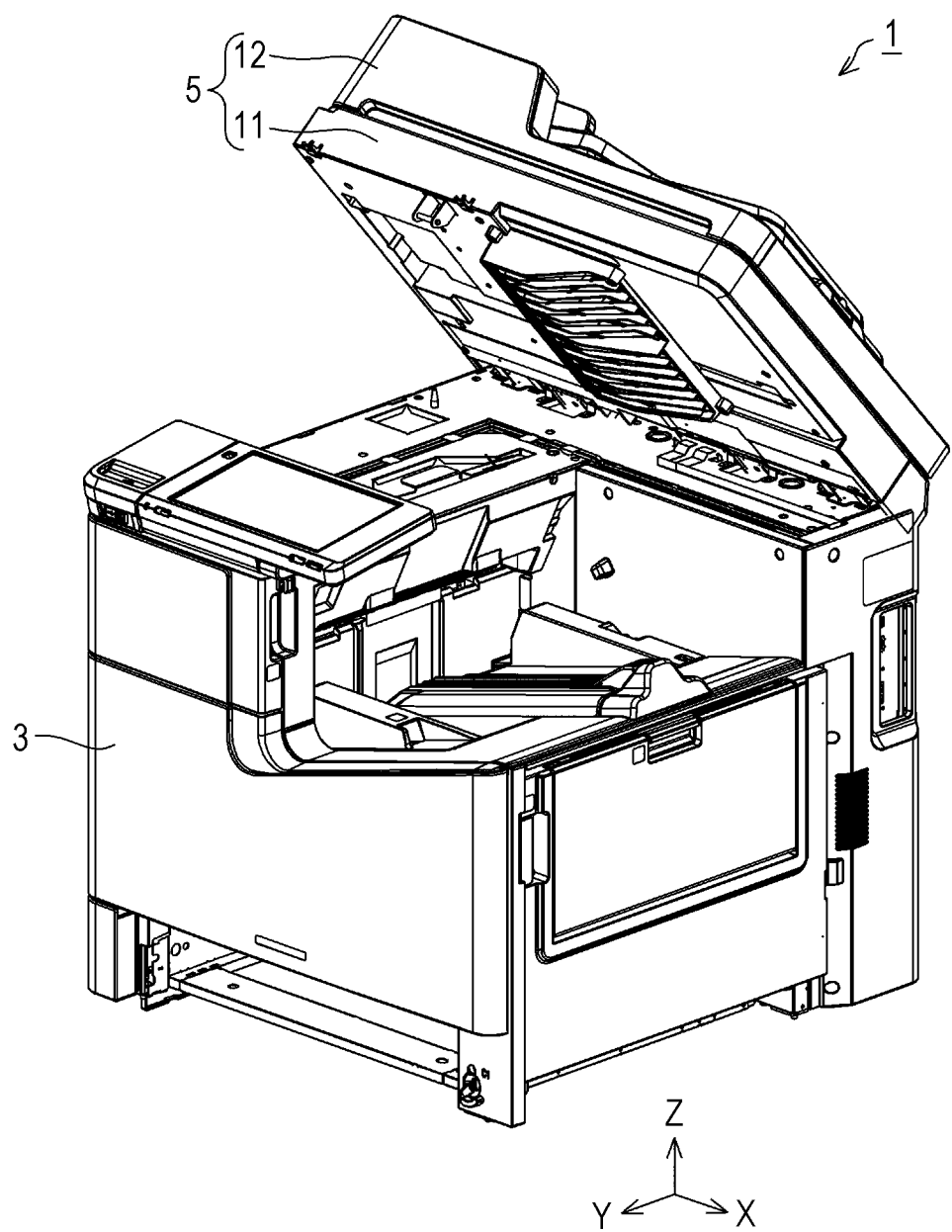
FIG. 3 is a perspective view illustrating a schematic configuration of the multifunction machine according to the embodiment.

In addition, in the multifunction machine 1, as illustrated in FIG. 3, the first reading device 11 is configured to be rotatable with respect to the printing unit 3. In other words, in the multifunction machine 1, the scanner unit 5 can be rotated with respect to the printing unit 3. In FIG. 3, illustration of the medium supply device 6 is omitted. The first reading device 11 is configured to be rotatable around a rotation axis that extends along the X axis. The worker can rotate the first reading device 11 with respect to the printing unit 3 by lifting the first reading device 11 in the Z axis direction.

Accordingly, the first reading device 11 can be opened to the printing unit 3. In other words, in the multifunction machine 1, the scanner unit 5 can be opened with respect to the printing unit 3. When the first reading device 11 is opened with respect to the printing unit 3, the operator can access the inside of the printing unit 3. Accordingly, the printing unit 3 can be maintained. Examples of the maintenance work of the printing unit 3 include cleaning of the inside of the printing unit 3, replacement of configuration components, and the like. In the multifunction machine 1, since the scanner unit 5 is rotatable with respect to the printing unit 3, it is easy to access the inside of the printing unit 3.

Figure 4:
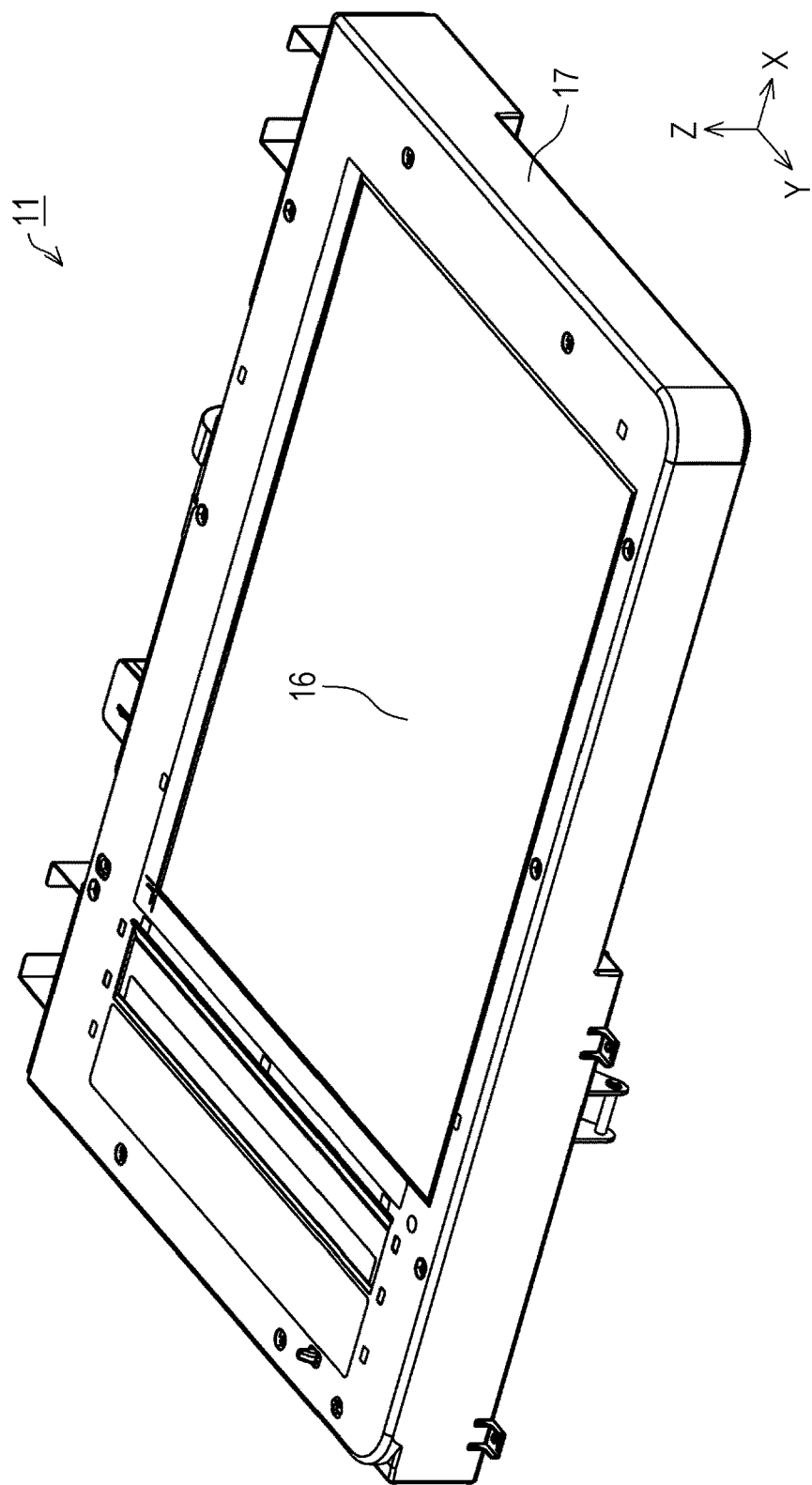
FIG. 4 is a perspective view illustrating a schematic configuration of a first reading device in the embodiment.
Figure 5:
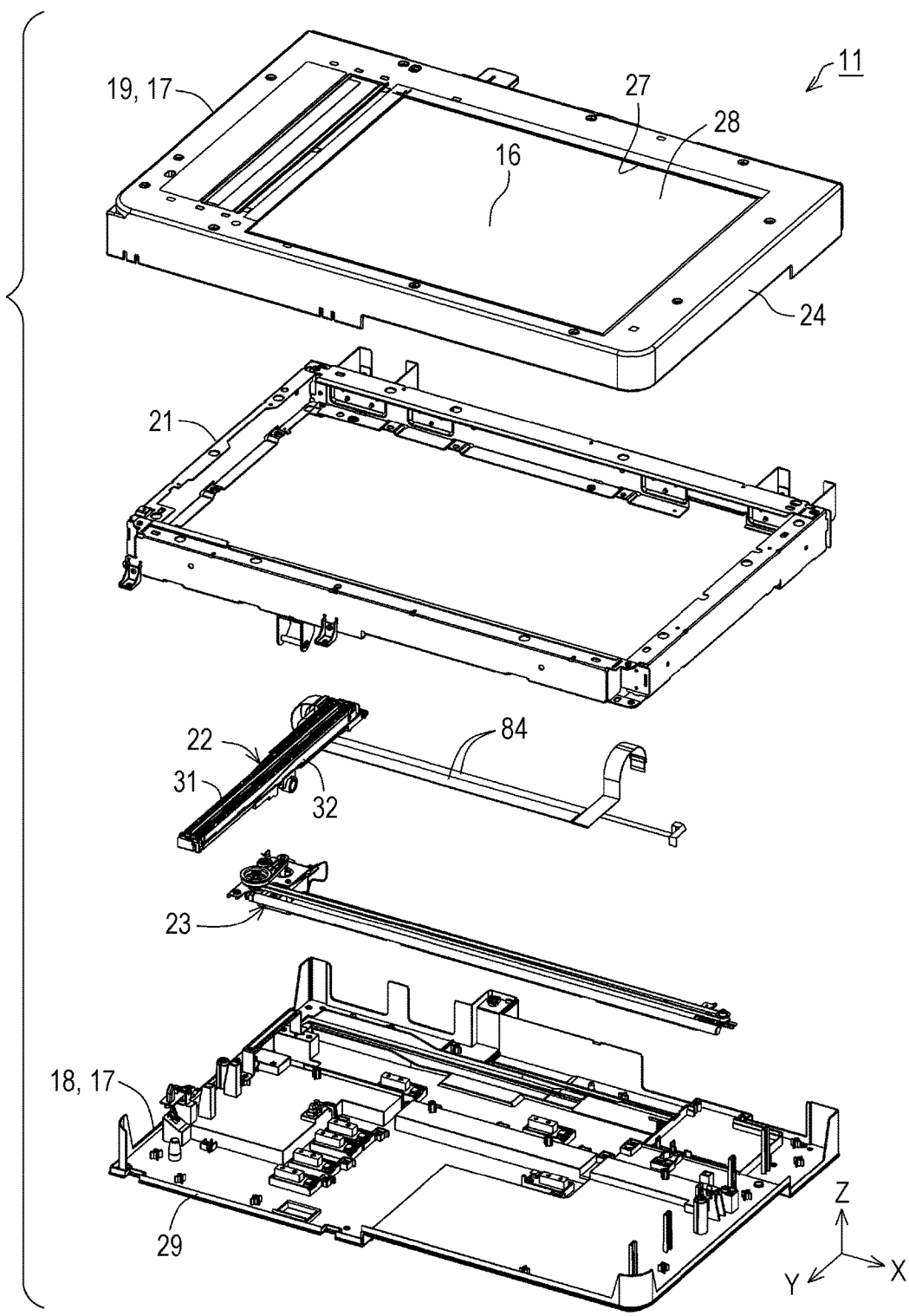
FIG. 5 is an exploded perspective view illustrating a schematic configuration of the first reading device in the embodiment.

As illustrated in FIG. 4, the first reading device 11 has a housing 17. The housing 17 configures an outer shell of the first reading device 11. The above-described document mounting surface 16 configures a part of an outer surface of the housing 17. The outer surface of the housing 17 is a surface of the housing 17 facing the outside. As illustrated in FIG. 5, the housing 17 includes a first case unit 18 and a second case unit 19. By combining the first case unit 18 and the second case unit 19 with each other, the housing 17 is configured. When the first case unit 18 and the second case unit 19 are combined as the housing 17, a space is formed on the inside of the housing 17.

In the housing 17 configured by the first case unit 18 and the second case unit 19, gaps, openings, and the like which communicate with the space on the inside of the housing 17 may exist. In other words, the space formed on the inside of the housing 17 may be tightly sealed or may not be tightly sealed. When the first case unit 18 and the second case unit 19 are combined as the housing 17, a gap may be formed between the first case unit 18 and the second case unit 19. In the housing 17, a gap formed between the first case unit 18 and the second case unit 19 is expressed as a space.

The first reading device 11 includes a frame 21, a reading unit 22, and a driving mechanism 23 on the inside of the housing 17. The frame 21 is formed of metal, such as iron or aluminum, and is configured in a frame shape. Each of the first case unit 18 and the second case unit 19 has a size and a shape to cover a region on an inner side of the frame-like frame 21 when viewed in a plan view in the −Z axis direction. Accordingly, the region on the inner side of the frame-like frame 21 is surrounded by the first case unit 18 and the second case unit 19. In addition, the frame 21 has conductivity and is grounded to a ground potential.

Here, the second case unit 19 includes a case body 24. The case body 24 is formed of a synthetic resin. In the case body 24, a window portion 27 is formed. The window portion 27 is provided as an opening formed in the case body 24. When the first reading device 11 is viewed in a plan view in the −Z axis direction, the window portion 27 is positioned on an inner side of the region surrounded by the frame-like frame 21. In the embodiment, the window portion 27 is blocked by a glass 28. Accordingly, when the first reading device 11 is viewed in a plan view in the −Z axis direction, it is possible to visually recognize the region on the inner side of the frame 21 through the glass 28. The glass 28 is an example of document mounting glass. The surface of the glass 28 facing the Z axis direction corresponds to the document mounting surface 16.

The first case unit 18 includes a case body 29. The case body 29 is formed of a synthetic resin and is configured to mount the frame 21 thereon. When the first case unit 18 and the second case unit 19 are combined with each other as the housing 17 in a state where the frame 21 is mounted on the case body 29, the space in the region surrounded by the frame-like frame 21 on the inside of the housing 17, is formed. In the space, the reading unit 22 or the driving mechanism 23 are disposed. In the first reading device 11, it is possible to reinforce the housing 17 by the frame 21. In addition, since the reading unit 22 or the driving mechanism 23 is disposed in the housing 17 reinforced by the frame 21, the reading unit 22 or the driving mechanism 23 is easily protected by the housing 17.

Figure 6:
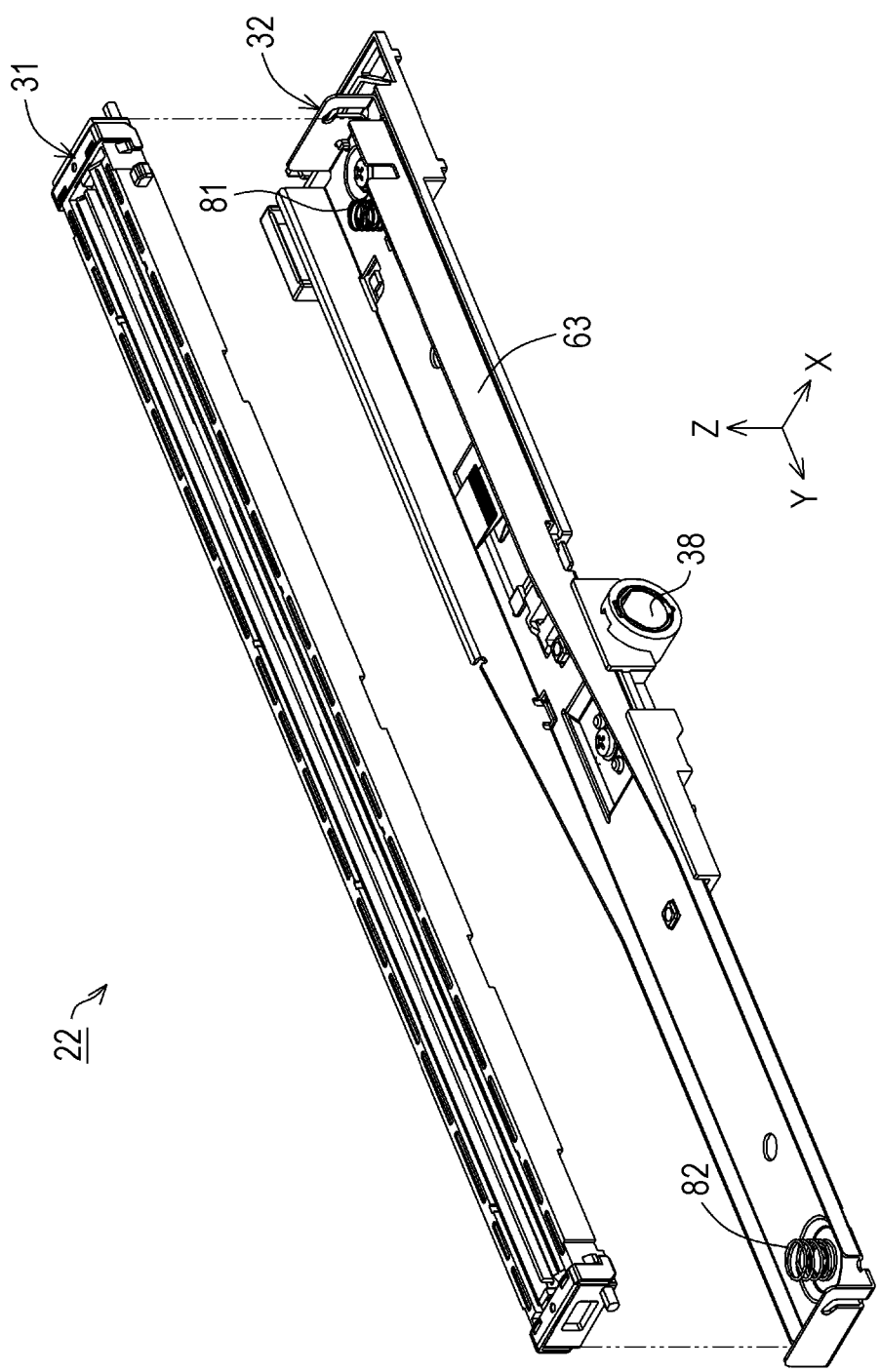
FIG. 6 is a perspective view illustrating a schematic configuration of a reading unit in the embodiment.

As illustrated in FIG. 6, the reading unit 22 includes a sensor module 31 which is an example of a reading device, and a carriage 32. The sensor module 31 includes the contact image sensor. In the first reading device 11, an image is read from the document via the contact image sensor. The contact image sensor has a configuration in which a plurality of image sensor elements (not illustrated) are aligned in a shape of a line. In the embodiment, the plurality of image sensor elements are arranged along the Y axis.

Therefore, the Y axis direction can be defined when a direction in which the plurality of image sensor elements are arranged. In addition, the sensor module 31 extends along the Y axis where the plurality of image sensor elements are arranged. In addition to the contact image sensor, the sensor module 31 includes a light emitting diode (LED) as lighting, wiring for transmitting power and data, a wiring substrate, and the like.

Figure 7:
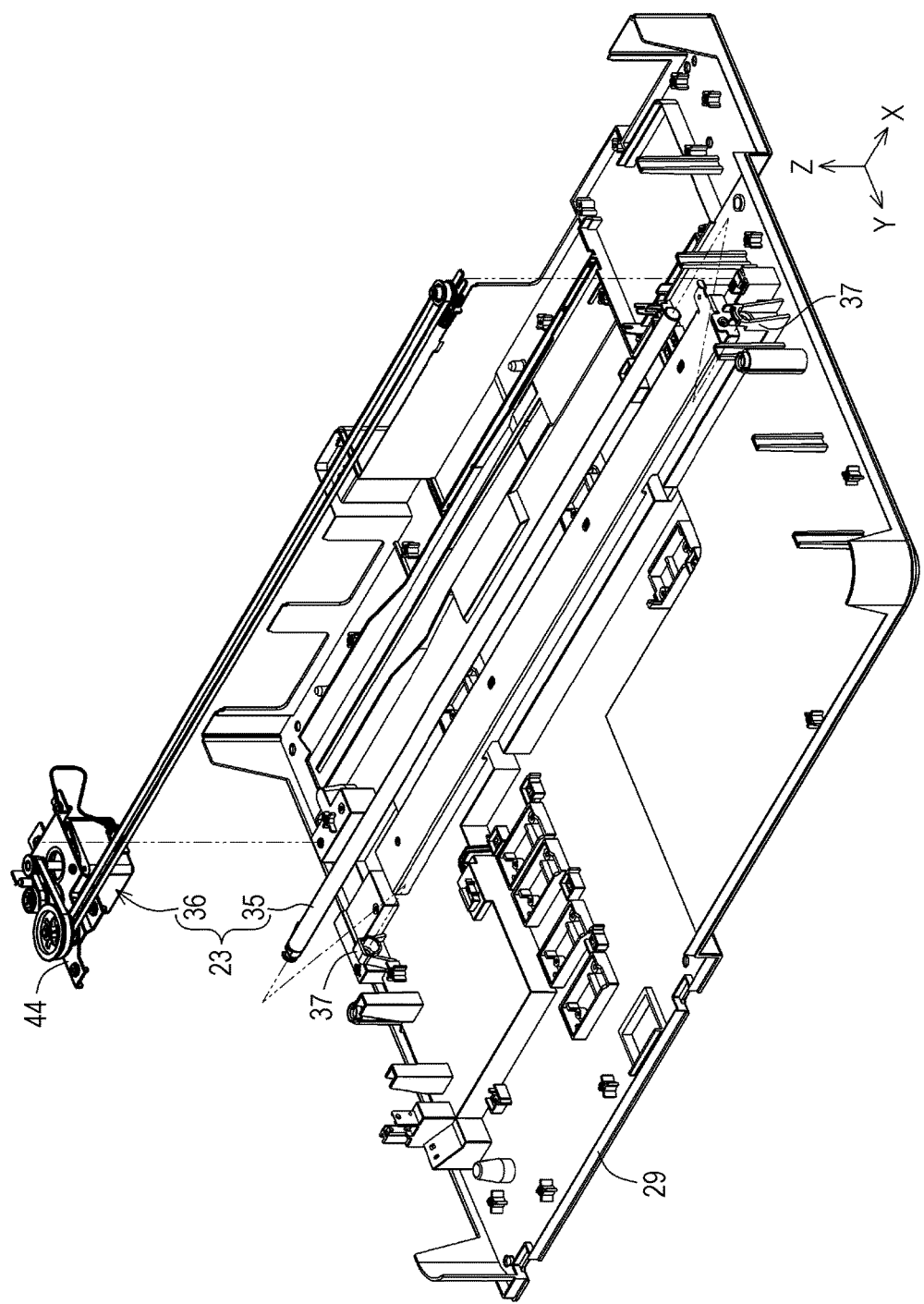
FIG. 7 is an exploded perspective view illustrating a case body and a driving mechanism in the embodiment.

The sensor module 31 is loaded on the carriage 32. The carriage 32 has a structure which is capable of receiving the sensor module 31. The carriage 32 is configured to be able to reciprocate along the X axis in a state where the sensor module 31 is loaded. The movement of the carriage 32 can be realized by the driving mechanism 23 illustrated in FIG. 5. As illustrated in FIG. 7, the driving mechanism 23 is installed in the case body 29. The driving mechanism 23 includes a support shaft 35 and a transmission unit 36.

The support shaft 35 is formed of a metal material and has conductivity. The support shaft 35 is supported by a support section 37 of the case body 29. The support section 37 is formed of a synthetic resin and is formed to be integrated with the case body 29. The support section 37 is provided projecting from the case body 29 in the Z axis direction. The support shaft 35 is supported by the support section 37 in a state of floating in the Z axis direction from the case body 29. Here, the conductive support shaft 35 is supported by the case body 29 formed of a synthetic resin having high insulation properties. Therefore, the support shaft 35 and the case body 29 are electrically insulated from each other.

Figure 8:
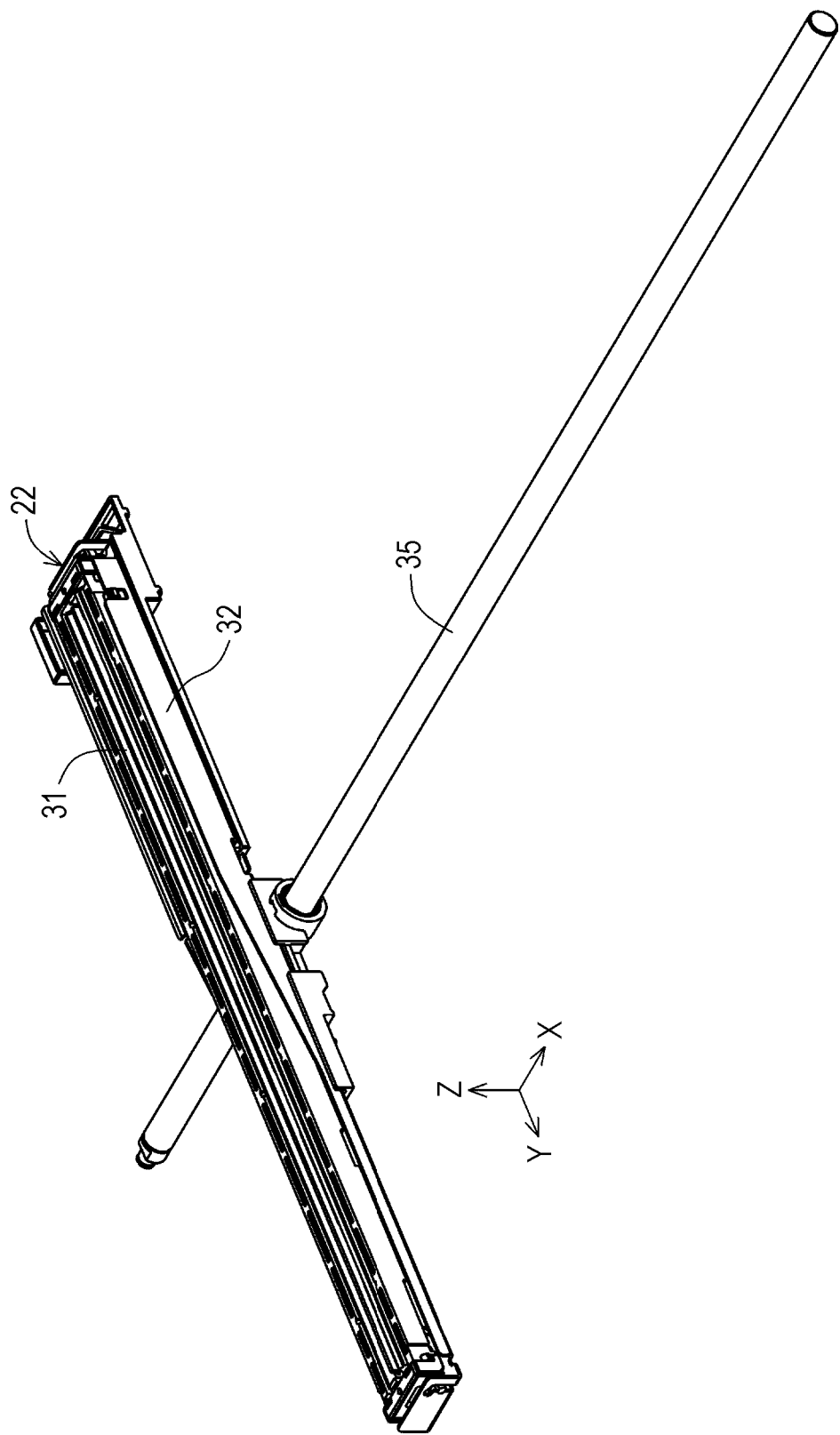
FIG. 8 is a perspective view illustrating the reading unit and a support shaft in the embodiment.

The support shaft 35 extends along the X axis. Therefore, the X axis direction can be defined as a direction in which the support shaft 35 extends. Here, as illustrated in FIG. 6, the carriage 32 is provided with a through-hole 38 through which the support shaft 35 can be inserted. By inserting the support shaft 35 into the through-hole 38, the carriage 32 can be supported by the support shaft 35 as illustrated in FIG. 8. The carriage 32 is configured to be slidable along the X axis in a state of being supported by the support shaft 35. In other words, the scanner unit 5 includes a support shaft 35 that supports the carriage 32 so as to be slidable.

Figure 9:
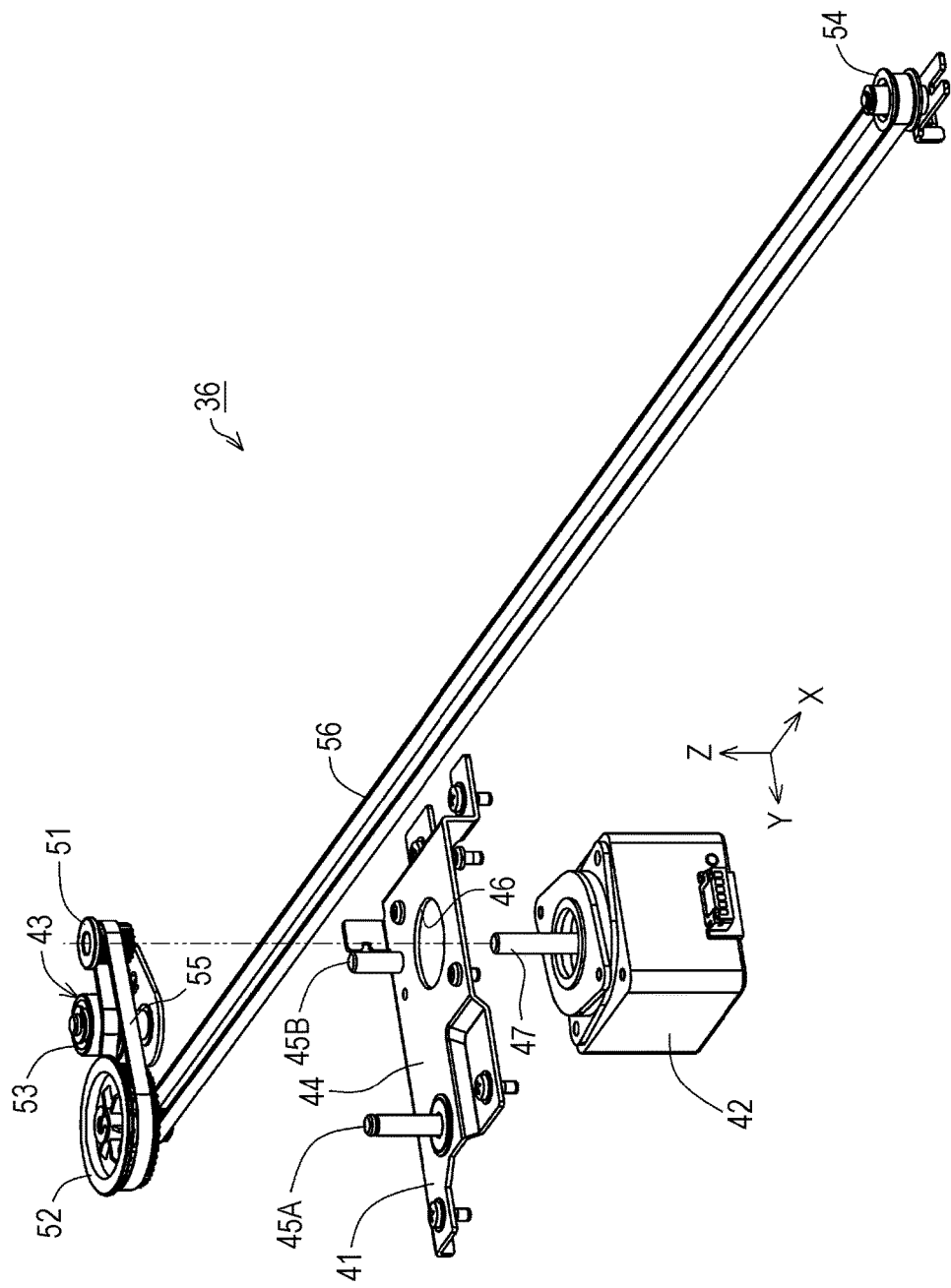
FIG. 9 is an exploded perspective view illustrating a transmission unit in the embodiment.

As illustrated in FIG. 9, the transmission unit 36 includes a frame unit 41, a motor 42, and a belt unit 43. The frame unit 41 includes frame sheet metal 44, a pulley shaft 45A, and a pulley shaft 45B. The frame sheet metal 44 is configured of metal sheet metal, and is fixed to the case body 29 (FIG. 7) with screws. As illustrated in FIG. 9, the pulley shaft 45A and the pulley shaft 45B are press-fitted and fixed to the frame sheet metal 44, and protrude in the Z axis direction from the frame sheet metal 44. In addition, a through-hole 46 is formed in the frame sheet metal 44. In addition, the frame sheet metal 44 has conductivity and is grounded to the ground potential via the frame 21 (FIG. 5). Further, the above-described support shaft 35 is connected to the frame sheet metal 44 via a conduction member (not illustrated). Therefore, the support shaft 35 is grounded to the ground potential via the frame sheet metal 44 and the frame 21 (FIG. 5).

As illustrated in FIG. 9, the motor 42 is disposed on the −Z axis direction side of the frame sheet metal 44. The motor 42 is fixed to the frame sheet metal 44 with screws. The motor 42 includes a rotating shaft 47. The rotating shaft 47 is inserted into the through-hole 46 of the frame sheet metal 44. In a state where the rotating shaft 47 of the motor 42 is inserted into the through-hole 46 of the frame sheet metal 44, the motor 42 and the frame sheet metal 44 are fixed to each other with screws. At this time, a gap is held between the case body 29 (FIG. 7) and the motor 42. In other words, the motor 42 is in a state of being suspended from the frame sheet metal 44. When the motor 42 is fixed to the frame sheet metal 44, the rotating shaft 47 protrudes from the through-hole 46 in the Z axis direction of the frame sheet metal 44. In other words, in a state where the rotating shaft 47 of the motor 42 protrudes in the Z axis direction from the frame sheet metal 44, the motor 42 and the frame sheet metal 44 are fixed to each other with screws.

As illustrated in FIG. 9, the belt unit 43 includes a motor pulley 51, a driving pulley 52, a tension pulley 53, a driven pulley 54, a first belt 55, and a second belt 56. The motor pulley 51 is press-fitted to the rotating shaft 47 of the motor 42. The motor pulley 51 rotates as the rotating shaft 47 of the motor 42 rotates. The driving pulley 52 is inserted into the pulley shaft 45A and is configured to be rotatable around the pulley shaft 45A. The tension pulley 53 is inserted into the pulley shaft 45B and is configured to be rotatable around the pulley shaft 45B.

A first belt 55 is bridged between the motor pulley 51 and the driving pulley 52. The first belt 55 is configured by a timing belt. Each of the motor pulley 51 and the driving pulley 52 is formed with teeth with which a timing belt meshes. In this configuration, when the rotating shaft 47 of the motor 42 rotates, power is transmitted from the motor pulley 51 to the driving pulley 52 via the first belt 55. The tension pulley 53 abuts against the outer periphery of the first belt 55 and applies tension to the first belt 55. Accordingly, it is possible to suppress looseness of the first belt 55, and to increase a winding angle.

The driven pulley 54 is positioned on the X axis direction side of the driving pulley 52. In other words, the driving pulley 52 and the driven pulley 54 are arranged along the X axis with each other. A second belt 56 is bridged between the driving pulley 52 and the driven pulley 54. The second belt 56 is configured by a timing belt. Each of the driving pulley 52 and the driven pulley 54 is formed with teeth with which the timing belt meshes. In this configuration, when the driving pulley 52 rotates, power is transmitted from the driving pulley 52 to the driven pulley 54 via the second belt 56. Accordingly, by driving the motor 42, it is possible to rotate the second belt 56 in forward and reverse directions.

Figure 10:
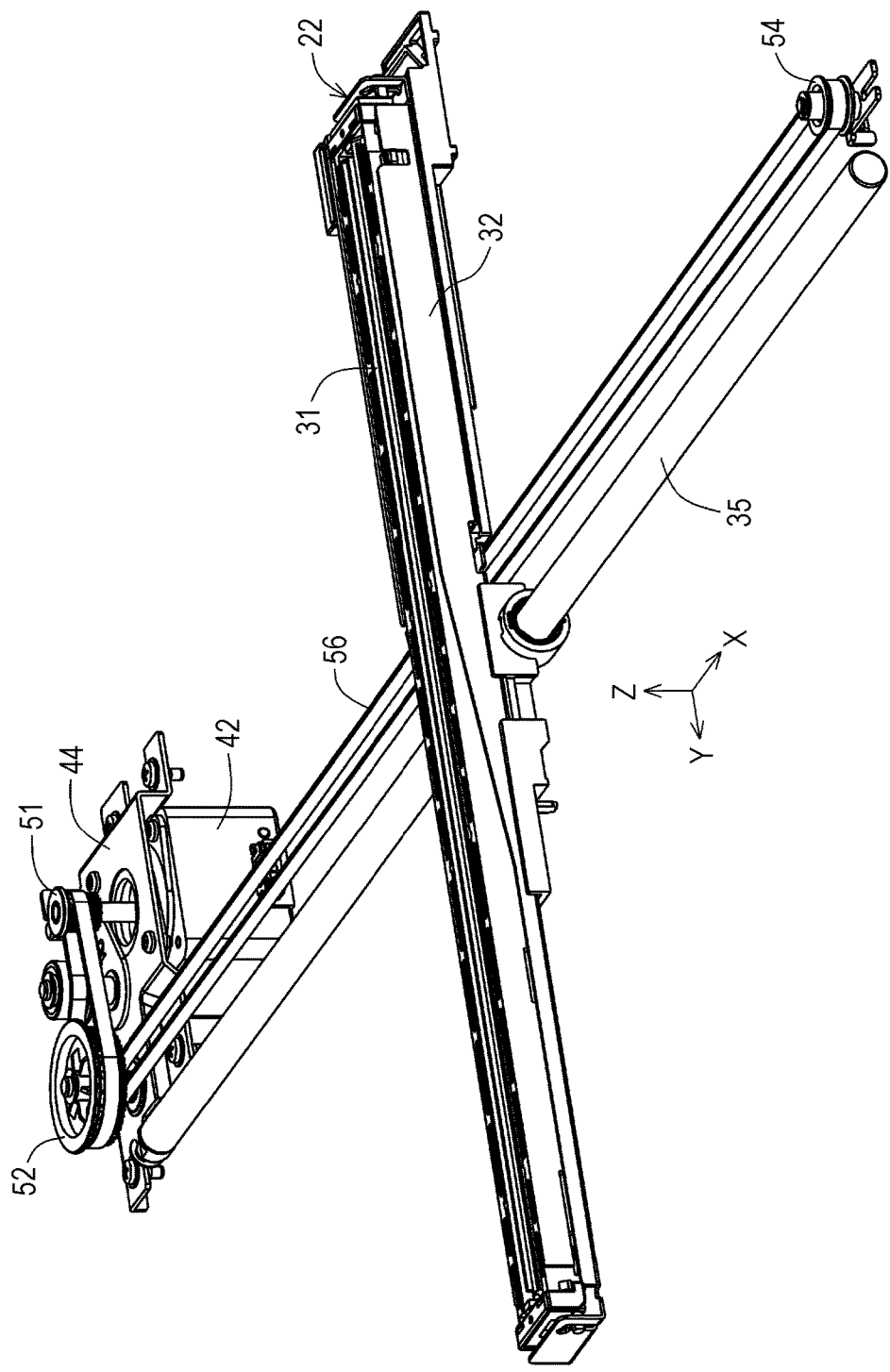
FIG. 10 is a perspective view illustrating the reading unit and the driving mechanism in the embodiment.

In addition, as illustrated in FIG. 10, the carriage 32 is linked to the second belt 56. In this configuration, by driving the motor 42, it is possible to allow the carriage 32 to reciprocate along the X axis via the second belt 56. In the above-described configuration, while moving the sensor module 31 over the document mounting surface 16 illustrated in FIG. 5, it is possible to read an image from the document mounted on the document mounting surface 16 through the glass 28 via the contact image sensor.

Figure 11:
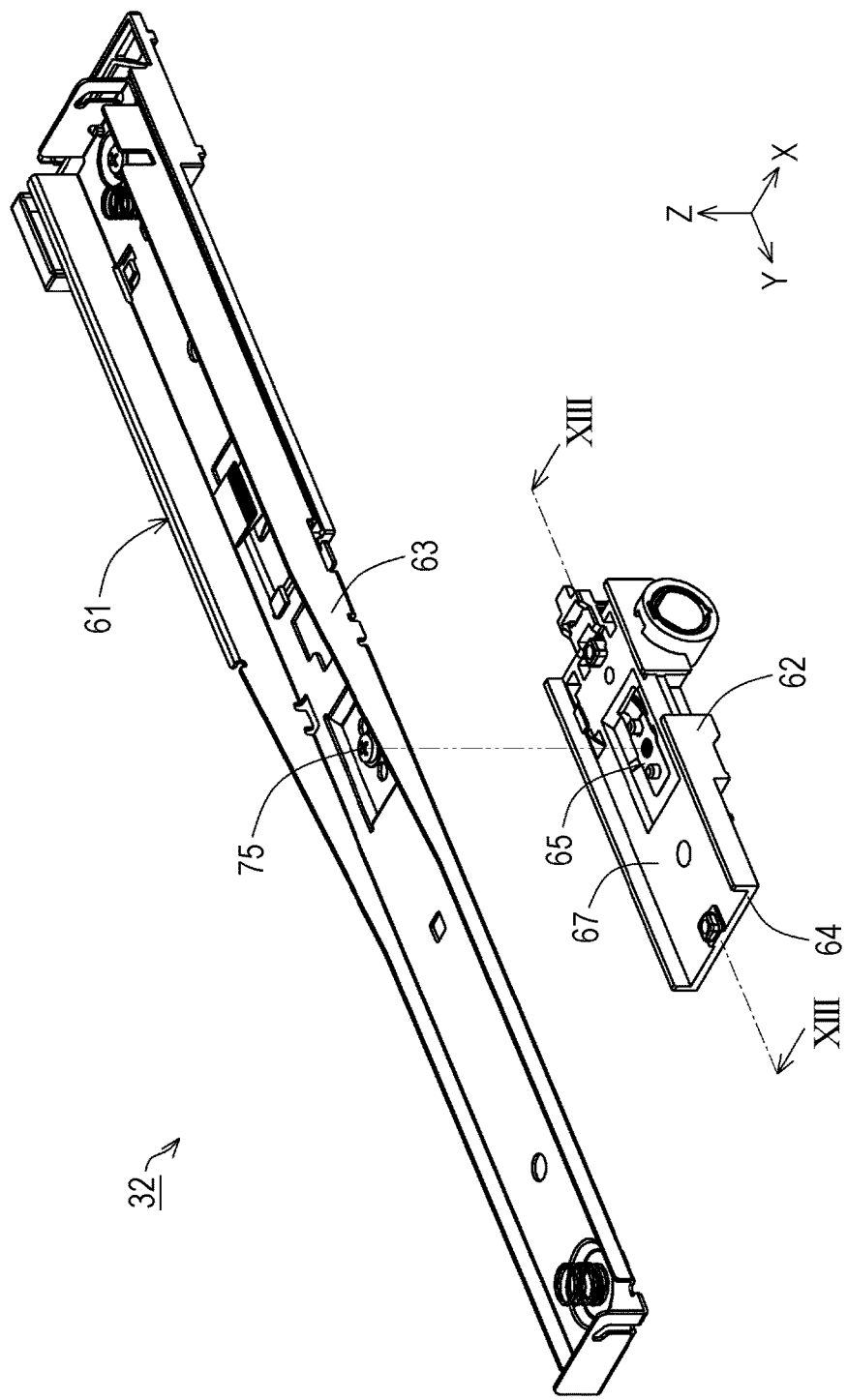
FIG. 11 is an exploded perspective view illustrating a carriage in the embodiment.

As illustrated in FIG. 11, the carriage 32 includes a case unit 61 and a support unit 62. The case unit 61 includes a case sheet metal 63. The case sheet metal 63 has the size and the shape by which the sensor module 31 (FIG. 6) can be received. The sensor module 31 extends along the Y axis. Therefore, the case sheet metal 63 also extends along the Y axis. The case sheet metal 63 is formed of metal sheet metal. The case sheet metal 63 has conductivity. The sensor module 31 is loaded on the case sheet metal 63 of the carriage 32.

As illustrated in FIG. 11, the case unit 61 is disposed on the Z axis direction side of the support unit 62. In the embodiment, the case unit 61 is loaded on the Z axis direction side of the support unit 62. In other words, the support unit 62 can be expressed while supporting the sensor module 31 (FIG. 6) via the case unit 61. In the embodiment, the size of the carriage 32 is reduced by employing the metal case sheet metal 63. Since the case sheet metal 63 which is a part of the carriage 32 is configured of metal, it is easy to increase the rigidity or accuracy of the carriage 32. Accordingly, it is possible to make it easy to reduce the size of the carriage 32.

Figure 12:
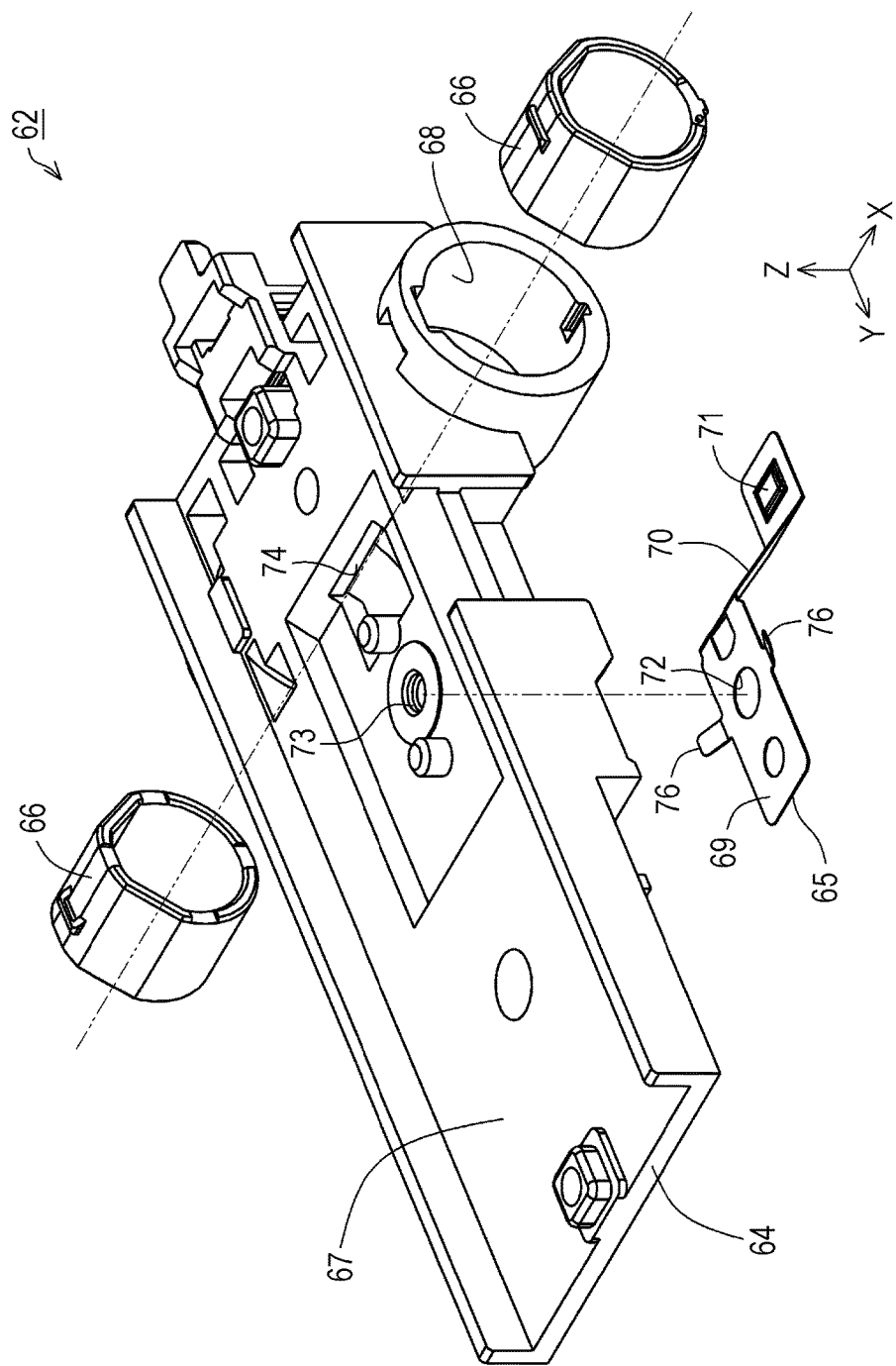
FIG. 12 is an exploded perspective view illustrating a support unit in the embodiment.

As illustrated in FIG. 12, the support unit 62 includes a support frame 64, a conduction member 65, and two bearing sections 66. The support frame 64 is formed of a synthetic resin, and includes a mounting section 67 on which the case sheet metal 63 (FIG. 11) is mounted and an insertion section 68 into which the bearing section 66 is inserted. The bearing section 66 is formed of a synthetic resin and is inserted into the insertion section 68 of the support frame 64. The bearing section 66 is fixed to the support frame 64 in a state of being inserted into the insertion section 68. In addition, the support shaft 35 (FIG. 10) is inserted into the bearing section 66 fixed to the support frame 64.

In addition, a configuration in which the support frame 64 and the bearing section 66 are formed to be integrated with each other, is employed. According to the configuration, it is possible to reduce the number of components. In the embodiment, the support frame 64 and the bearing section 66 are separated from each other. According to the configuration, for example, a synthetic resin having high rigidity is employed as a material of the support frame 64, and a synthetic resin having excellent slidability with the support shaft 35 can be employed as a material of the bearing section 66. Accordingly, it is possible to make it easy to improve the slidability between the bearing section 66 and the support shaft 35 while increasing the rigidity of the support frame 64. As a synthetic resin having excellent slidability with the support shaft 35, for example, a polyacetal resin and the like can be employed. In addition, as a synthetic resin having high rigidity as a material of the support frame 64, for example, a polyphenylene ether resin and the like can be employed.

The conduction member 65 illustrated in FIG. 12 is configured of a metal sheet metal member. The conduction member 65 has conductivity. The conduction member 65 has a configuration in which a plate-shaped sheet metal member is bent in a stepwise manner. The conduction member 65 includes a base portion 69 which extends along the XY plane, a falling portion 70 which falls downward from the base portion 69, and an abutting portion 71 which extends from the falling portion 70 in the −Y axis direction. The falling portion 70 falls downward from an end portion in the −Y axis direction of the base portion 69. The abutting portion 71 extends in the −Y axis direction from the end portion in the −Z axis direction of the falling portion 70. An opening portion 72 is formed in the base portion 69. The opening portion 72 penetrates the base portion 69.

A screw hole 73 and a through-hole 74 are formed in the mounting section 67 of the support frame 64. The abutting portion 71 and the falling portion 70 of the conduction member 65 are inserted into the through-hole 74 of the support frame 64 from the Z axis direction side. At this time, the base portion 69 is mounted on the mounting section 67 of the support frame 64. At this time, the screw hole 73 of the support frame 64 is exposed via the opening portion 72 of the conduction member 65. In addition, as illustrated in FIG. 11, the case sheet metal 63 and the support frame 64 are fixed by a screw 75 in a state where the case sheet metal 63 of the case unit 61 is mounted, on the Z axis direction side of the mounting section 67 while nipping the conduction member 65.

At this time, the base portion 69 (FIG. 12) of the conduction member 65 is sandwiched between the support frame 64 and the case sheet metal 63 (FIG. 11). Accordingly, the case sheet metal 63 and the conduction member 65 abut against each other. Here, in the conduction member 65, as illustrated in FIG. 12, a base portion abutting portion 76 is provided on the base portion 69. The base portion abutting portion 76 extends upward from the base portion 69. In other words, the base portion abutting portion 76 extends from the base portion 69 toward the case sheet metal 63 (FIG. 11) side. Accordingly, it is possible to make it easy to reliably bring the case sheet metal 63 and the conduction member 65 into contact with each other.

Figure 13:
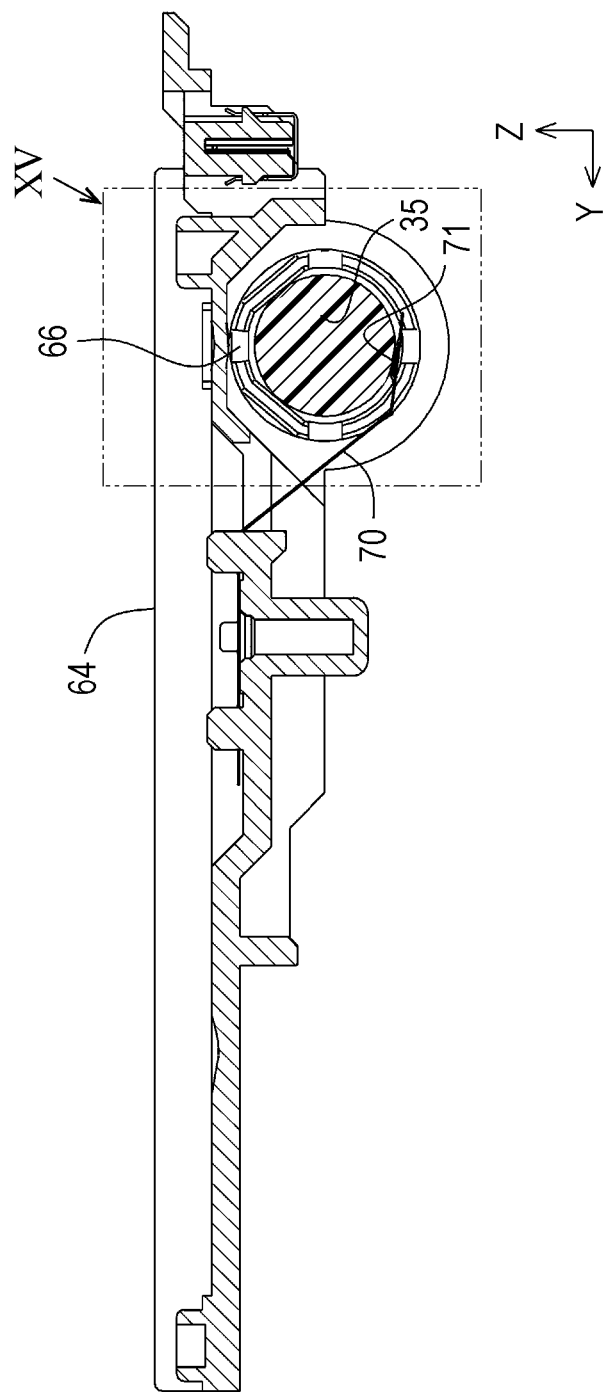
FIG. 13 is a sectional view taken along the line XIII-XIII in FIG. 11.

In addition, as illustrated in FIG. 13 which is a sectional view taken along the line XIII-XIII in FIG. 11, the abutting portion 71 abuts against the −Z axis direction side of the support shaft 35. Accordingly, the case sheet metal 63 and the support shaft 35 can be connected via the conduction member 65. As described above, the support shaft 35 is grounded to the ground potential via the frame sheet metal 44 (FIG. 10) having conductivity. In addition, the support shaft 35 is connected to the case sheet metal 63 via a conduction member 65. Therefore, the case sheet metal 63 is grounded to the ground potential via the conduction member 65, the support shaft 35, and the frame sheet metal 44.

Here, in the embodiment, the metal case sheet metal 63 is employed as a part of the carriage 32. Accordingly, it is possible to make it easy to reduce the size of the scanner unit 5. On the other hand, the bearing section 66 employs a synthetic resin. Accordingly, the costs of bearing section 66 are easily reduced the costs compared to metal. Therefore, in the embodiment, it is possible to easily reduce the size and costs of the scanner unit 5.

However, in this configuration, the case sheet metal 63 having conductivity is likely to be in a state of being electrically insulated from the support shaft 35 (also expressed in the electrically floating state) by the bearing section 66 having electrical insulation properties. Therefore, in this configuration, the carriage 32 is easily charged. The static electricity charged on the carriage 32 may be discharged due to various reasons. At this time, the noise is likely to be generated in an output signal from the image sensor due to the discharge. As a result, the quality of the image read from the document is likely to deteriorate.

In response to such a problem, in the embodiment, a configuration in which the case sheet metal 63 and the support shaft 35 are connected to each other via the conduction member 65, is employed. Therefore, in the embodiment, the conductive case sheet metal 63 of the carriage 32 is grounded to the ground potential via the conduction member 65 and the support shaft 35. Accordingly, static electricity generated in the carriage 32 can be eliminated. As a result, since the influence of static electricity on the image sensor can be suppressed so as to be low, it is possible to make the quality of the read image to deteriorate.

Figure 14:
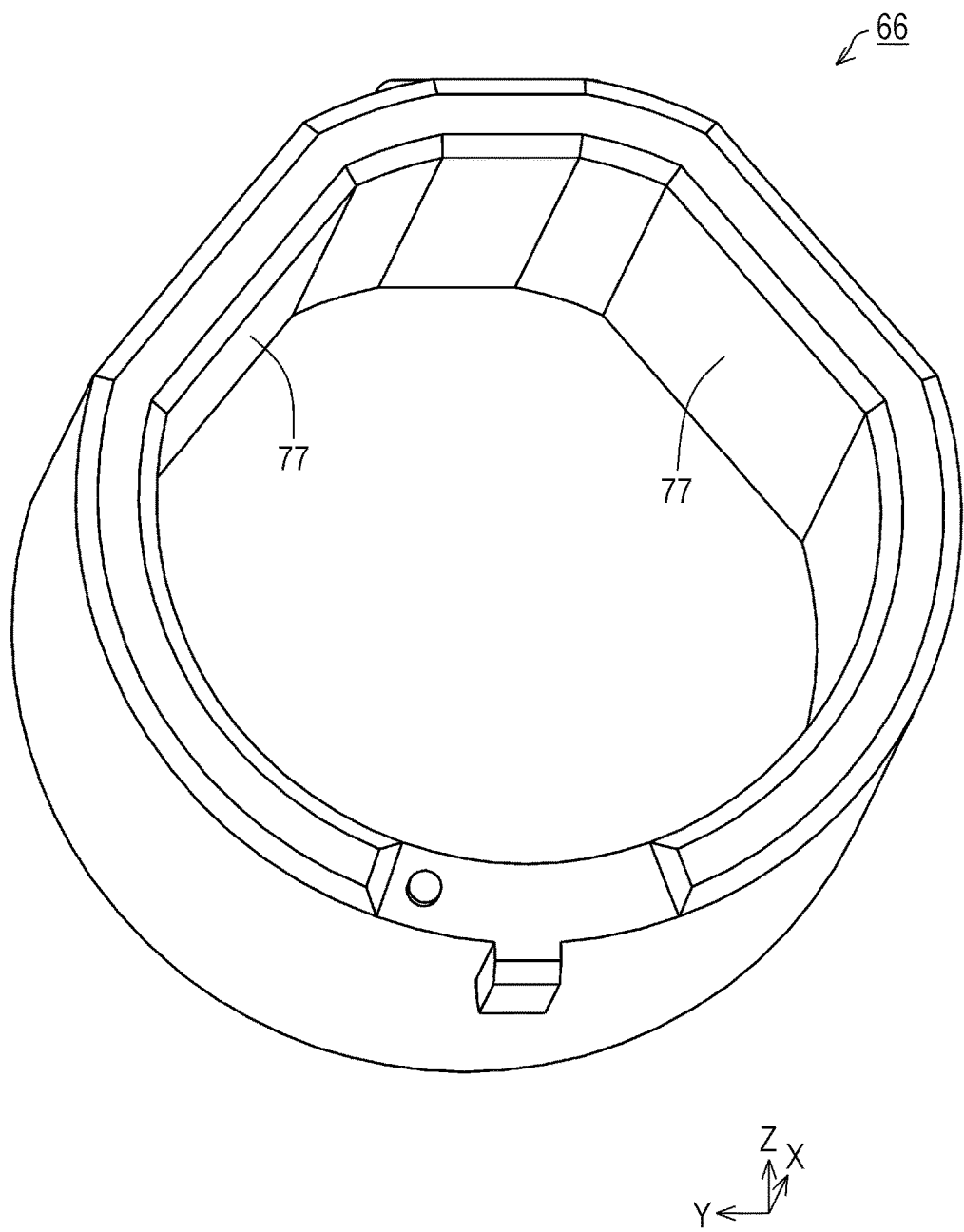
FIG. 14 is a perspective view illustrating a bearing section in the embodiment.

In the embodiment, as illustrated in FIG. 14, the bearing section 66 has two bearing section abutting portions 77 formed on the inner periphery thereof. The bearing section abutting portion 77 is formed on the upper side (Z axis direction side) of the inner periphery of the bearing section 66 when the bearing section 66 is vertically divided into two when viewed in the −X axis direction. The bearing section abutting portion 77 is a part that abuts against the support shaft 35, and is formed in a planar shape. The two bearing section abutting portions 77 are inclined in a direction of being separated from each other toward the −Z axis direction.

Figure 15:
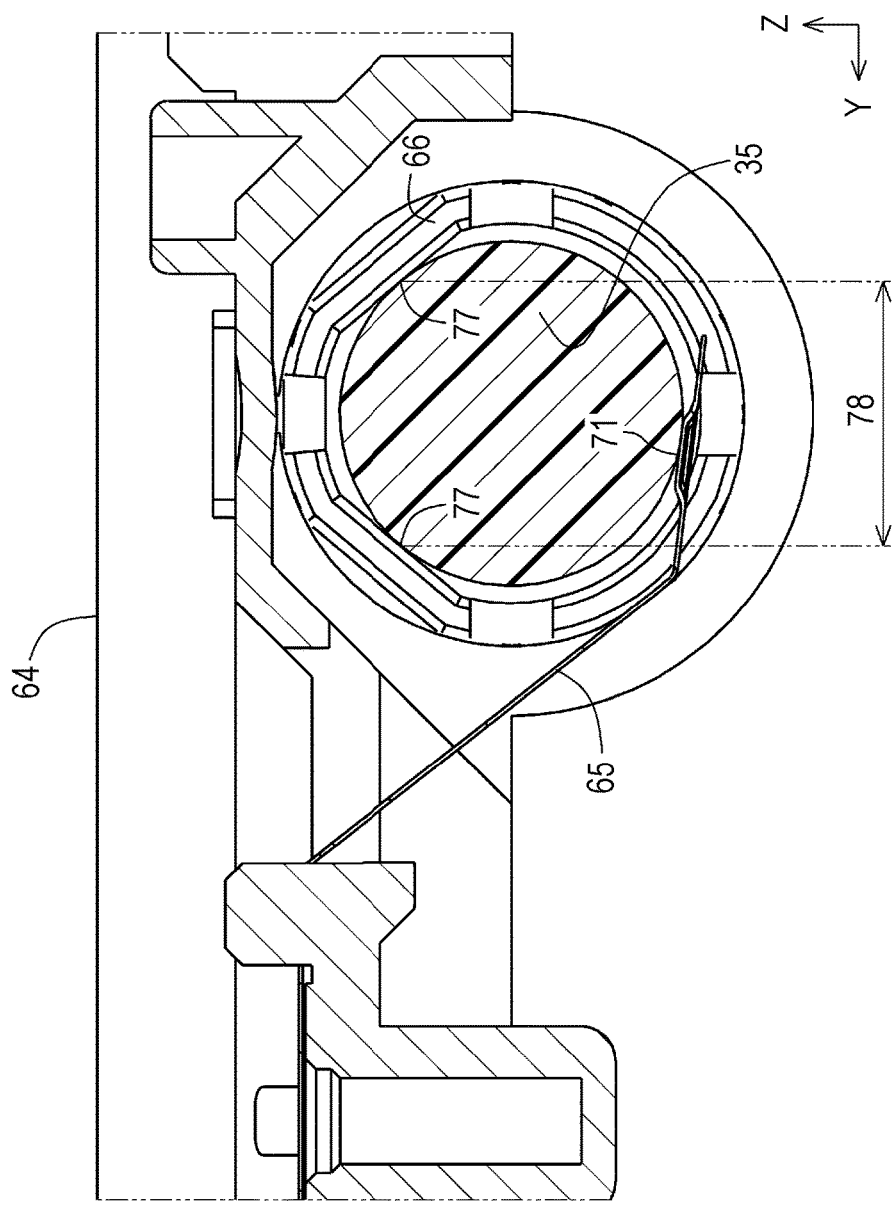
FIG. 15 is an enlarged view of a portion XV in FIG. 13.

In this configuration, when the support shaft 35 is inserted into the bearing section 66, the outer periphery of the support shaft 35 abuts against the bearing section abutting portion 77 as illustrated in FIG. 15 which is an enlarged view of a portion XV in FIG. 13. Accordingly, the bearing section 66 can be supported by the support shaft 35 at two locations on the inner periphery. In other words, the bearing section 66 abuts against two locations at the circumference of the support shaft 35. Accordingly, since it is easy to suppress rattling between the bearing section 66 and the support shaft 35, it is easy to stably support the bearing section 66 on the support shaft 35.

In addition, in the embodiment, when the bearing section 66 is vertically divided into two, the bearing section abutting portions 77 at two locations are formed on the upper side (Z axis direction side) on the inner periphery of the bearing section 66, and thus, the bearing sections abutting portions 77 at two locations easily abut against the support shaft 35 due to gravity applied to the carriage 32. Accordingly, the bearing section 66 can be easily supported by the support shaft 35 more stably. In addition, at this time, the bearing section 66 is supported by the support shaft 35 in a state of abutting against the support shaft 35 from one side of the support shaft 35, that is, from the upper side of the support shaft 35 in the direction intersecting with the shaft line of the support shaft 35 (direction along the Z axis).

On the other side, the abutting portion 71 of the conduction member 65 abuts against the support shaft 35 from the side opposite to the one side of the support shaft 35, that is, from the lower side of the support shaft 35. In other words, in the embodiment, in a direction (direction along the Z axis) intersecting with the shaft line (corresponding to the X axis) of the support shaft 35, the bearing section 66 abuts against the support shaft 35 from the one side of the support shaft 35, and the conduction member 65 abuts against the support shaft 35 from the side opposite to the one side of the support shaft 35. In other words, the positions of the bearing section abutting portions 77 at two locations at which the bearing section 66 abuts against the circumference of the support shaft 35, and the position of the abutting portion 71 at one location at which the conduction member 65 abuts against the circumference of the support shaft 35, are positioned on the opposite side across the center of the support shaft 35 when viewed from the extending direction of the support shaft 35 (when viewed in the X axis direction). That is, the bearing section 66 and the conduction member 65 abut against the support shaft 35 in directions opposite to each other. At this time, the abutting portion 71 of the conduction member 65 abuts against one location at the circumference of the support shaft 35. In this configuration, it is possible to make the support shaft 35 stably sandwiched between the bearing section 66 and the conduction member 65. Accordingly, it is easy to stably support the carriage 32 by the support shaft 35.

In addition, at this time, as illustrated in FIG. 15, in a region 78 along the Y axis of the location at which the two bearing section abutting portions 77 and the support shaft 35 abut (position between two bearing section abutting portions 77 in the Y axis direction), when the location at which the abutting portion 71 and the support shaft 35 abut is positioned, it is possible to stably support the carriage 32 by the support shaft 35. The carriage 32 is likely to become unstable with respect to the support shaft 35 when the location at which the abutting portion 71 and the support shaft 35 abut is positioned outside the region 78. This is because the force which makes the support shaft 35 sandwiched by the two bearing section abutting portions 77 and the abutting portion 71 of the conduction member 65 is weakened.

Figure 16:
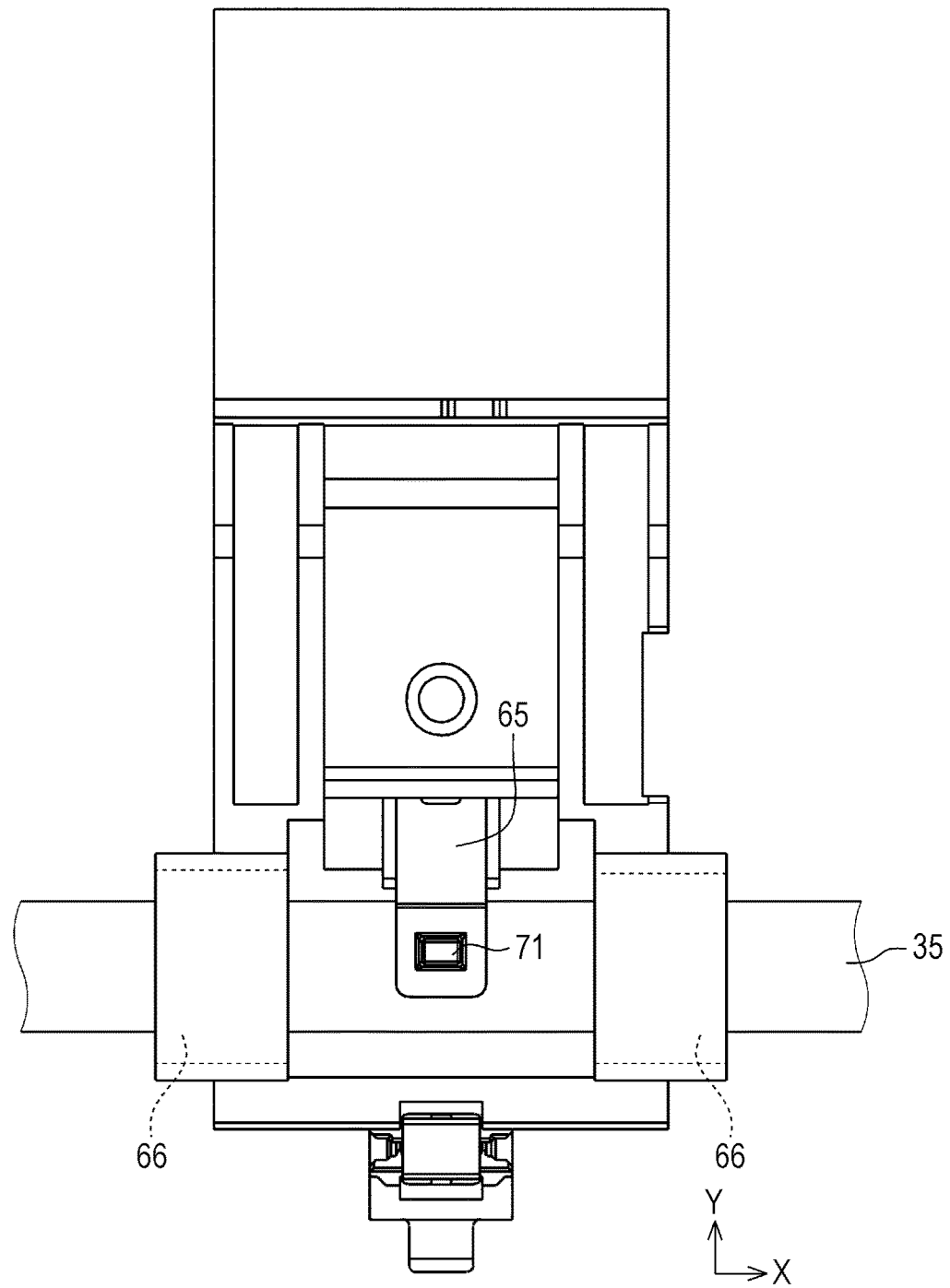
FIG. 16 is a bottom view illustrating the support unit and the support shaft in the embodiment.

Further, in the embodiment, the carriage 32 includes two bearing sections 66 (FIG. 12). The two bearing sections 66 are arranged along the shaft line of the support shaft 35 (along the X axis) with a gap therebetween. In addition, the conduction member 65 is positioned between the two bearing sections 66. In this configuration, as illustrated in FIG. 16, since the abutting portion 71 of the conduction member 65 is positioned between the two bearing sections 66 arranged along the shaft line of the support shaft 35, the support shaft 35 can be supported at three locations along the shaft line. Accordingly, the support shaft 35 can be more stably supported.

Figure 17:
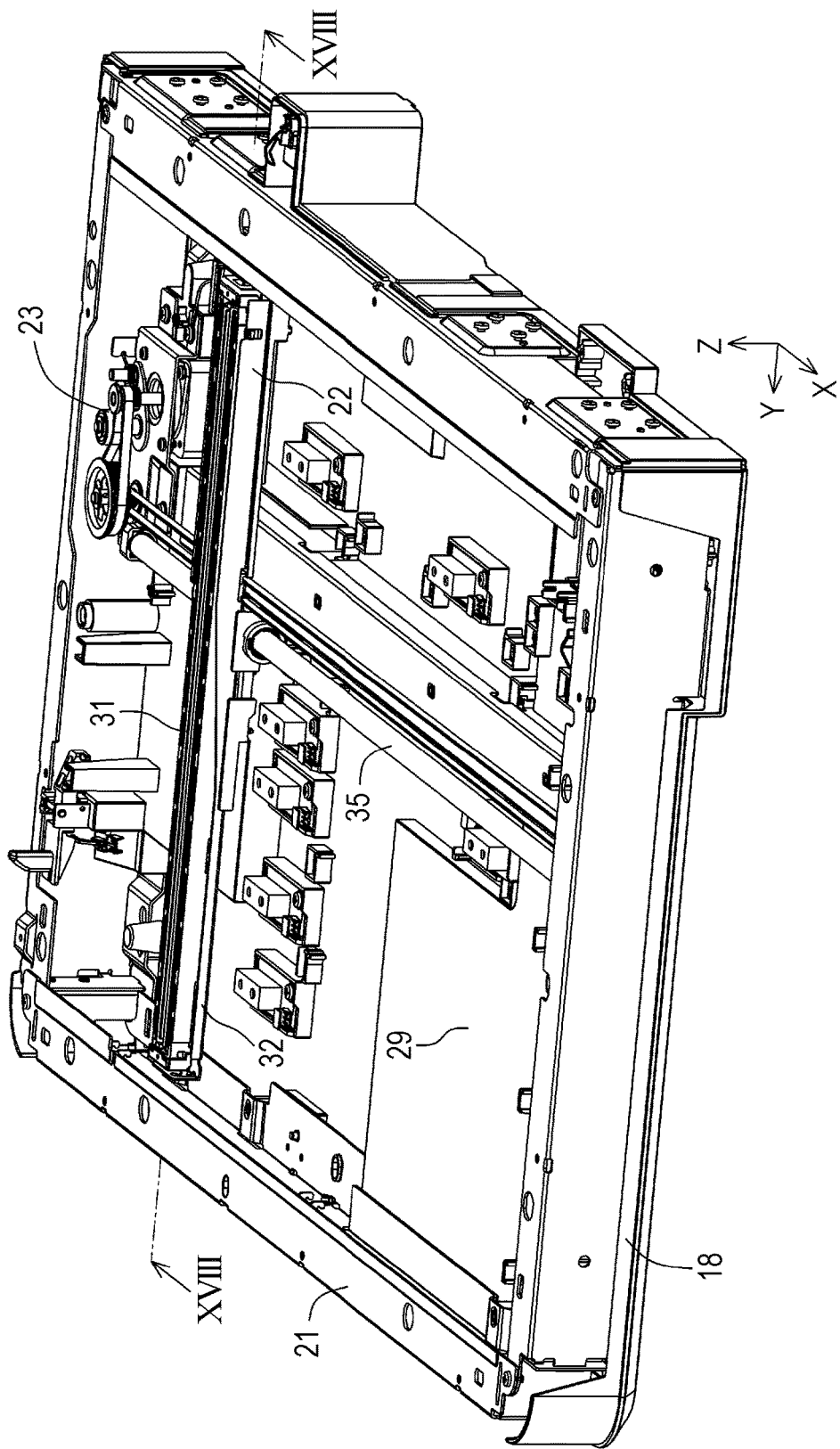
FIG. 17 is a perspective view illustrating a case unit, a frame, a reading unit, and a driving mechanism in the embodiment.

As illustrated in FIG. 17, the reading unit 22 and the driving mechanism 23 having the above-described configuration are disposed in a region surrounded by the first case unit 18 and the frame 21. In addition, in this state, when the second case unit 19 (FIG. 5) is combined with the first case unit 18, the first reading device 11 is configured. At this time, in the first reading device 11, the glass 28 is positioned on the Z axis direction side of the reading unit 22. In other words, the glass 28 is provided on the side opposite to the carriage 32 side of the sensor module 31. Further, the support shaft 35 is disposed on the side opposite to the glass 28 side of the carriage 32. Then, in the first reading device 11, the sensor module 31 of the reading unit 22 is pressed toward the glass 28.

As illustrated in FIG. 6, this is due to the action of a spring 81 and a spring 82 disposed on the case sheet metal 63 of the carriage 32. The spring 81 and the spring 82 which are an example of a pressing member, are disposed between the case sheet metal 63 and the sensor module 31. The spring 81 and the spring 82 are disposed so as to press the sensor module 31 in the Z axis direction. The spring 81 and the spring 82 are aligned along the Y axis.

Figure 18:
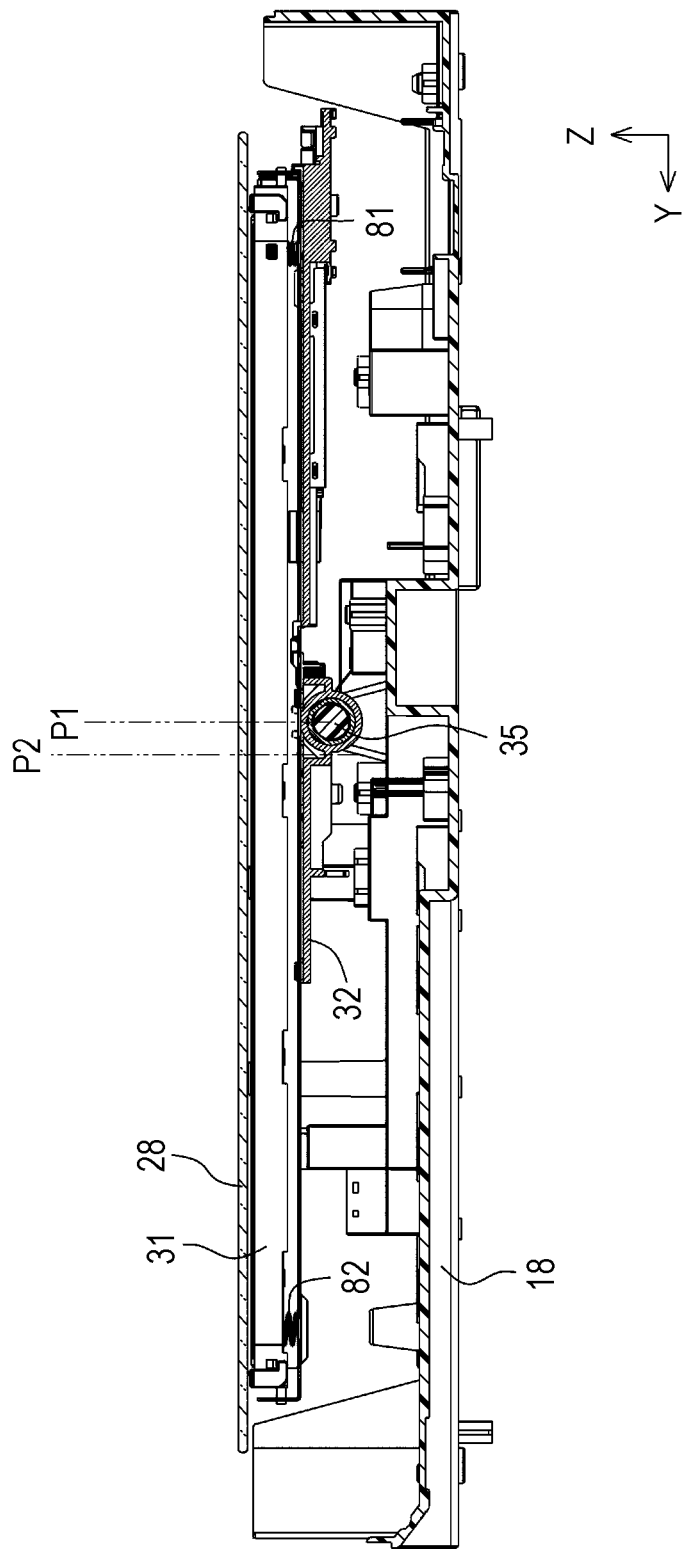
FIG. 18 is a sectional view illustrating the case unit, the support shaft, the carriage, and a glass in the embodiment.

In this configuration, the sensor module 31 is pressed to the glass 28 as illustrated in FIG. 18 which is a sectional view. In other words, the scanner unit 5 in the embodiment is disposed between the carriage 32 and the sensor module 31 and includes the spring 81 and the spring 82 that press the sensor module 31 against the glass 28. Accordingly, the sensor module 31 abuts against the glass 28. The spring 81 and the spring 82 maintain the adhesion of the sensor module 31 to the glass 28. Therefore, images can be stably read from the document mounted on the document mounting surface 16 of the glass 28. In addition, FIG. 18 illustrates a sectional view in which the first case unit 18, the support shaft 35, the carriage 32, and the glass 28 are taken along the line XVIII-XVIII in FIG. 17.

In addition, in the configuration, since the spring 81 and the spring 82 press the sensor module 31 against the glass 28, the carriage 32 receives a reaction force in the −Z axis direction from the spring 81 and the spring 82 toward the support shaft 35. Therefore, the support shaft 35 receives a pressing force in the −Z axis direction from the Z axis direction side to the opposite side via the bearing section 66 of the carriage 32. Meanwhile, the conduction member 65 presses the support shaft 35 in the Z axis direction from the side opposite to the carriage 32 side toward the carriage 32 side. In other words, the pressing force received by the support shaft 35 via the bearing section 66 of the carriage 32 and the pressing force received from the conduction member 65 act in the directions opposite to each other. Accordingly, since it is possible to allow the support shaft 35 to be sandwiched between the bearing section 66 and the conduction member 65, it is possible to more stably support the support shaft 35.

In the embodiment, as illustrated in FIG. 18, a position P1 of the support shaft 35 is deviated from a center position P2 of the length along the Y axis of the carriage 32. The spring 81 and the spring 82 are aligned along the Y axis with the position P1 or the center position P2 nipped therebetween. In other words, the position P1 or the center position P2 are positioned between the spring 81 and the spring 82 which are arranged along the Y axis. The spring 81 is positioned further on the Y axis direction side than the position P1 or the center position P2. In addition, in the embodiment, only the support shaft 35 supports the carriage 32. In other words, the carriage 32 is separated from the other configuration components or units of the scanner unit 5 except for the support shaft 35.

Figure 19:
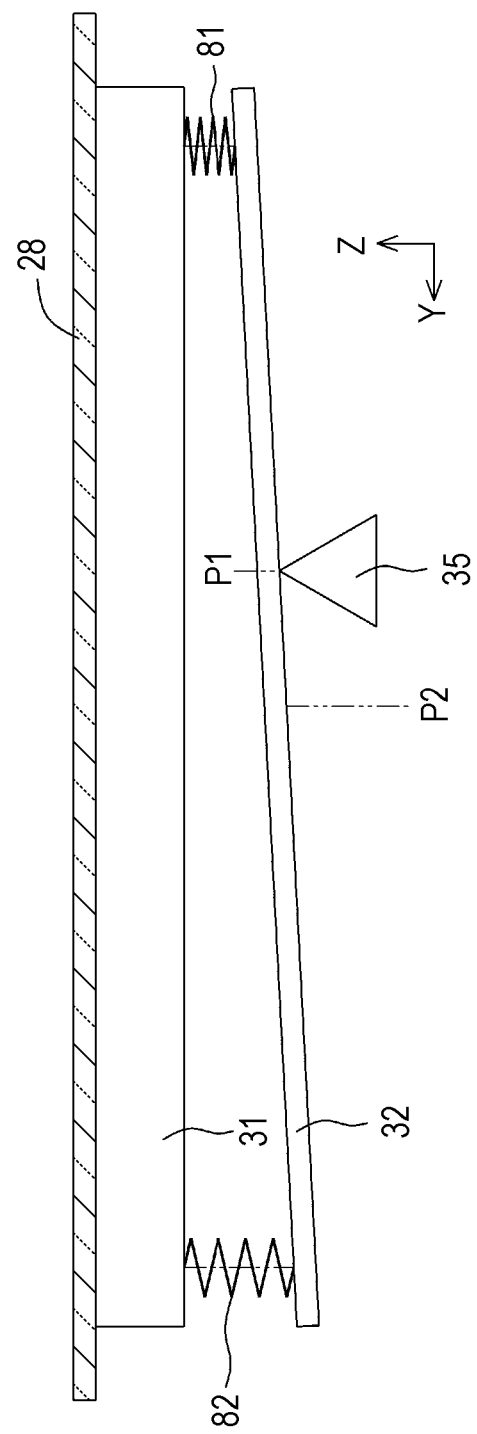
FIG. 19 is a view for schematically illustrating a support state of the carriage in the embodiment.

When clearly illustrating the above-described configuration, it can be schematically expressed as illustrated in FIG. 19. In this configuration, when the spring length and the spring load are made equal between the spring 81 and the spring 82, it is difficult to hold the carriage 32 horizontal. This is because a distance from the position P1 of the support shaft 35 to the spring 81 corresponding to a fulcrum and a distance from the position P1 to the spring 82, are different. According to a principle of leverage, the longer the distance from the position P1, the greater the displacement due to the spring load. Accordingly, in the embodiment, when the spring 81 and the spring 82 are configured with the same spring, the displacement by the spring 82 becomes greater than the displacement by the spring 81. Therefore, since the carriage 32 is inclined in the direction of decreasing in the −Z axis direction as going in the Y axis direction, it is difficult to hold the carriage 32 horizontal.

In response to such a problem, in the embodiment, the spring load of the spring 82 when the carriage 32 is made horizontal is set to be smaller than the spring load of the spring 81. In other words, the spring load of the spring 82 and the spring load of the spring 81 are balanced such that the horizontal position of the carriage 32 is held. In this configuration, it is easy to reduce the gap between the carriage 32 and the case body 29 (FIG. 17). This is because an inclination error of the carriage 32 can be reduced. When the inclination error of the carriage 32 is large, it is necessary to set a large gap between the carriage 32 and the case body 29 in order to avoid contact between the carriage 32 and the case body 29. However, when the inclination error can be reduced, the gap therebetween can be set small. As a result, since the thickness of the scanner unit 5 can be reduced, it is easy to reduce the size of the multifunction machine 1.

In addition, in the embodiment, as illustrated in FIG. 5, various types of flexible flat cable (FFC) 84 are connected to the reading unit 22. In the embodiment, the FFC 84 is bent and in contact with the reading unit 22 at the end portion on the −Y axis direction side of the reading unit 22. Therefore, the reaction force (a force by which a bending portion returns from a bent state to a linear state) from the FFC 84 acts on the reading unit 22. The reaction force from the FFC 84 acts upward in the +Z axis direction as the carriage 32 moves in the Y axis direction. In the embodiment, a balance between a spring load of the spring 82 and a spring load of the spring 81 is achieved, taking into account the reaction force from the FFC 84. Accordingly, it is possible to make it easy to hold the carriage 32 more horizontal.

Figure 20:
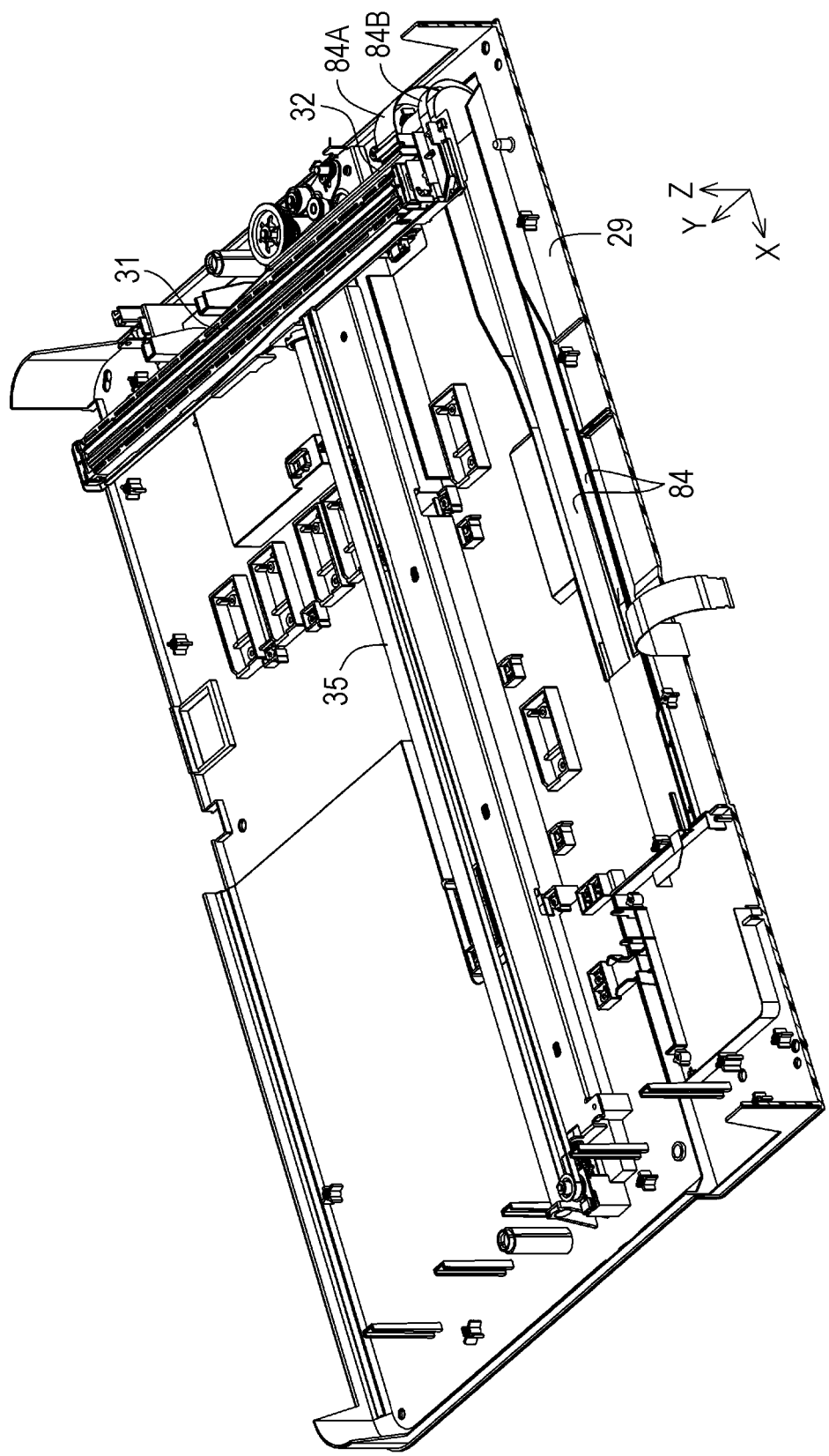
FIG. 20 is a perspective view illustrating the case body and an FFC in the embodiment.

As illustrated in FIG. 20, the FFC 84 is disposed along a wiring path provided in the case body 29, and one end side thereof is linked to the carriage 32. In addition, the FFC 84 is electrically connected to the sensor module 31. The FFC 84 includes an FFC 84A for transmitting an image signal from the sensor module 31, and an FFC 84B for supplying power to illumination which is not illustrated. In addition, in FIG. 20, a state where a part of the case body 29 is broken is illustrated in order to make it easy to understand the configuration.

Figure 21:
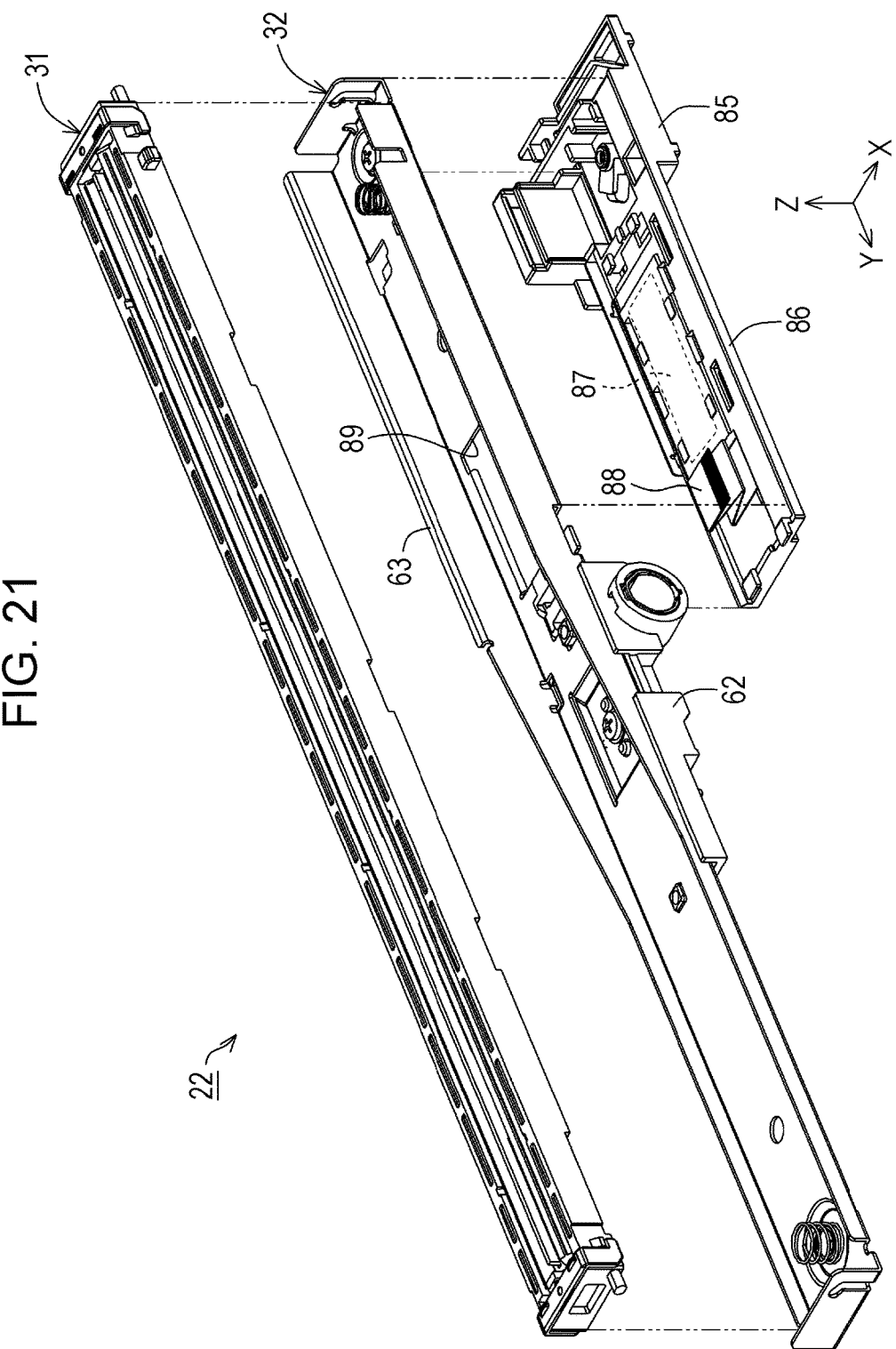
FIG. 21 is an exploded perspective view illustrating a sensor module and the carriage in the embodiment.
Figure 22:
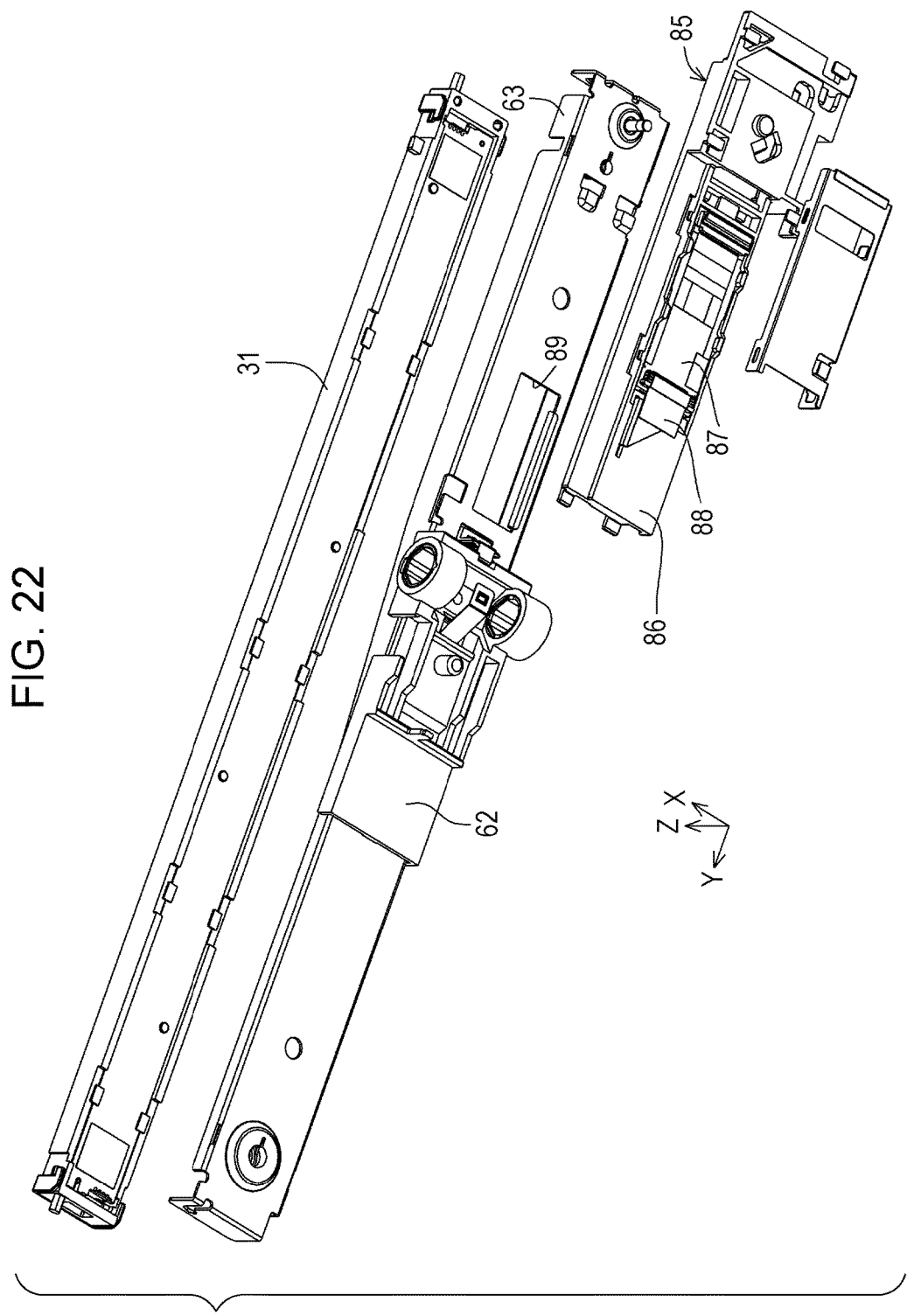
FIG. 22 is an exploded perspective view illustrating the sensor module and the carriage in the embodiment.

Here, as illustrated in FIG. 21, the carriage 32 includes a connection unit 85. The connection unit 85 is disposed in the −Z axis direction of the case sheet metal 63. In other words, the connection unit 85 is disposed on the lower side of the case sheet metal 63. Further, the connection unit 85 is positioned further on the −Y axis direction side than the support unit 62. The connection unit 85 includes a connection unit frame 86, a wiring substrate 87, and a connection FFC 88. As illustrated in FIG. 22, the wiring substrate 87 is disposed on the −Z axis direction side of the connection unit frame 86. Therefore, the wiring substrate 87 is positioned on the side opposite to the case sheet metal 63 side of the connection unit frame 86.

The connection FFC 88 penetrates from the −Z axis direction side to the Z axis direction side of the connection unit frame 86, and one end thereof is connected to the wiring substrate 87. The other end of the connection FFC 88 on the side opposite to the wiring substrate 87 side is connected to the sensor module 31 through an opening 89 of the case sheet metal 63 illustrated in FIG. 21. Accordingly, the sensor module 31 is electrically connected to the wiring substrate 87 via the connection FFC 88. An A/D conversion device which is not illustrated is mounted on the wiring substrate 87. The A/D conversion device is a device that converts an analog signal into a digital signal.

The image read by the sensor module 31 is output from the image sensor as an analog signal. Since the analog signal is likely to receive the influence of electric noise, it is desirable to promptly convert the analog signal into the digital signal. Therefore, in the embodiment, on the −Z axis direction side of the sensor module 31, the wiring substrate 87 on which the A/D conversion device is mounted is disposed. Accordingly, the analog signal from the sensor module 31 can be promptly converted into the digital signal. As a result, the reading speed of the reading unit 22 can increase.

In addition, in the embodiment, the sensor module 31 and the wiring substrate 87 are configured to be separated from each other. In other words, in the embodiment, the A/D conversion device is separated from the sensor module 31. However, a configuration in which the A/D conversion device is mounted on the sensor module 31 can also be employed. According to the configuration, since it is possible to bring the A/D conversion device closer to the sensor module 31, it is possible to more promptly convert the analog signal from the sensor module 31 into the digital signal. However, in this configuration, the image sensor is likely to receive the influence of heat from the A/D conversion device. Accordingly, in this configuration, there is a problem that the quality of the image read by the sensor module 31 is likely to deteriorate.

In response to such a problem, in the embodiment, since the sensor module 31 and the wiring substrate 87 are configured to be separated from each other, it is easy to avoid that the image sensor receives the influence of the heat from the A/D conversion device. Accordingly, it is possible to make it easy to suppress deterioration of the quality of the image read by the sensor module 31 while achieving high-speed reading by the reading unit 22.

Figure 23:
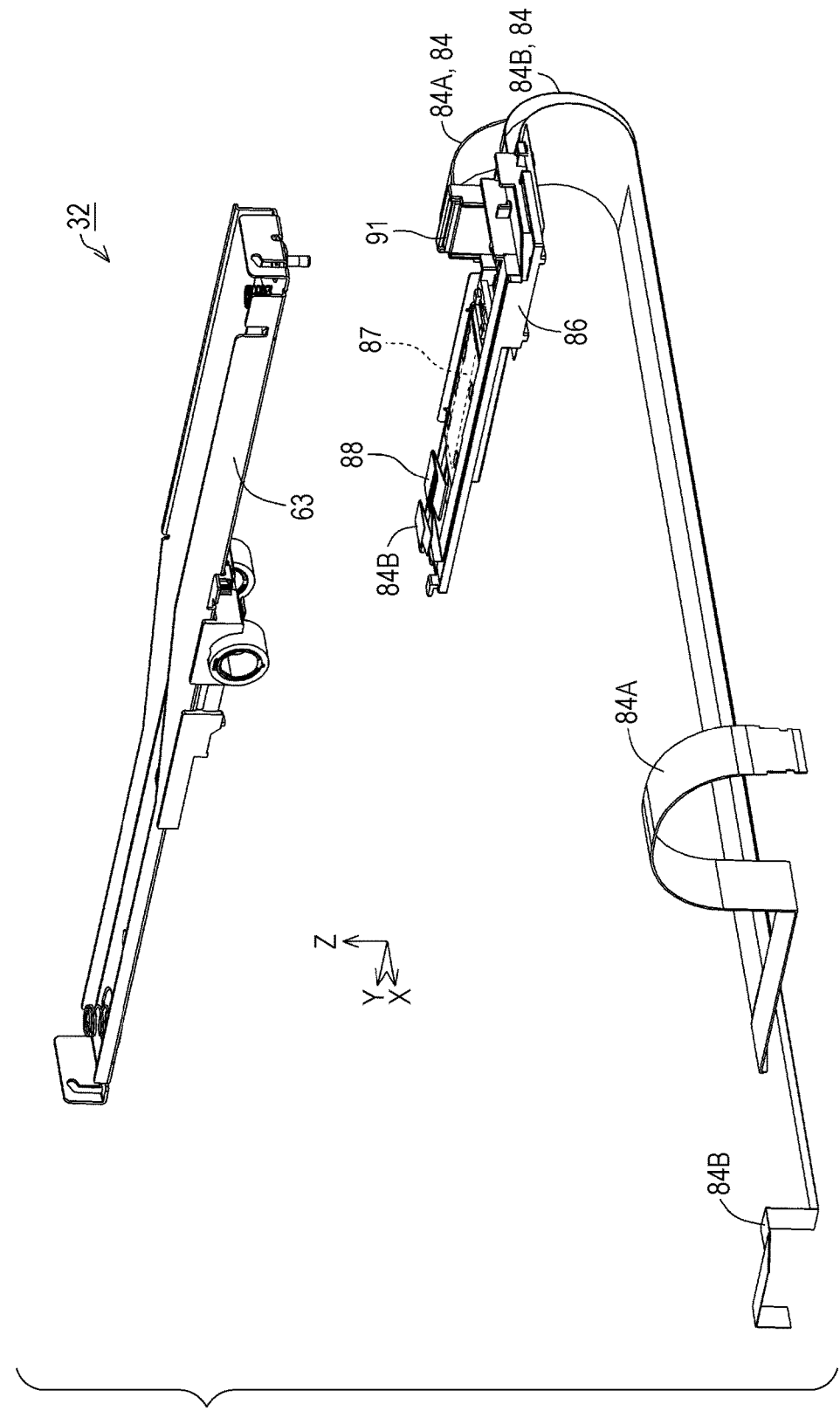
FIG. 23 is an exploded perspective view illustrating the carriage and the FFC in the embodiment.

As illustrated in FIG. 23, the FFC 84A of the FFC 84 described above is connected to the wiring substrate 87 in a state of being supported by the connection unit frame 86. Accordingly, when the carriage 32 is displaced in the direction along the X axis, it is possible to suppress the occurrence of stress in a connection portion of the FFC 84A and the wiring substrate 87. As a result, the reliability in the connecting portion between the FFC 84A and the wiring substrate 87 is improved.

Furthermore, in the embodiment, the FFC 84A is supported by the connection unit frame 86 via the Z axis direction side of a protrusion portion 91 formed in the connection unit frame 86. The protrusion portion 91 protrudes in the Z axis direction from the connection unit frame 86. In this configuration, it is easy to avoid reduction of a radius of curvature of the FFC 84A. Accordingly, since the stress applied to the FFC 84A can be reduced, the reliability of the FFC 84A can be improved.

The FFC 84B is wired on the connection unit frame 86 along the Y axis (in the Y axis direction) and is connected to the sensor module 31 through the opening 89 (FIG. 22) of the case sheet metal 63. Accordingly, electric power can be supplied to the illumination (not illustrated) of the sensor module 31. Further, in the embodiment, the end portion of the FFC 84B on the sensor module 31 side or the connection FFC 88 is folded in a bellows shape (also referred to as a bellows shape) as illustrated in FIG. 23. Accordingly, even when an interval between the sensor module 31 and the case sheet metal 63 illustrated in FIG. 21 changes, the bellows of the FFC 84B or the connection FFC 88 can expand or contract following the change in the interval. As a result, even when the interval between the sensor module 31 and the case sheet metal 63 changes, the connection between the sensor module 31 and the FFC 84B or the connection FFC 88 can be reliably maintained.

Accordingly, the reliability of the connection between the sensor module 31 and the FFC 84B or the connection FFC 88 can be improved. Further, in the FFC 84B or the connection FFC 88, by extending the part folded in the bellows shape, it is possible to ensure the length compared with a state where the folded part contracts, and thus, operability, such as insertion and removal at the time of assembly, can be improved.

Figure 24:
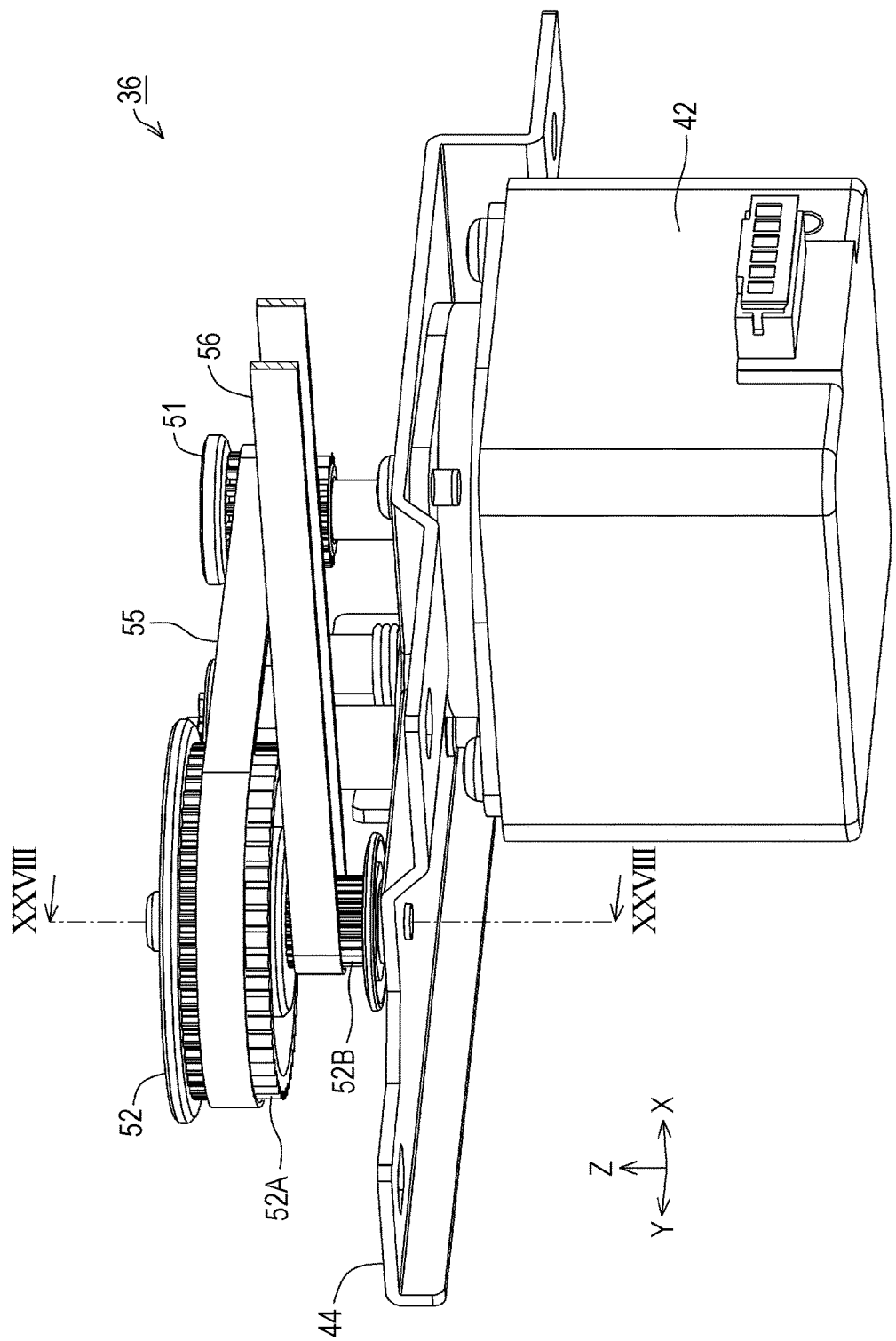
FIG. 24 is a perspective view illustrating the transmission unit in the embodiment.

Here, the transmission unit 36 will be described. As illustrated in FIG. 24, the driving pulley 52 of the transmission unit 36 has a configuration in which a gear 52A and a gear 52B having different pitch circle diameters are combined. The gear 52A and the gear 52B are arranged along the shaft line along the Z axis. The gear 52A is positioned further on the Z axis direction side than the gear 52B. In addition, the pitch circle diameter of the gear 52A is greater than the pitch circle diameter of the gear 52B. The first belt 55 is wound around the gear 52A. The second belt 56 is wound around the gear 52B. In the above-described configuration, the power transmitted from the motor 42 via the first belt 55 is transmitted to the second belt 56 after being decelerated through the driving pulley 52.

Figure 25:
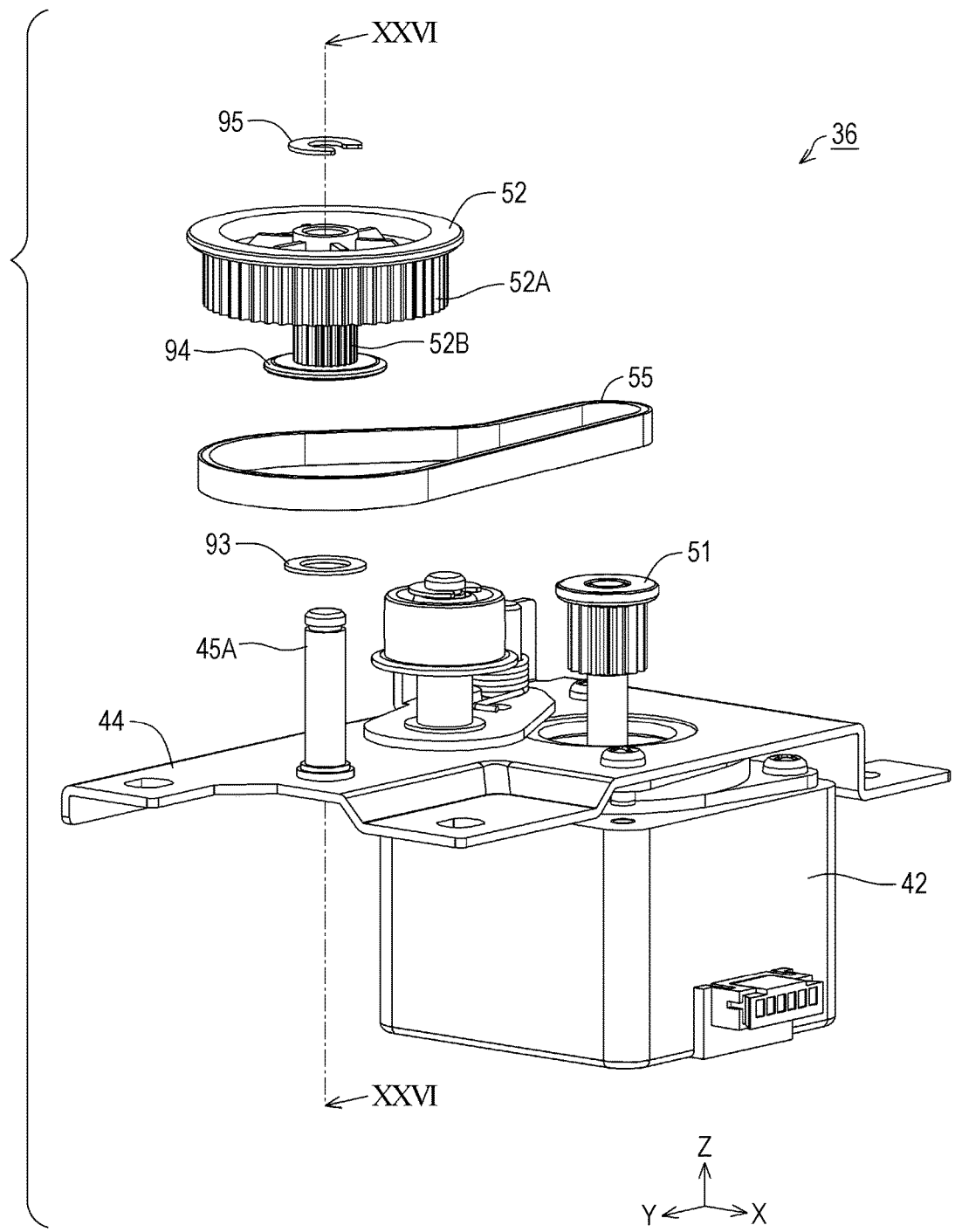
FIG. 25 is an exploded perspective view illustrating the transmission unit in the embodiment.

As illustrated in FIG. 25, the driving pulley 52 is configured to be rotatable around the pulley shaft 45A. A washer 93 is inserted into the pulley shaft 45A provided upright on the frame sheet metal 44. As the washer 93, for example, a material having high lubricating properties, such as nylon or a polystyrene washer, can be employed. The driving pulley 52 is inserted into the pulley shaft 45A from the Z axis direction side of the washer 93. Here, the driving pulley 52 is provided with a flange portion 94. The flange portion 94 is disposed on the −Z axis direction side of the gear 52B. Therefore, the gear 52B of the driving pulley 52 is nipped between the flange portion 94 and the gear 52A.

Figure 26:
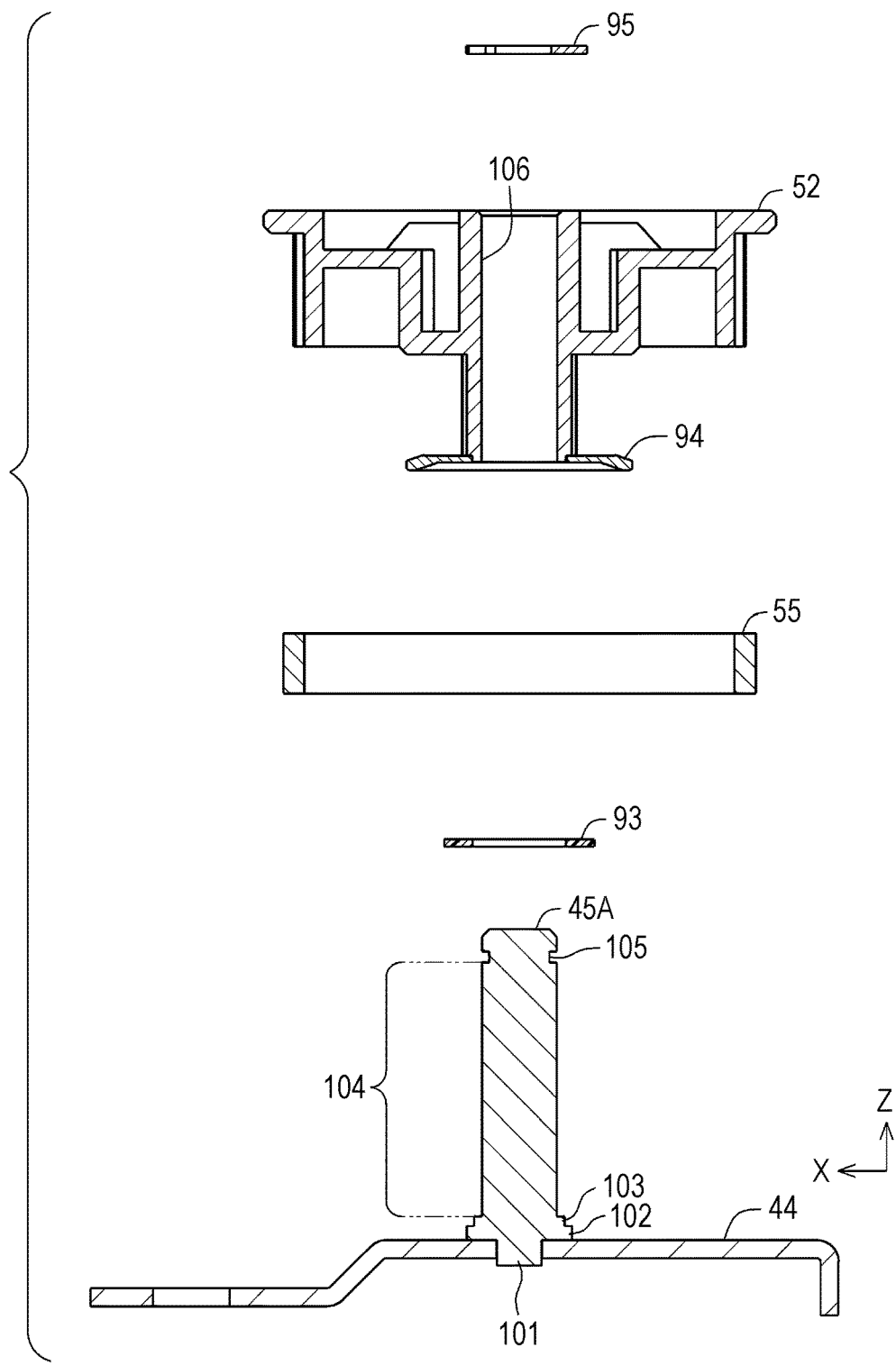
FIG. 26 is a sectional view taken along the line XXVI-XXVI in FIG. 25.

Therefore, on the pulley shaft 45A, the flange portion 94 is positioned on the Z axis direction side of the washer 93, and the driving pulley 52 is positioned on the Z axis direction side of the flange portion 94. In addition, a C ring 95 is mounted on the pulley shaft 45A that protrudes toward the Z axis direction side of the driving pulley 52 (refer to FIG. 28). Accordingly, it is possible to prevent the driving pulley 52 from being pulled out from the pulley shaft 45A. As illustrated in FIG. 26 which is a sectional view taken along the line XXVI-XXVI in FIG. 25, the pulley shaft 45A has a press-fitting section 101, a first step portion 102, a second step portion 103, a rotating shaft portion 104, and a ring groove 105.

The rotating shaft portion 104 is a part facing an inner circumferential wall 106 of the driving pulley 52 and is a part which serves as the rotation center of the driving pulley 52. The press-fitting section 101 is formed at the end portion of the pulley shaft 45A on the frame sheet metal 44 side. The press-fitting section 101 is formed to be thinner than the rotating shaft portion 104 and press-fitted into the through-hole of the frame sheet metal 44. Furthermore, it is also possible to employ a configuration in which the fixing force to the frame sheet metal 44 of the pulley shaft 45A increases by performing caulking processing with respect to the press-fitting section 101.

The first step portion 102 is formed on the Z axis direction side of the press-fitting section 101. The first step portion 102 is formed to be thicker than the press-fitting section 101. Accordingly, when the press-fitting section 101 of the pulley shaft 45A is press-fitted into the frame sheet metal 44, the height of the pulley shaft 45A with respect to the frame sheet metal 44 is regulated as the first step portion 102 abuts against the frame sheet metal 44. In addition, the first step portion 102 is formed to be thicker than the rotating shaft portion 104. Further, the first step portion 102 is formed to be thicker than the inner diameter of the inner circumferential wall 106 of the driving pulley 52.

Figure 27:
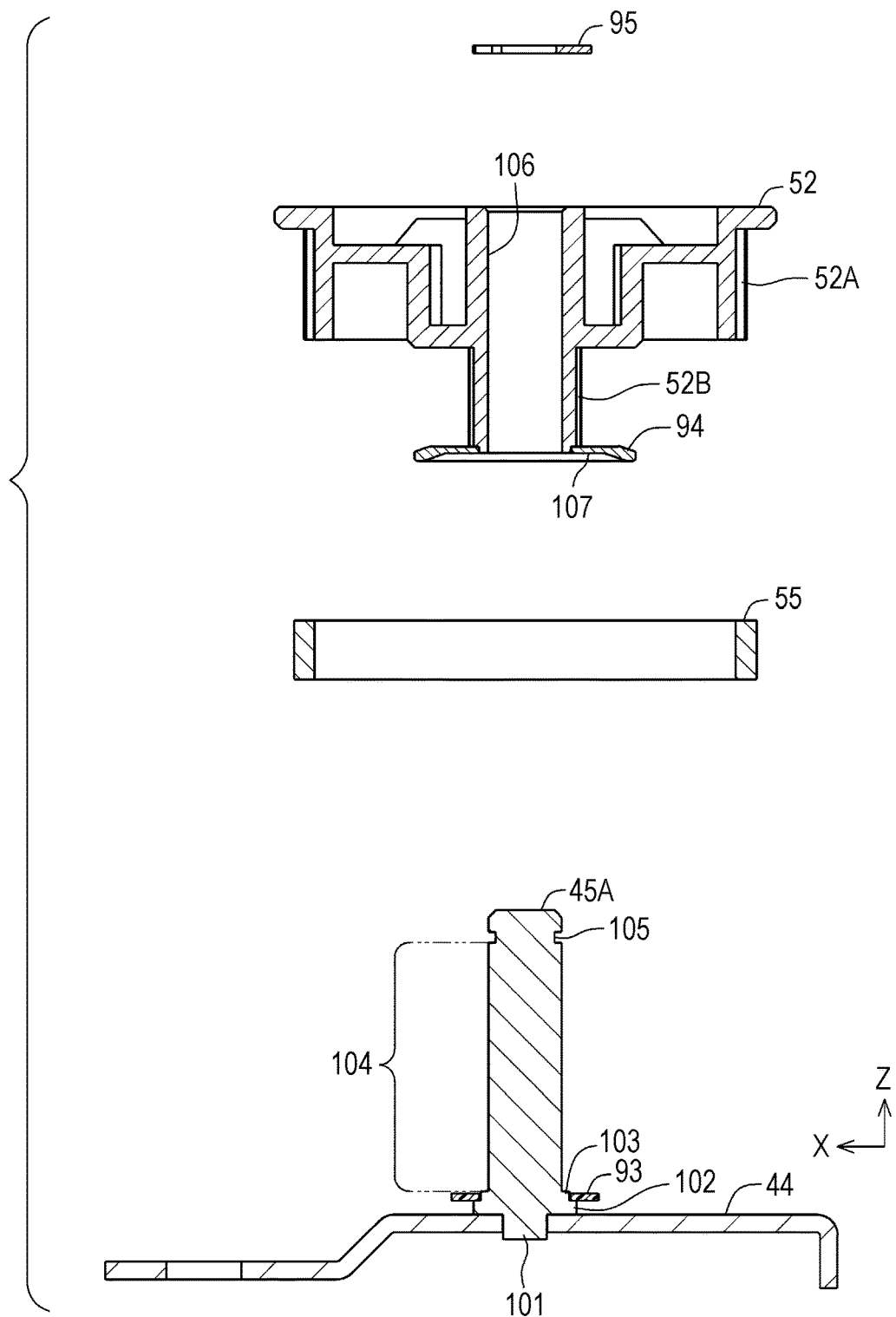
FIG. 27 is a sectional view illustrating a state where a washer is inserted in a pulley shaft in FIG. 26.

The second step portion 103 is formed on the Z axis direction side of the first step portion 102. The rotating shaft portion 104 is positioned on the Z axis direction side of the second step portion 103. The second step portion 103 is formed to be thinner than the first step portion 102 and thicker than the rotating shaft portion 104. In addition, the second step portion 103 is formed to be thinner than the inner diameter of the washer 93 and thicker than the inner diameter of the inner circumferential wall 106 of the driving pulley 52. Further, the first step portion 102 is formed to be thicker than the inner diameter of the washer 93. In this configuration, when the washer 93 is inserted into the pulley shaft 45A, as illustrated in FIG. 27, the washer 93 is inserted into the second step portion 103 and positioned on the Z axis direction side of the first step portion 102. In other words, the washer 93 is inserted into the second step portion 103 and is mounted on the first step portion 102. In addition, at this time, the second step portion 103 is set to protrude further toward the Z axis direction side from the washer 93.

Figure 28:
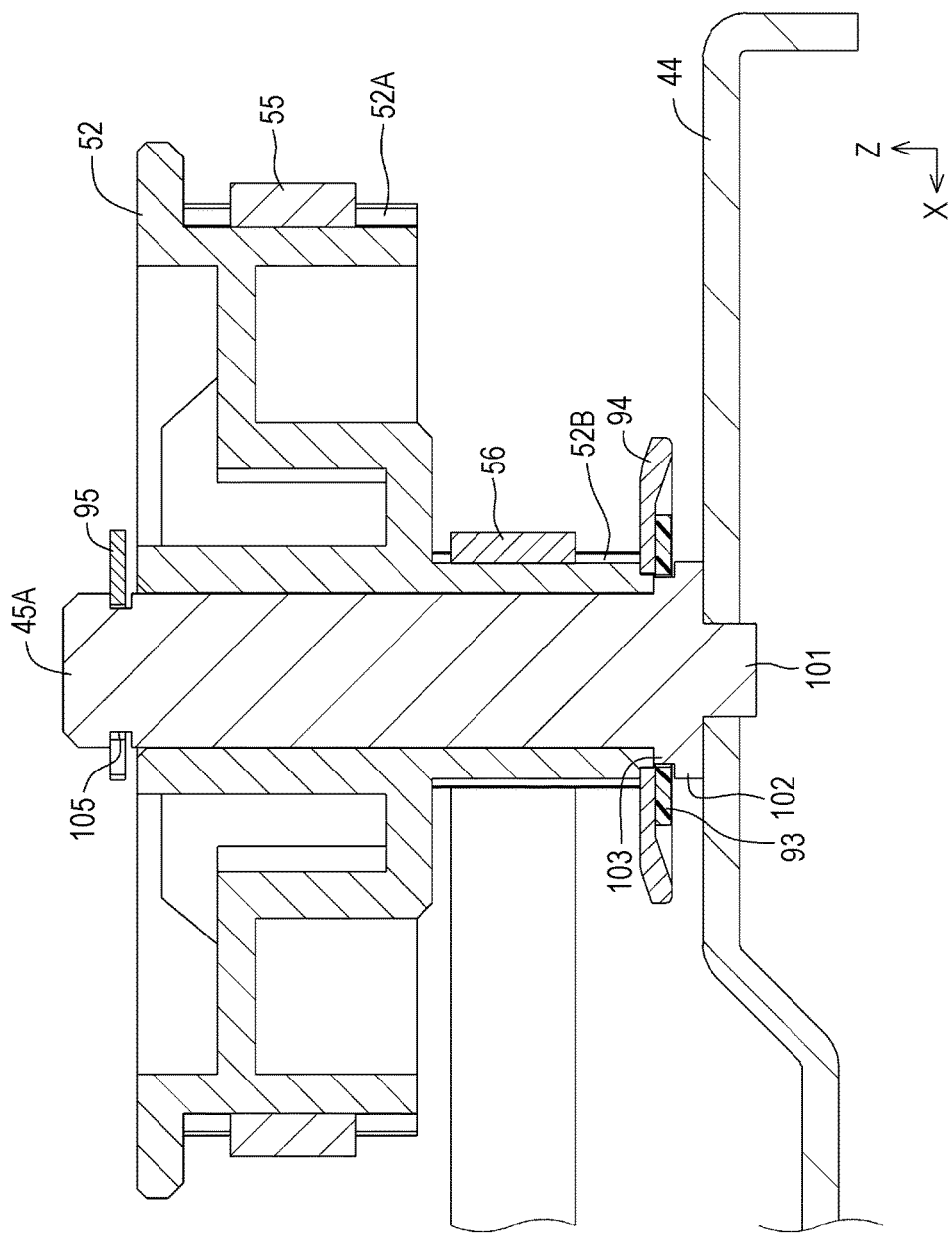
FIG. 28 is a sectional view taken along the line XXVIII-XXVIII in FIG. 24.

The flange portion 94 is provided at the end portion on the −Z axis direction side of the driving pulley 52. The flange portion 94 is press-fitted and fixed to the end portion on the −Z axis direction side of the gear 52B. A recessed portion 107 which is capable of receiving the washer 93 is formed at a part of the flange portion 94 facing the washer 93. Therefore, when the driving pulley 52 is inserted into the pulley shaft 45A, the gear 52B of the driving pulley 52 can abut against the second step portion 103 as illustrated in FIG. 28. In addition, when the driving pulley 52 is inserted into the pulley shaft 45A, the ring groove 105 is positioned further on the Z axis direction side than the driving pulley 52. In addition, when the C ring 95 is mounted to the ring groove 105, it is possible to suppress the driving pulley 52 from pulling out of the pulley shaft 45A. Since the flange portion 94 is provided to be separated from the gear 52B, the manufacturing costs including a component mold can also be suppressed.

In addition, in the embodiment, before the driving pulley 52 illustrated in FIG. 24 is inserted into the pulley shaft 45A, the rotating shaft portion 104 is coated with lubricating oil, such as grease. In this order of steps, grease adhered to the rotating shaft portion 104 is brought close to the washer 93 side by the flange portion 94. In addition, the movement of the grease in the Z axis direction toward the washer 93 side is restricted by the flange portion 94 illustrated in FIG. 28. Accordingly, adhesion of grease to the gear 52B is easily suppressed. Therefore, since sliding between the gear 52B and the second belt 56 is easily suppressed, it is easy to suppress the tooth skipping between the gear 52B and the second belt 56. As a result, it is possible to stably drive the carriage 32, and to make it easy to improve the reliability of the scanner unit 5.

In the above-described configuration, it is possible to suppress the second belt 56 wound around the gear 52B from coming into contact with the washer 93. In addition, in the embodiment, even when the flange portion 94 provided in the driving pulley 52 is displaced in the Z axis direction due to dimensional tolerance, the washer 93 is set not to go over the second step portion 103 and move onto the second step portion 103. Accordingly, it is possible to suppress the washer 93 from being nipped between the driving pulley 52 and the second stepped portion 103. Here, when the washer 93 is nipped between the driving pulley 52 and the second step portion 103, the rotation of the driving pulley 52 is interrupted, the load applied to the motor 42 increases, and a situation in which the carriage 32 cannot be driven, can occur. However, in the embodiment, since the washer 93 can be suppressed from being nipped between the driving pulley 52 and the second step portion 103, it is possible to stably driven the carriage 32, and to make it easy to improve the reliability of the scanner unit 5.

Figure 29:
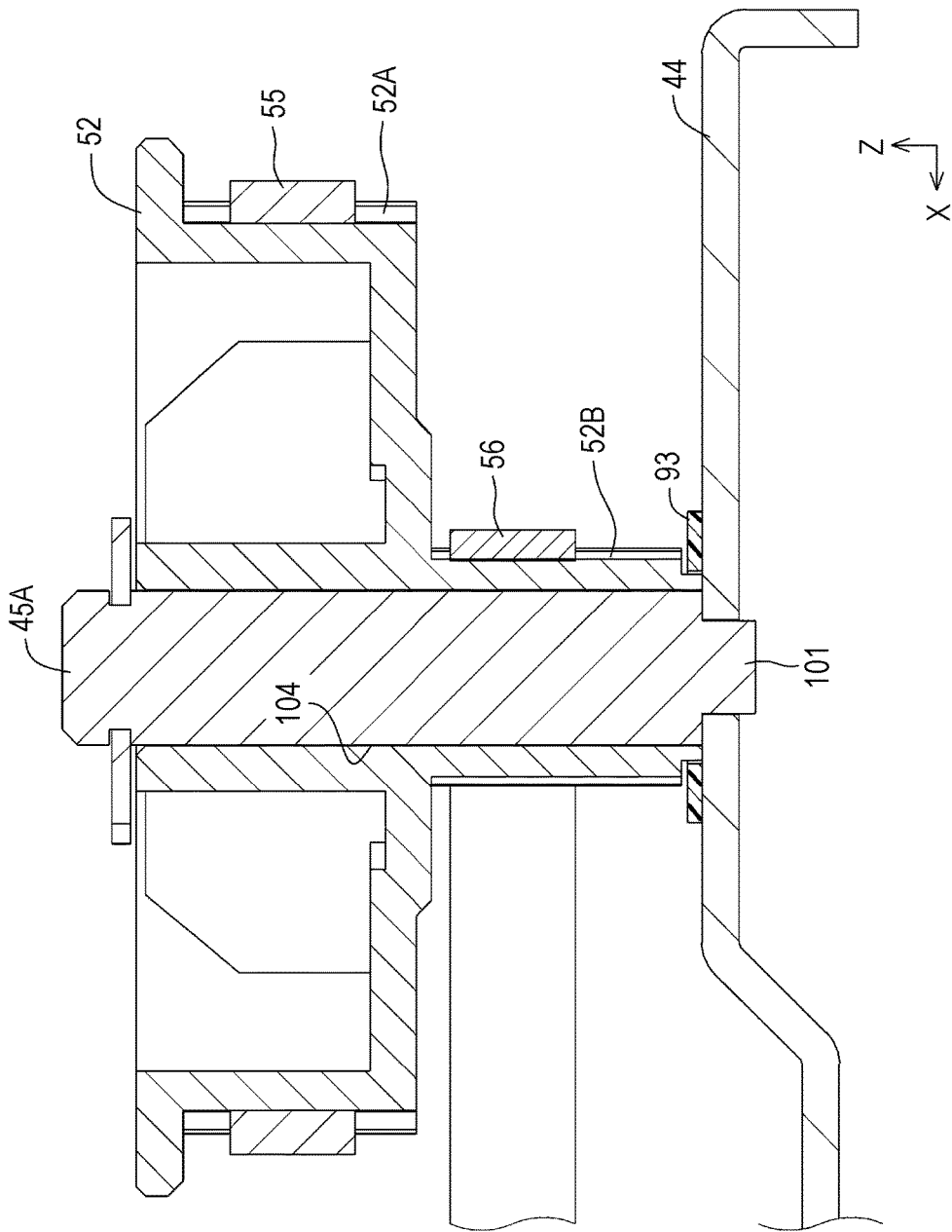
FIG. 29 is a sectional view illustrating another example of a driving pulley and the pulley shaft in the embodiment.

Here, an example in which the driving pulley 52 and the pulley shaft 45A are simply configured will be examined. As the pulley shaft 45A, for example, a configuration in which the first step portion 102 or the second step portion 103 are omitted can be considered. In addition, in the driving pulley 52, the flange portion 94 may be omitted. In such a configuration, as illustrated in FIG. 29, in the pulley shaft 45A, the rotating shaft portion 104 is positioned on the Z axis direction side of the press-fitting section 101. In addition, the inner diameter of the washer 93 is greater than the outer diameter of the end portion on the −Z axis direction side of the driving pulley 52. Therefore, when the driving pulley 52 is inserted into the pulley shaft 45A after the washer 93 is inserted into the pulley shaft 45A, the end portion of the driving pulley 52 on the −Z axis direction side abuts against the frame sheet metal 44. In addition, it is also considered that the driving pulley 52 is displaced in the Z axis direction due to dimensional tolerance.

In this configuration, when the driving pulley 52 is driven, there is a case where the second belt 56 vertically moves along the Z axis. At this time, when the second belt 56 goes down, it is considered that an edge portion of the second belt 56 comes into contact with the washer 93. When the driving pulley 52 continues to be driven in a state where the edge portion of the second belt 56 comes into contact with the washer 93, it is considered that the washer 93 is dragged by the second belt 56 and enters below the end portion on the −Z axis direction side of the driving pulley 52. At this time, the washer 93 is sandwiched between the driving pulley 52 and the frame sheet metal 44, and the driving pulley 52 and the washer 93 mesh with each other. Accordingly, a situation in which the rotation of the driving pulley 52 is interrupted, the load applied to the motor 42 increases, and the carriage 32 cannot be driven, can occur. In response to such a problem, in the embodiment, as described above, since the flange portion 94 exists at a position between the washer 93 and the second belt 56, there is not a case where the washer 93 and the second belt 56 come into contact with each other. Therefore, it is possible to suppress the washer 93 from being nipped between the driving pulley 52 and the second stepped portion 103.

Figure 30:
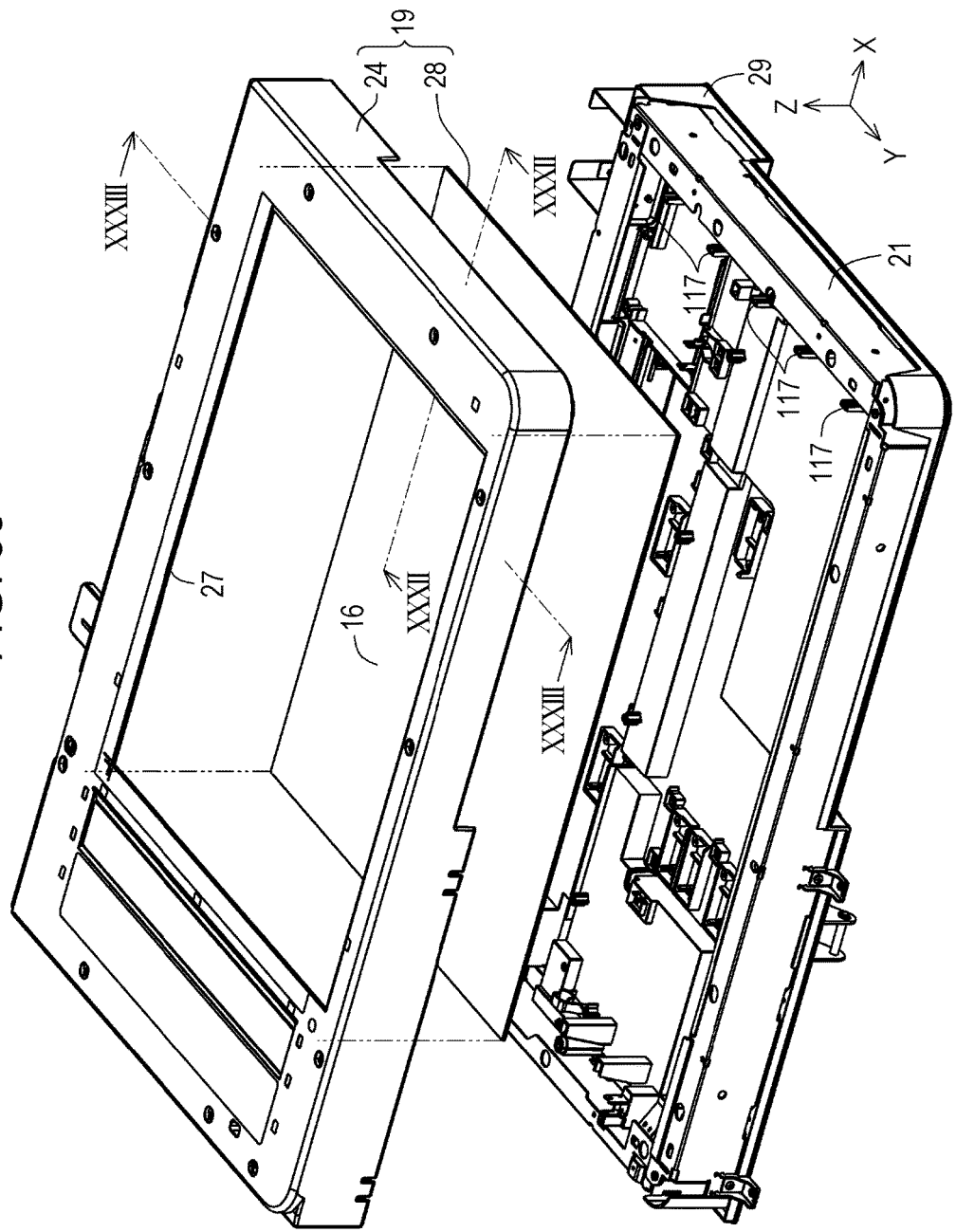
FIG. 30 is an exploded perspective view for illustrating a configuration of a second case unit in the embodiment.
Figure 31:
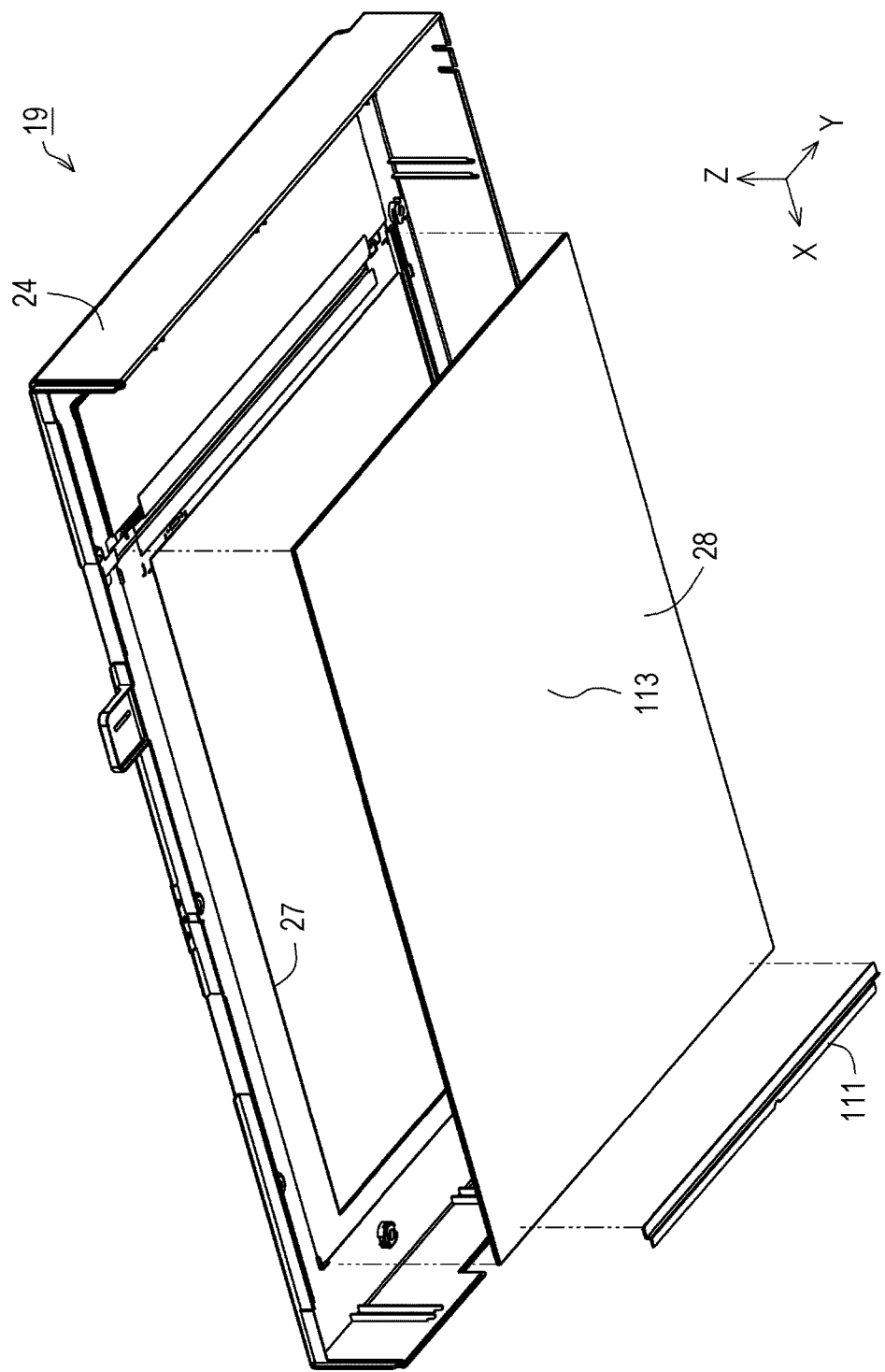
FIG. 31 is an exploded perspective view for illustrating a configuration of a second case unit in the embodiment.

The second case unit 19 will be described. As illustrated in FIG. 30, the second case unit 19 has a configuration in which the window portion 27 formed in the case body 24 is blocked with the glass 28 from the −Z axis direction side of the case body 24. As illustrated in FIG. 31, the glass 28 has the size and the shape by which the window 27 of the case body 24 is covered. Therefore, the window portion 27 of the case body 24 can be blocked with the glass 28 from the −Z axis direction side. In addition, the glass 28 and the case body 24 are joined to each other by a double-sided tape, an adhesive, or the like. Further, the second case unit 19 has a reinforcing unit 111.

The reinforcing unit 111 is joined to a surface 113 on the −Z axis direction side of the glass 28. The surface 113 on the −Z axis direction side of the glass 28 is a surface on a rear side of the document mounting surface 16 (FIG. 30) which is a surface on the Z axis direction side of the glass 28. The reinforcing unit 111 is joined to the end portion of the glass 28 on the X axis direction side. The reinforcing unit 111 extends along the end portion of the X axis direction side of the glass 28 (arrangement direction of a plurality of supports 117 which will be described later), that is, along the Y axis.

Figure 32:
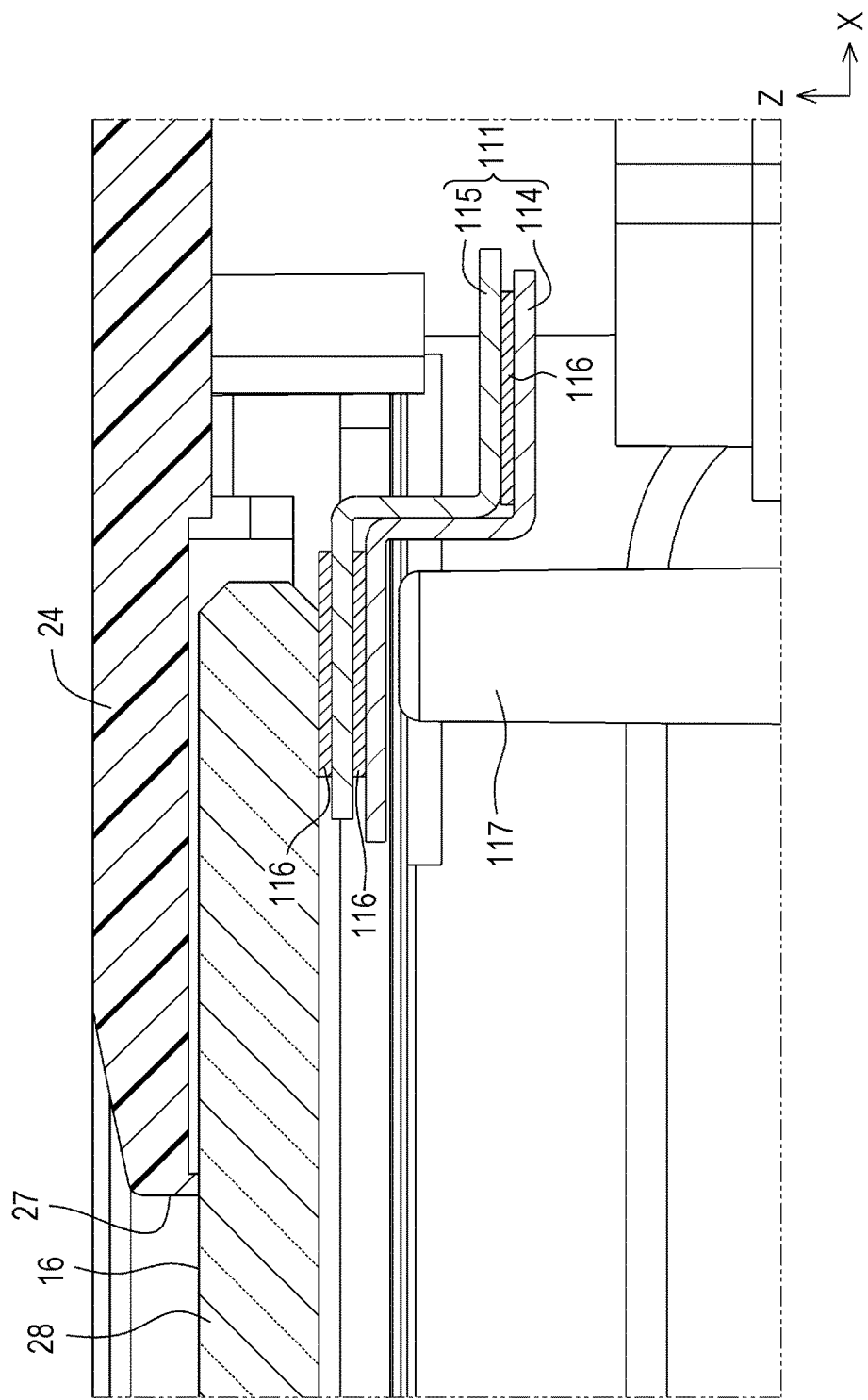
FIG. 32 is a sectional view taken along the line XXXII-XXXII in FIG. 30.

As illustrated in FIG. 32 which is a sectional view taken along the line XXXII-XXXII in FIG. 30, the reinforcing unit 111 has a configuration in which a reinforcing plate 114 and a reinforcing plate 115 overlap each other. Each of the reinforcing plate 114 and the reinforcing plate 115 is configured of a sheet metal bent in a crank shape. The reinforcing plate 114 is positioned on the −Z axis direction side of the reinforcing plate 115. The reinforcing plate 114 and the reinforcing plate 115 are joined to each other via a double-sided tape 116. The glass 28 is disposed on the Z axis direction side of the reinforcing plate 115. The glass 28 and the reinforcing plate 115 are joined to each other via the double-sided tape 116. In this configuration, the reinforcing unit 111 has high rigidity against a bending load.

Here, as illustrated in FIG. 30, the case body 29 is provided with a plurality of supports 117. The plurality of supports 117 are arranged along the Y axis and protrude in the Z axis direction from the case body 29. As illustrated in FIG. 32, the support 117 is positioned on the −Z axis direction side of the glass 28. When the glass 28 is viewed in a plan view in the −Z axis direction, the plurality of supports 117 overlap the glass 28. The reinforcing unit 111 is interposed between the glass 28 and the plurality of supports 117. There is a gap between the plurality of supports 117 and the reinforcing unit 111. In other words, the reinforcing unit 111 is disposed in a state of floating in the Z axis direction from the plurality of supports 117.

Figure 33:
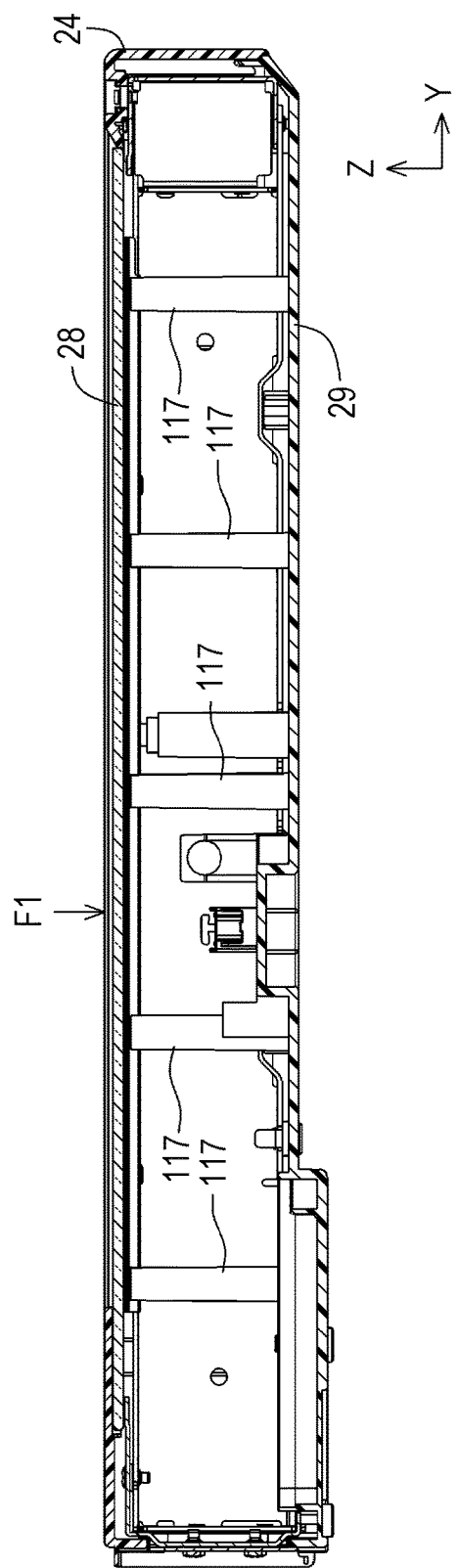
FIG. 33 is a sectional view taken along the line XXXIII-XXXIII in FIG. 30.

In the above-described configuration, for example, as illustrated in FIG. 33 which is a sectional view taken along the line XXXIII-XXXIII in FIG. 30, when a pressing force F1 which acts in the −Z axis direction on the glass 28 between the two adjacent supports 117 is generated, deflection (distortion) occurs in the glass 28 in a direction of protruding toward the −Z axis direction. The glass 28 has high brittleness. Therefore, when the deflection due to the pressing force F1 is generated in the glass 28, there is a case where the glass 28 breaks.

In response to such a problem, in the embodiment, as illustrated in FIG. 32, since the reinforcing unit 111 is interposed between the glass 28 and the support 117, it is possible to reduce the deflection that occurs in the glass 28 by the pressing force F1. In other words, the glass 28 can be reinforced by the reinforcing unit 111. Therefore, since it is easy to suppress the cracking of the glass 28, it is possible to make it easy to improve the reliability of the scanner unit 5.

Figure 34:
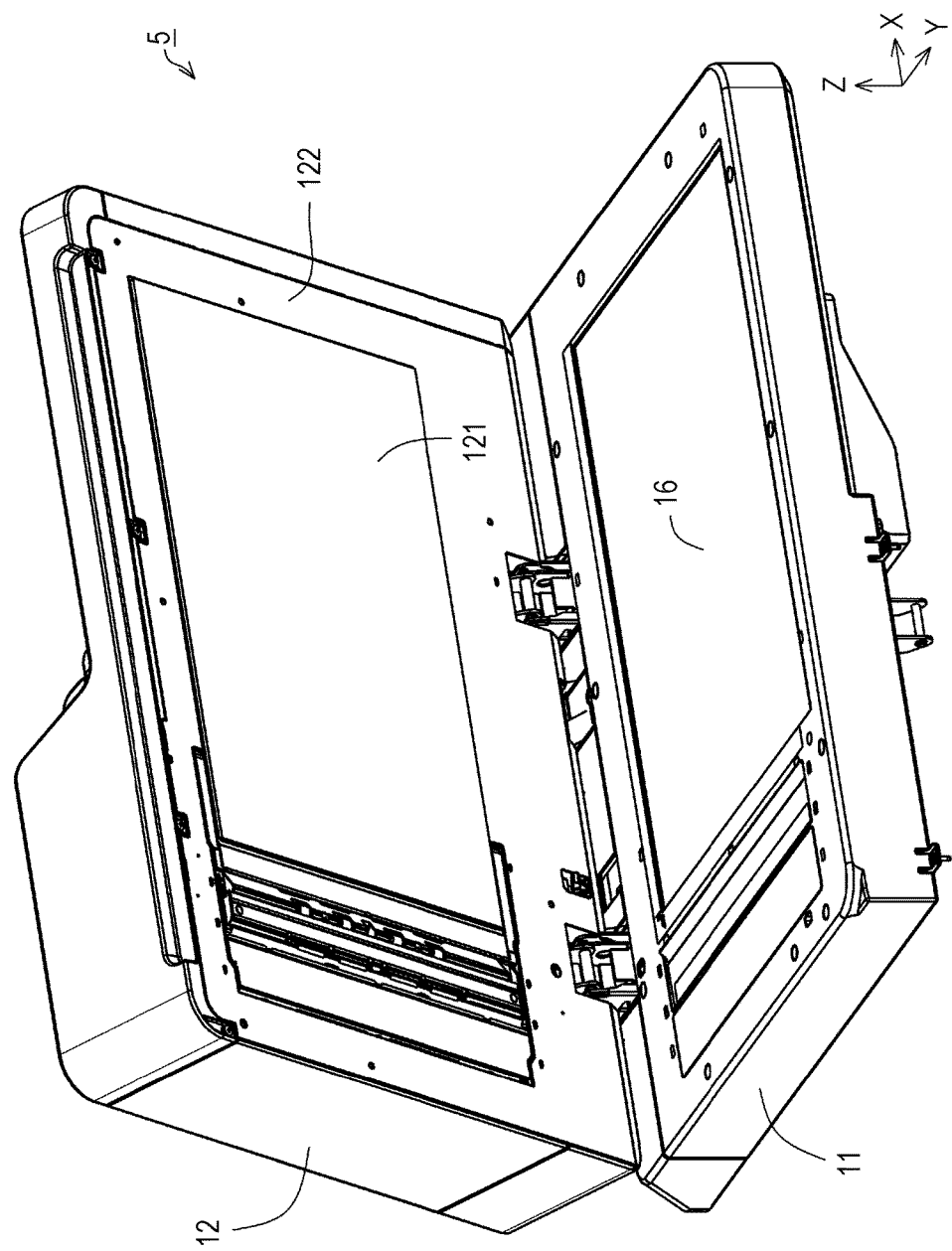
FIG. 34 is a perspective view illustrating a scanner unit in the embodiment.

As illustrated in FIG. 34, the second reading device 12 has a cover unit 121. In the second reading device 12, the cover unit 121 is disposed on the case body 122 facing the document mounting surface 16 of the first reading device 11. The case body 122 is a housing which configures the bottom portion of the second reading device 12. The case body 122 configures a part of the outer shell of the second reading device 12. The case body 122 faces the document mounting surface 16 of the first reading device 11 in a state where the second reading device 12 is closed with respect to the first reading device 11.

The cover unit 121 has the size and the shape by which the document mounting surface 16 can be covered. In a state where the second reading device 12 is closed with respect to the first reading device 11, the cover unit 121 faces the document mounting surface 16 and covers the document mounting surface 16. The document mounted on the document mounting surface 16 is pressed to the document mounting surface 16 by the cover unit 121. Accordingly, it is possible to make it easy to allow the document mounted on the document mounting surface 16 to tightly adhere the document mounting surface 16. As a result, it is possible to stably read an image from the document mounted on the document mounting surface 16 by the first reading device 11. Accordingly, it is possible to make it easy to improve the reliability for reading the image in the scanner unit 5.

Figure 35:
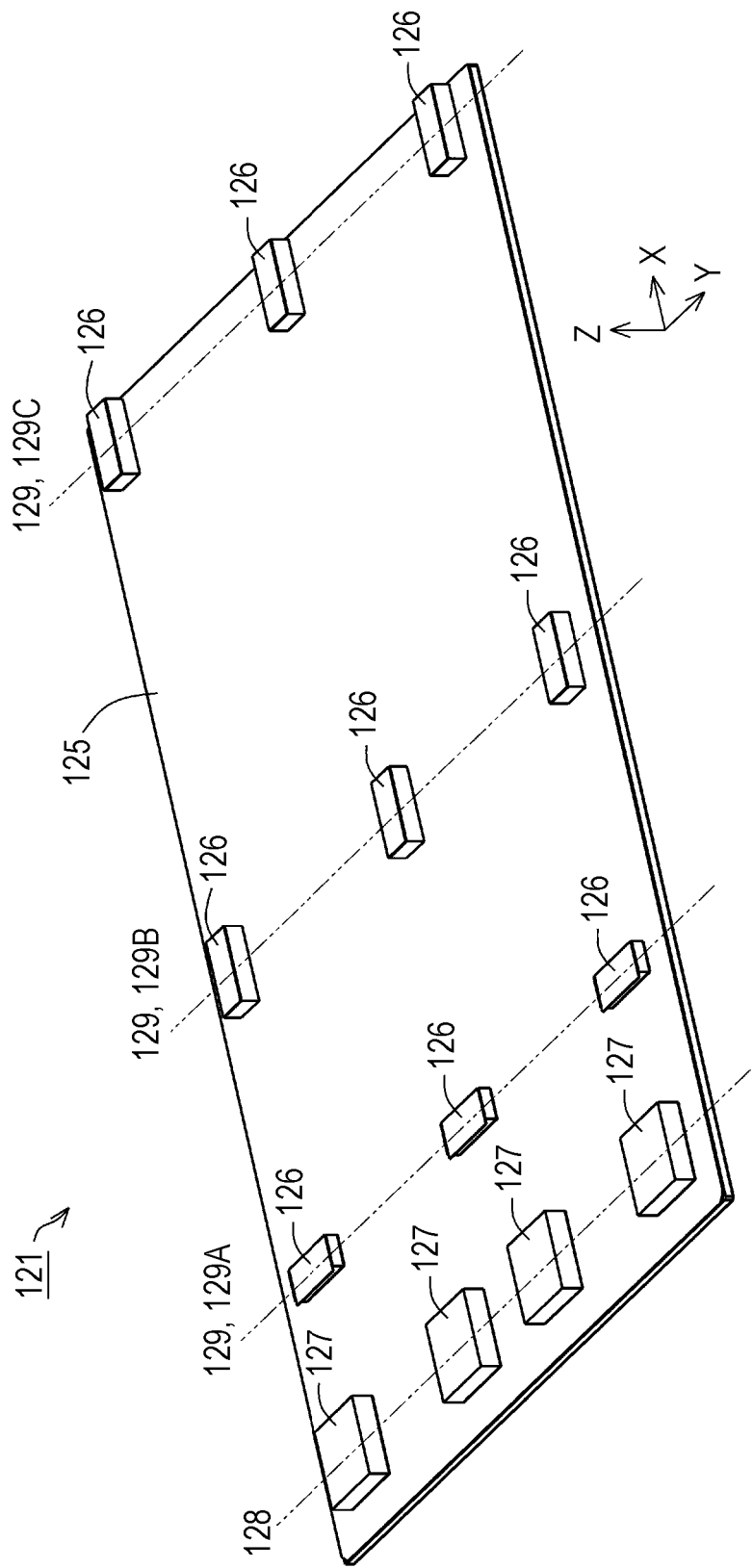
FIG. 35 is a perspective view illustrating a cover unit in the embodiment.

As illustrated in FIG. 35, the cover unit 121 includes a mat 125, a plurality of buffer members 126, and a plurality of buffer members 127. Each of the plurality of buffer members 126 and the plurality of buffer members 127 is disposed on the Z axis direction side of the mat 125. The plurality of buffer members 126 are joined to the mat 125 via a double-sided tape which is not illustrated. In addition, the plurality of buffer members 127 are also joined to the mat 125 via the double-sided tape which is not illustrated. The plurality of buffer members 127 are disposed in the end portion on the −X axis direction side of the mat 125, and are arranged along the Y axis. In the embodiment, four buffer members 127 are arranged along the Y axis. The row of four buffer members 127 arranged along the Y axis is described as a row 128.

Figure 36:
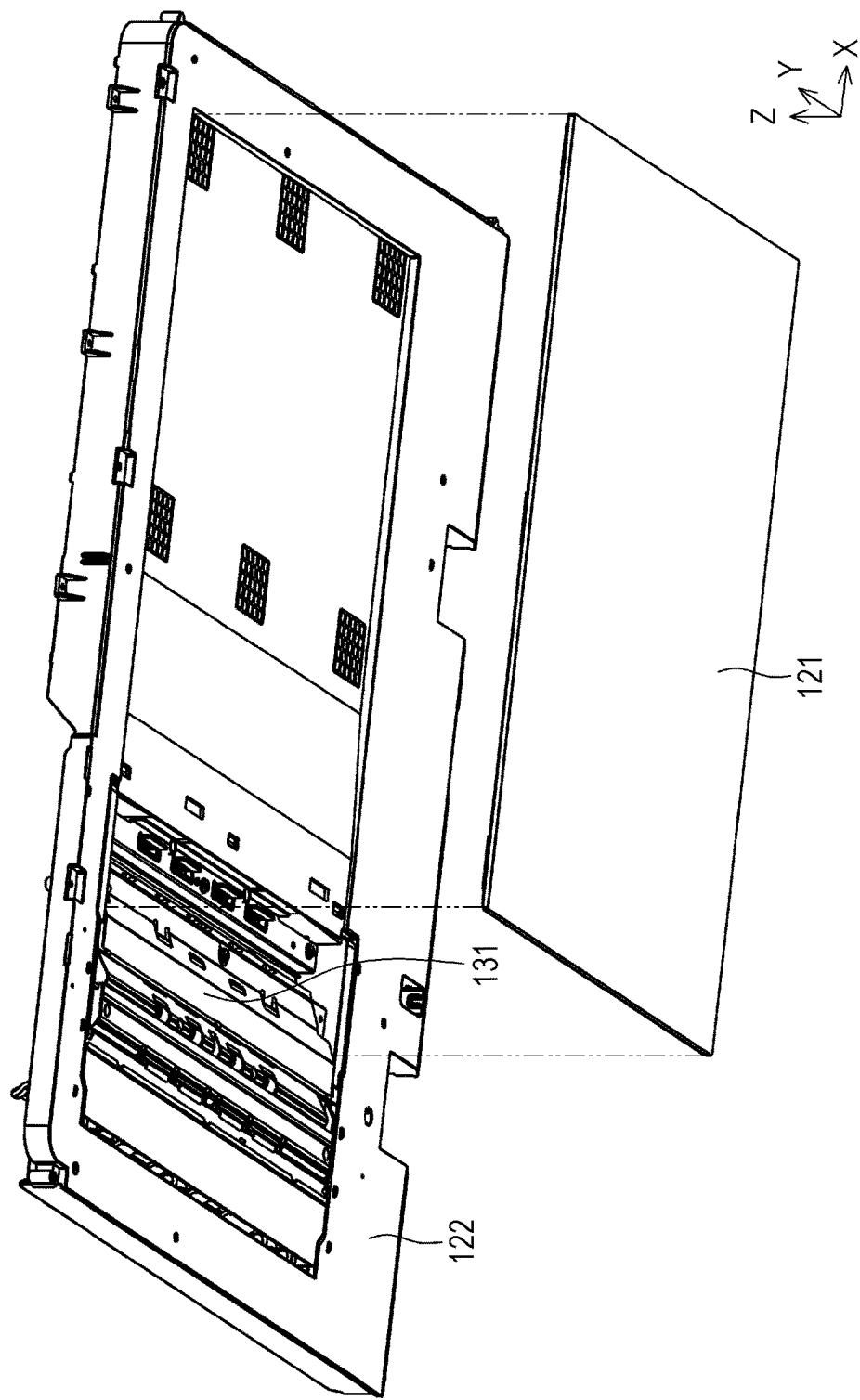
FIG. 36 is an exploded perspective view illustrating the case body and the cover unit in the embodiment.

Nine buffer members 126 are disposed on the X axis direction side of the row 128 of the four buffer members 127. The nine buffer members 126 configure three rows 129 with three buffer members 126 arranged along the Y axis as one row 129. Hereinafter, in a case where three rows 129 are individually identified, each of the three columns 129 is described as a row 129A, a row 129B, and a row 129C. The double-sided tape which is not illustrated sticks to the side opposite to the mat 125 side of the plurality of buffer members 126, that is, the Z axis direction side of the plurality of buffer members 126. On the other hand, the double-sided tape is not provided on the Z axis direction side of the plurality of buffer members 127. The cover unit 121 having the above-described structure is joined to the case body 122 illustrated in FIG. 36 by the double-sided tape which sticks to the Z axis direction side of the plurality of buffer members 126.

Figure 37:
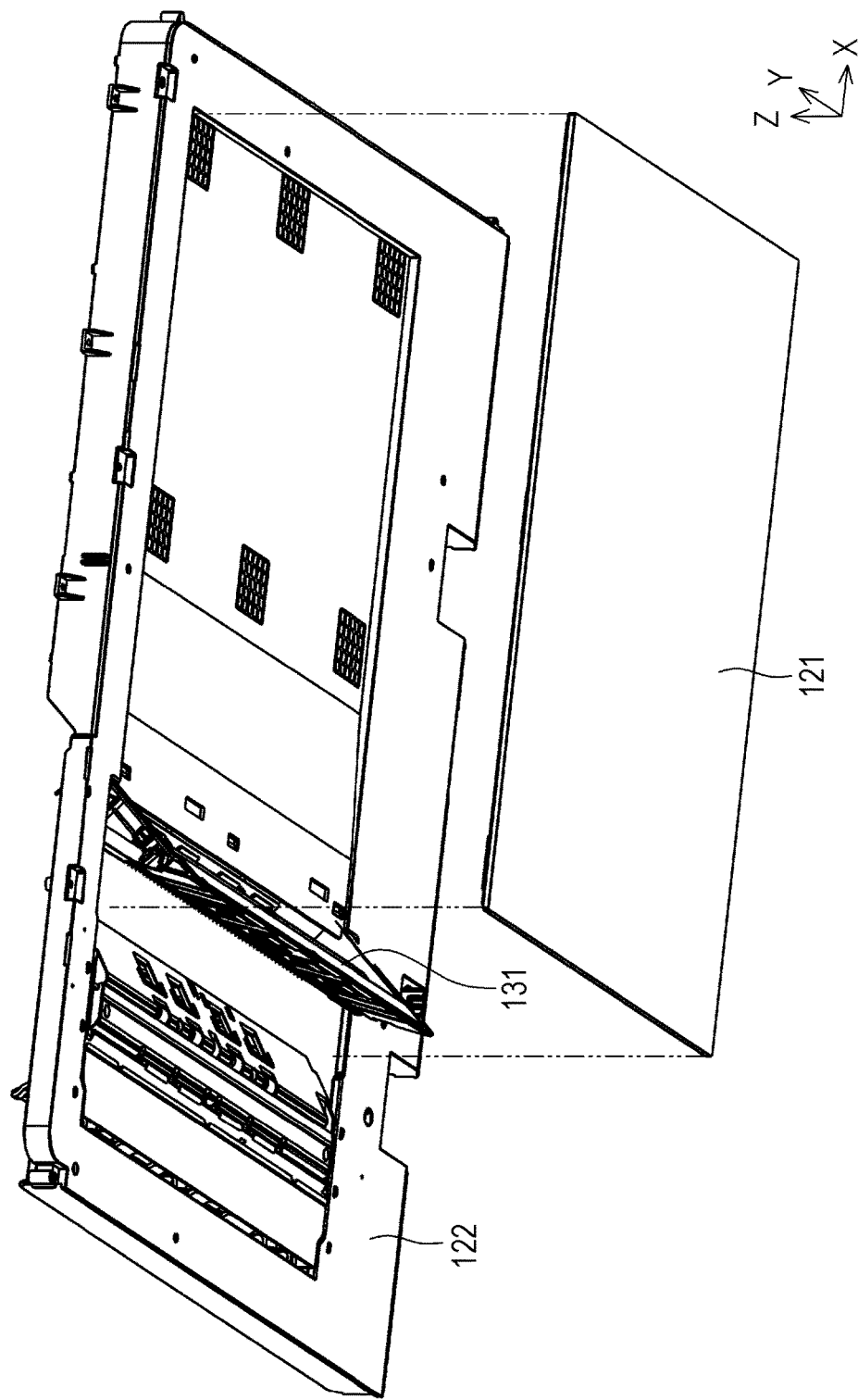
FIG. 37 is an exploded perspective view illustrating the case body and the cover unit in the embodiment.

Here, the case body 122 is provided with an opening/closing flap 131. As illustrated in FIG. 37, the opening/closing flap 131 is configured to be rotatable with respect to the case body 122. The opening/closing flap 131 is configured to be rotatable around the rotation axis that extends along the Y axis. The operator can open and close the opening/closing flap 131 with respect to the case body 122 by rotating the opening/closing flap 131. The operator can open the opening/closing flap 131 to the case body 122 by pulling up the opening/closing flap 131 in the −Z axis direction. FIG. 37 illustrates a state where the opening/closing flap 131 is opened with respect to the case body 122.

When the opening/closing flap 131 is opened with respect to the case body 122, the opening/closing flap 131 passes through the document transport path in the second reading device 12. Accordingly, for example, when the document is stuck in the document transport path in the second reading device 12, the document can be removed by opening the opening/closing flap 131 with respect to the case body 122. In addition, when the opening/closing flap 131 is opened and closed with respect to the case body 122, the operator performs the operation in a state where the second reading device 12 illustrated in FIG. 2 is opened with respect to the first reading device 11.

Figure 38:
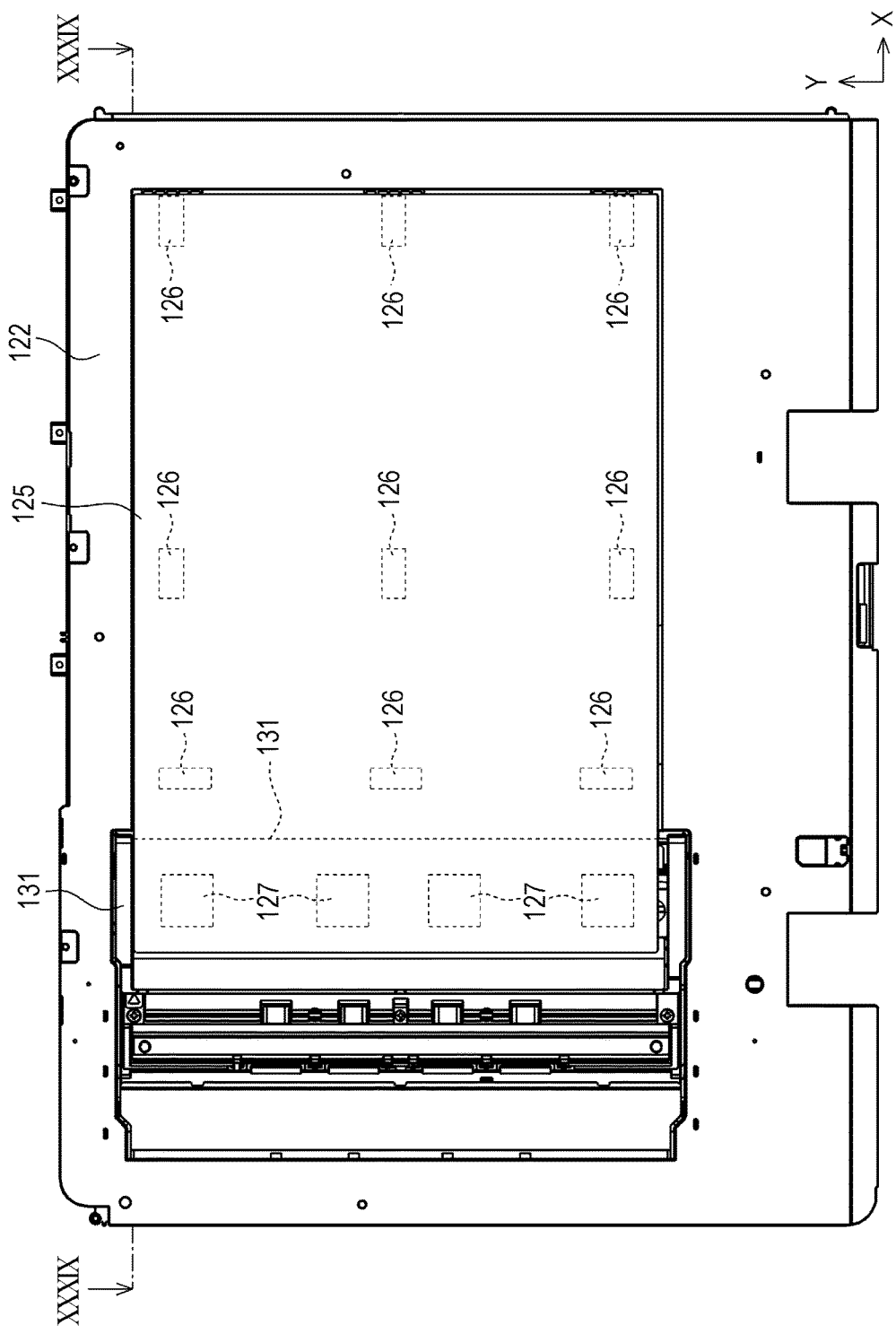
FIG. 38 is a bottom view illustrating the case body and the cover unit in the embodiment.

As illustrated in FIG. 38, the mat 125 of the cover unit 121 overlaps a region of the opening/closing flap 131. The mat 125 goes across from a region that overlaps the opening/closing flap 131 to a region of the case body 122. In other words, the mat 125 disposed on the case body 122 goes across the region of the opening/closing flap 131. In addition, the four buffer members 127 are positioned in the region that overlaps the opening/closing flap 131. On the other hand, the nine buffer members 126 are positioned on the outside of the region that overlaps the opening/closing flap 131.

Figure 39:
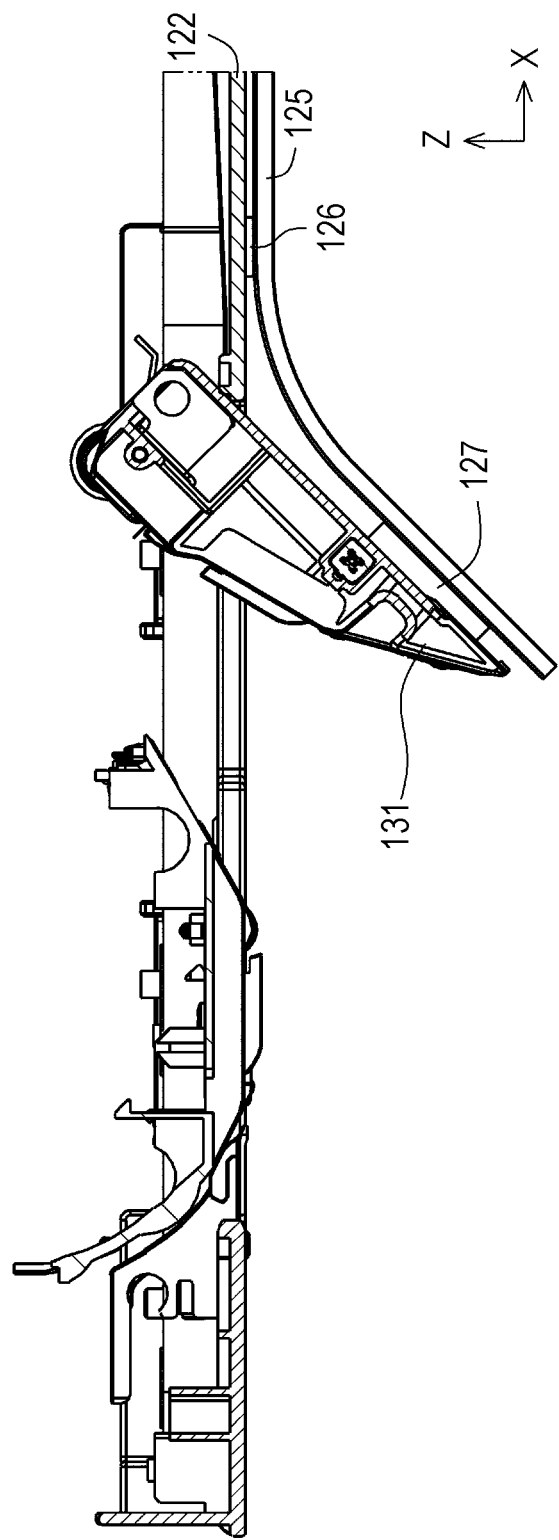
FIG. 39 is a sectional view taken along the line XXXIX-XXXIX in FIG. 38.

In the above-described configuration, when the opening/closing flap 131 is opened with respect to the case body 122, as illustrated in FIG. 39 which is a sectional view on the line XXXIX-XXXIX in FIG. 38, the mat 125 is bent by the posture change of the opening/closing flap 131. The mat 125 is bent toward the Z axis direction so as to protrude. At this time, for example, in the configuration in which the buffer member 127 is joined to the opening/closing flap 131, the radius of curvature of deflection of the mat 125 decreases, and the direction of deflection of the mat 125 is reversed. This is because the distance between the buffer member 126 and the buffer member 127 changes by opening and closing the opening/closing flap 131. When such a situation occurs, it is considered that a crease is formed in the mat 125 or the mat 125 is damaged by repetitive stress.

In response to such a problem, in the embodiment, since the buffer member 127 and the opening/closing flap 131 are not joined to each other, it is possible to increase the radius of curvature of deflection of the mat 125. Therefore, since it is easy to suppress breakage of the mat 125, it is possible to stably press the document mounted on the document mounting surface 16 by the mat 125. Accordingly, it is possible to make it easy to allow the document mounted on the document mounting surface 16 to more tightly adhere to the document mounting surface 16. As a result, it is possible to stably read an image from the document mounted on the document mounting surface 16 by the first reading device 11. Accordingly, it is possible to make it easy to improve the reliability for reading the image in the scanner unit 5.

Figure 40:
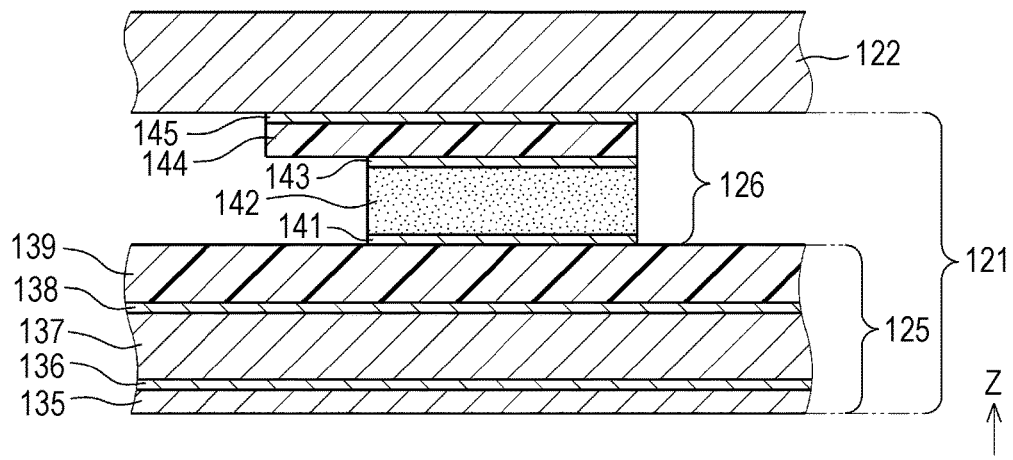
FIG. 40 is a sectional view schematically illustrating the cover unit in the embodiment.

A sectional configuration of the mat 125 and the buffer member 126 will be described. As illustrated in FIG. 40, the mat 125 includes a sheet member 135, a double-sided tape 136, a urethane foam layer 137, a double-sided tape 138, and a rigid layer 139. The sheet member 135 is a member facing the document mounting surface 16 (FIG. 34) and has flexibility. As illustrated in FIG. 40, the urethane foam layer 137 is positioned on the Z axis direction side of the sheet member 135, and is joined to the sheet member 135 via the double-sided tape 136. The rigid layer 139 is positioned on the Z axis direction side of the urethane foam layer 137 and is joined to the urethane foam layer 137 via the double-sided tape 138. The rigid layer 139 is a layer for increasing the rigidity of the mat 125, and can be formed of a synthetic resin, such as polycarbonate.

The buffer member 126 includes a double-sided tape 141, a sponge 142, a double-sided tape 143, a sheet member 144, and a double-sided tape 145. The sponge 142 is positioned on the Z axis direction side of the rigid layer 139, and is bonded to the rigid layer 139 via the double-sided tape 141. The sheet member 144 is positioned on the Z axis direction side of the sponge 142, and is joined to the sponge 142 via the double-sided tape 143. The sheet member 144 is formed of a synthetic resin, such as polyethylene terephthalate (PET) material. The sheet member 144 has the size and the shape by which the sponge 142 is covered when viewed in a plane view in the −Z axis direction. In the embodiment, the sheet member 144 overhangs further to the outer side than the region of the sponge 142. The sheet member 144 is joined to the case body 122 via the double-sided tape 145.

Figure 41:
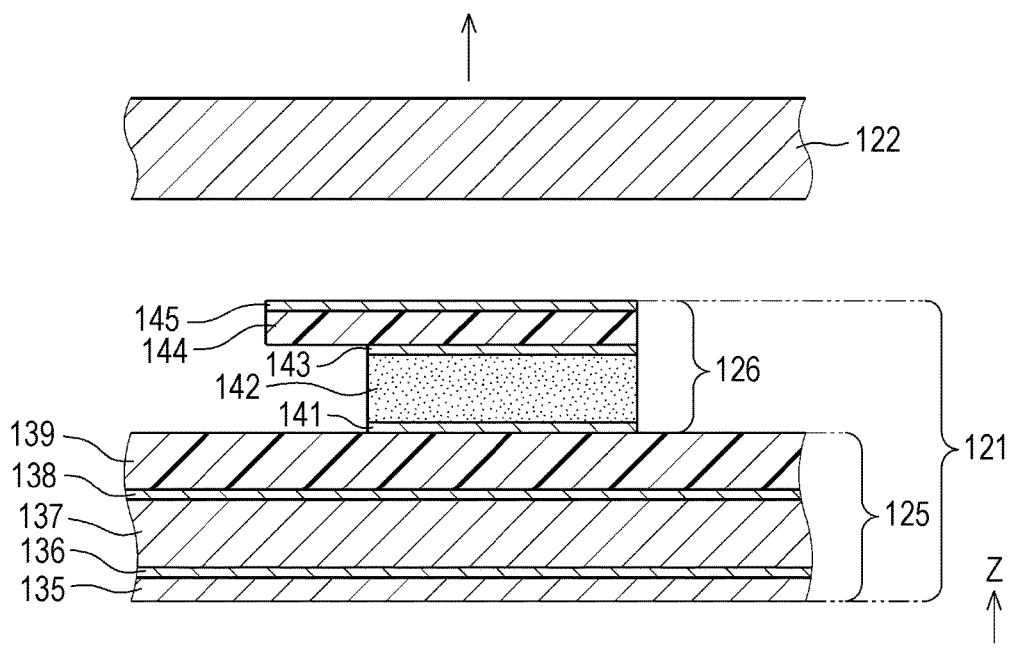
FIG. 41 is a sectional view schematically illustrating the cover unit in the embodiment.

In the above-described configuration, as illustrated in FIG. 41, the cover unit 121 can be easily separated from the case body 122. This is because the sheet member 144 is interposed between the sponge 142 and the case body 122. In this configuration, when the case body 122 is peeled off from the cover unit 121, the case body 122 can be easily separated from the cover unit 121 between the case body 122 and the double-sided tape 145. Accordingly, for example, when exchanging the cover unit 121, it is possible to make it easy to perform the work. In addition, in the buffer member 127, a configuration obtained by eliminating the double-sided tape 145, the sheet member 144, and the double-sided tape 143 from the buffer member 126, is employed.

Figure 42:
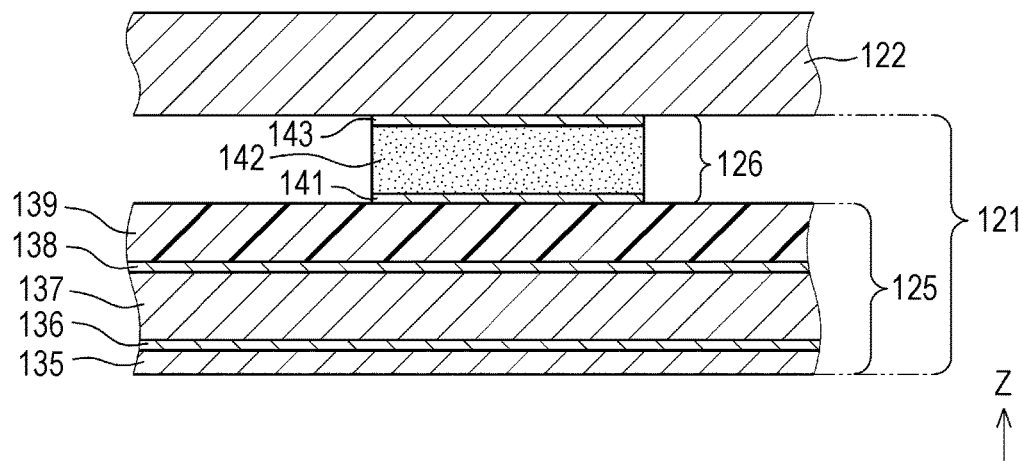
FIG. 42 is a sectional view schematically illustrating another example of the cover unit.
Figure 43:
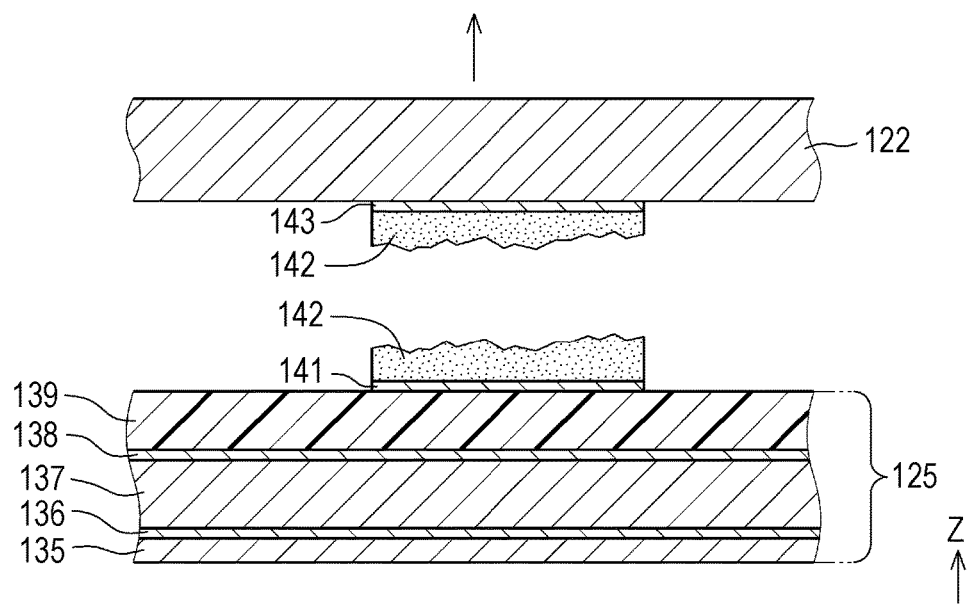
FIG. 43 is a sectional view schematically illustrating a problem in another example of the cover unit.

As a configuration of the cover unit 121, it is also possible to employ a configuration obtained by eliminating the double-sided tape 145 and the sheet member 144 from the buffer member 126. In this configuration, as illustrated in FIG. 42, the buffer member 126 includes the double-sided tape 141, the sponge 142, and the double-sided tape 143. In addition, the sponge 142 is joined to the case body 122 via the double-sided tape 143. According to the configuration, since the configuration of the buffer member 126 can be simplified, the costs can be reduced. However, in the configuration, when separating the cover unit 121 from the case body 122, as illustrated in FIG. 43, the sponge 142 is likely to break. In addition, the double-sided tape 143 and the broken sponge 142 are likely to remain in the case body 122. Therefore, when exchanging the cover unit 121, the work is likely to become complicated.

In response to such a problem, in the embodiment, since the sheet member 144 is interposed between the sponge 142 and the case body 122, the case body 122 is likely to be separated from the cover unit 121 between the case body 122 and the double-sided tape 145. Accordingly, when exchanging the cover unit 121, since it is easy to suppress the work from becoming complicated, it is possible to reduce the labor involved in the exchange.

What is claimed is:
1. An image reading apparatus comprising:
   a reading device which reads an image;
   a carriage of which a part is configured of a conductive material, and on which the reading device is loaded;
   a support shaft which is formed of a conductive material, which is grounded to a ground potential, and which supports the carriage to be slidable; and
   a conduction member which allows the conductive part of the carriage and the support shaft to be electrically conducted to each other,
   wherein the carriage includes a bearing section which is formed of a material having electric insulation properties,
   wherein the bearing section is supported by the support shaft in a state of abutting against the support shaft from one side of the support shaft in a direction intersecting with a shaft line of the support shaft,
   wherein the conduction member is fixed to the carriage, and abuts against the support shaft from a side opposite to the one side of the support shaft,
   wherein the bearing section abuts against two locations at a circumference of the support shaft, and
   wherein the conduction member abuts against one location at the circumference of the support shaft.
2. The image reading apparatus according to claim 1, wherein positions at two locations at which the bearing section abuts against the circumference of the support shaft and a position at one location at which the conduction member abuts against the circumference of the support shaft, are positioned on opposite sides with the center of the support shaft interposed therebetween when viewed from an extending direction of the support shaft.
3. The image reading apparatus according to claim 1, wherein the carriage includes two bearing sections,
   wherein the two bearing sections are arranged having a gap therebetween along the shaft line of the support shaft, and
   wherein the conduction member is positioned between the two bearing sections.
4. The image reading apparatus according to claim 3, further comprising:
   document mounting glass which is provided on a side opposite to the carriage side of the reading device, and which is for mounting a document on which the image read by the reading device is described; and
   a pressing member which is disposed between the carriage and the reading device, and which presses the reading device toward the document mounting glass,
   wherein the support shaft is disposed on a side opposite to the document mounting glass side of the carriage, and
   wherein the conduction member presses the support shaft toward the carriage side from the side opposite to the carriage side.
5. The image reading apparatus according to claim 1, wherein the support shaft is grounded via a frame of the image reading apparatus.

* * * * *